(12) United States Patent
Murray et al.

(10) Patent No.: US 12,344,319 B1
(45) Date of Patent: Jul. 1, 2025

(54) VEHICLE AND STRUCTURE THEREFOR

(71) Applicant: SUNSET VANS, INC., Corona, CA (US)

(72) Inventors: Derek Murray, Corona, CA (US); Stanton David Saucier, Tarzana, CA (US); Troy J Barker, Las Vegas, NV (US)

(73) Assignee: SUNSET VANS, INC., Corona, CA (US)

( * ) Notice: Subject to any disclaimer, the term of this patent is extended or adjusted under 35 U.S.C. 154(b) by 344 days.

(21) Appl. No.: 17/968,482

(22) Filed: Oct. 18, 2022

(51) Int. Cl.
| B62D 25/20 | (2006.01) |
| A61G 3/06 | (2006.01) |
| A61G 3/08 | (2006.01) |

(52) U.S. Cl.
CPC ............. *B62D 25/20* (2013.01); *A61G 3/061* (2013.01); *A61G 3/0808* (2013.01); *B62D 25/2009* (2013.01)

(58) Field of Classification Search
CPC .. B62D 25/00; B62D 25/025; B62D 25/2036; B62D 25/2054; B62D 25/20; B62D 21/02; B62D 21/03
USPC .................................. 296/204, 193.07, 209
See application file for complete search history.

(56) References Cited

U.S. PATENT DOCUMENTS

| 6,299,210 | B1 | 10/2001 | Ruehl et al. |
| 7,195,306 | B2 * | 3/2007 | Egawa ................... B62D 25/20 |
| | | | 296/193.07 |
| 8,286,743 | B2 | 10/2012 | Rawlinson |
| 10,112,470 | B2 * | 10/2018 | Hamilton ................ B62D 25/20 |
| 10,112,541 | B2 | 10/2018 | Portney et al. |
| 10,167,022 | B2 * | 1/2019 | Lee ..................... B62D 25/2036 |
| 10,214,243 | B2 * | 2/2019 | Elbkaily ................. B62D 21/15 |
| 10,513,247 | B2 | 12/2019 | Clarke et al. |
| 2005/0263987 | A1 | 12/2005 | Smith |

FOREIGN PATENT DOCUMENTS

| CN | 106114180 A | 11/2016 | |
| DE | 102007053346 A1 * | 5/2009 | ........... B62D 23/005 |

OTHER PUBLICATIONS

DE102007053346 Text (Year: 2009).*
Tribus_Manual Lowered Floorsection ProMaster Standard, dated Jun. 20, 2019.
Savaria Lowered Floor Conversion for Ram ProMaster, dated 2015.
Tribus_Fiat Ducato Civitas, dated 2013.

* cited by examiner

*Primary Examiner* — Dennis H Pedder
(74) *Attorney, Agent, or Firm* — AP Patents; Alexander Pokot

(57) ABSTRACT

A vehicle structure includes a plurality of first members disposed at a distance from each other and a plurality of second members disposed at a distance from each other in gaps between two first members. Each second member from the plurality of second members being rigidly attached to a respective pair of first members. A thickness of the plurality of first members and the plurality of second members being 0.5 inches or less. The vehicle structure is attached to two side components that are designed with sloped walls increasing a cavity for an energy source. An energy source shield may be also provided to shield and exposed end of the energy source at a front end of a vehicle. The side components include apertures to detachably fasten the energy source.

22 Claims, 26 Drawing Sheets

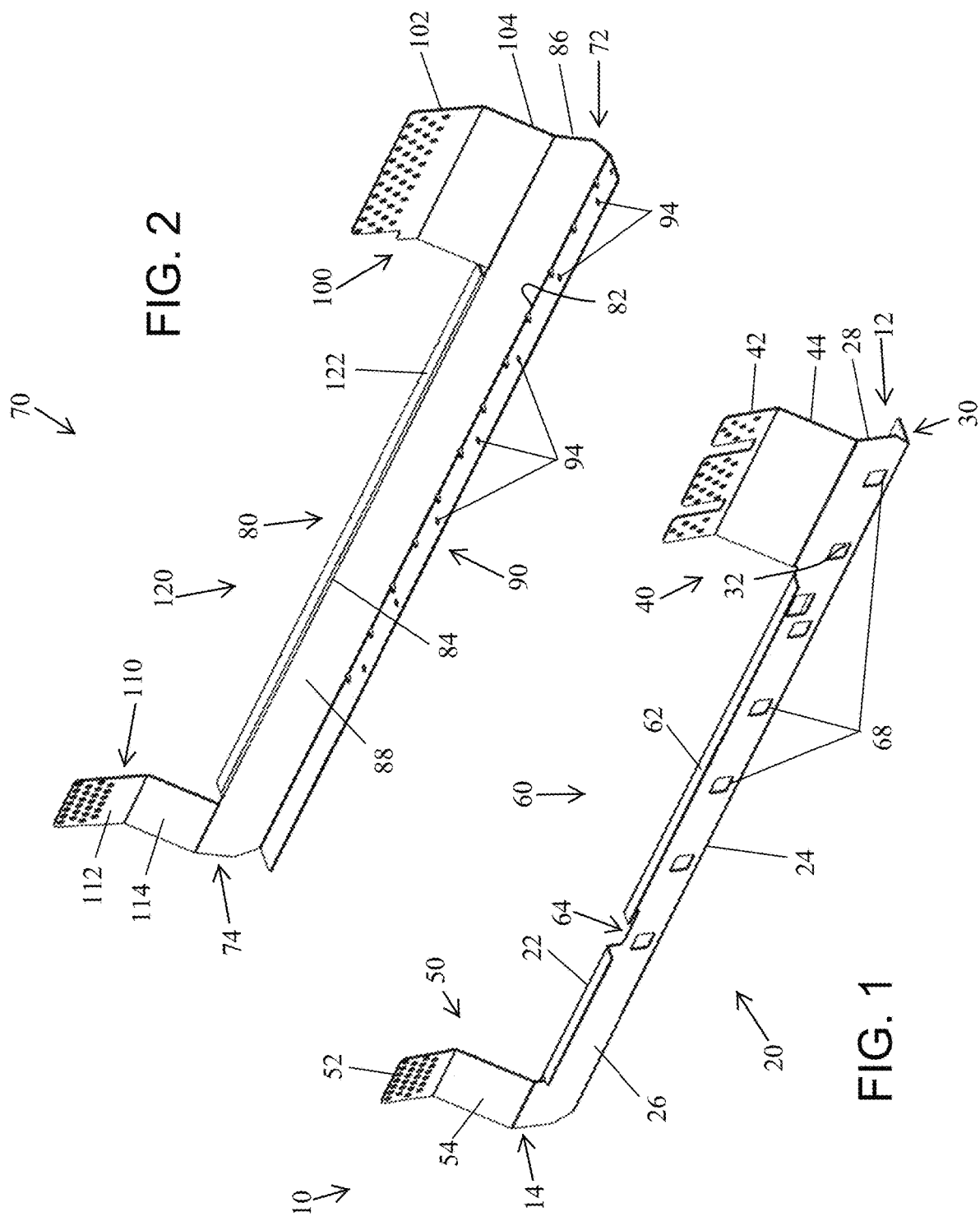

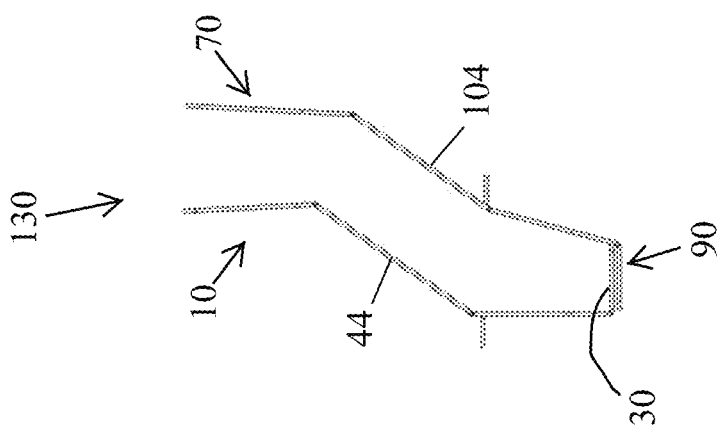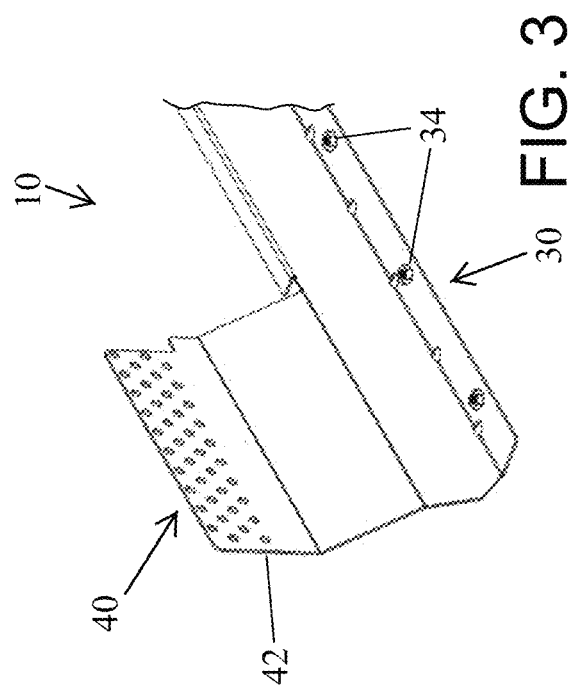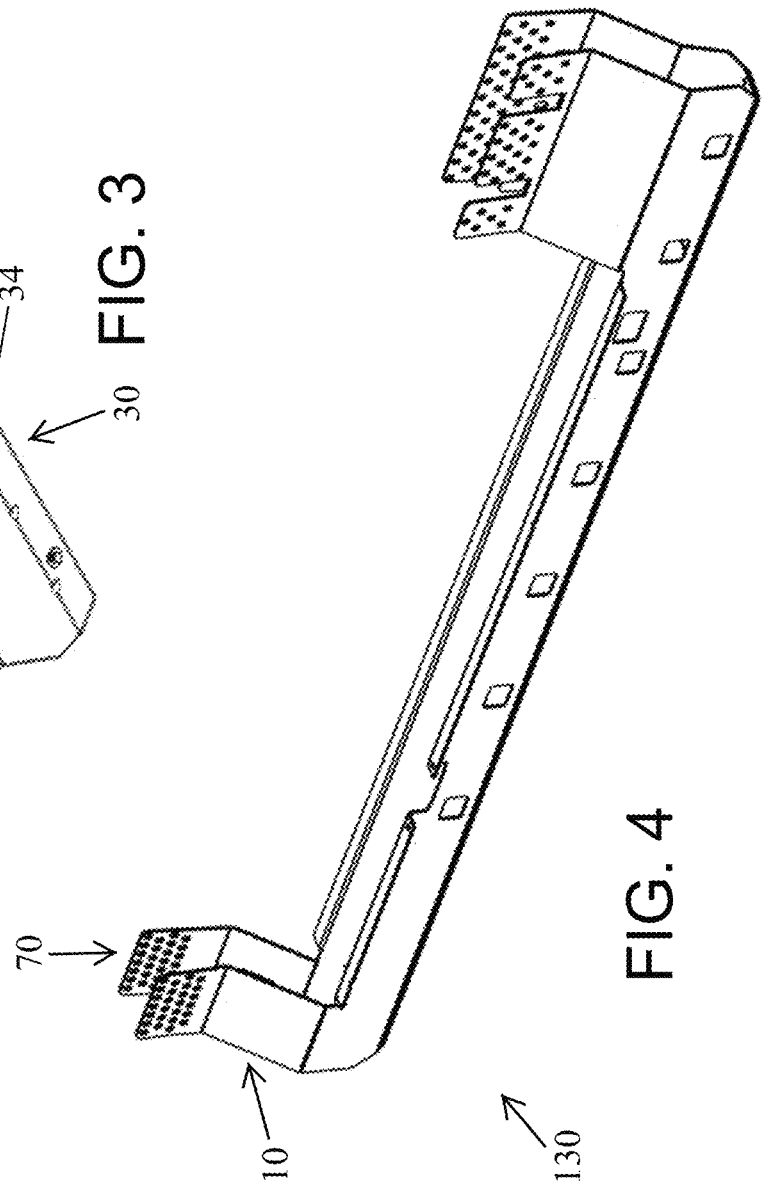

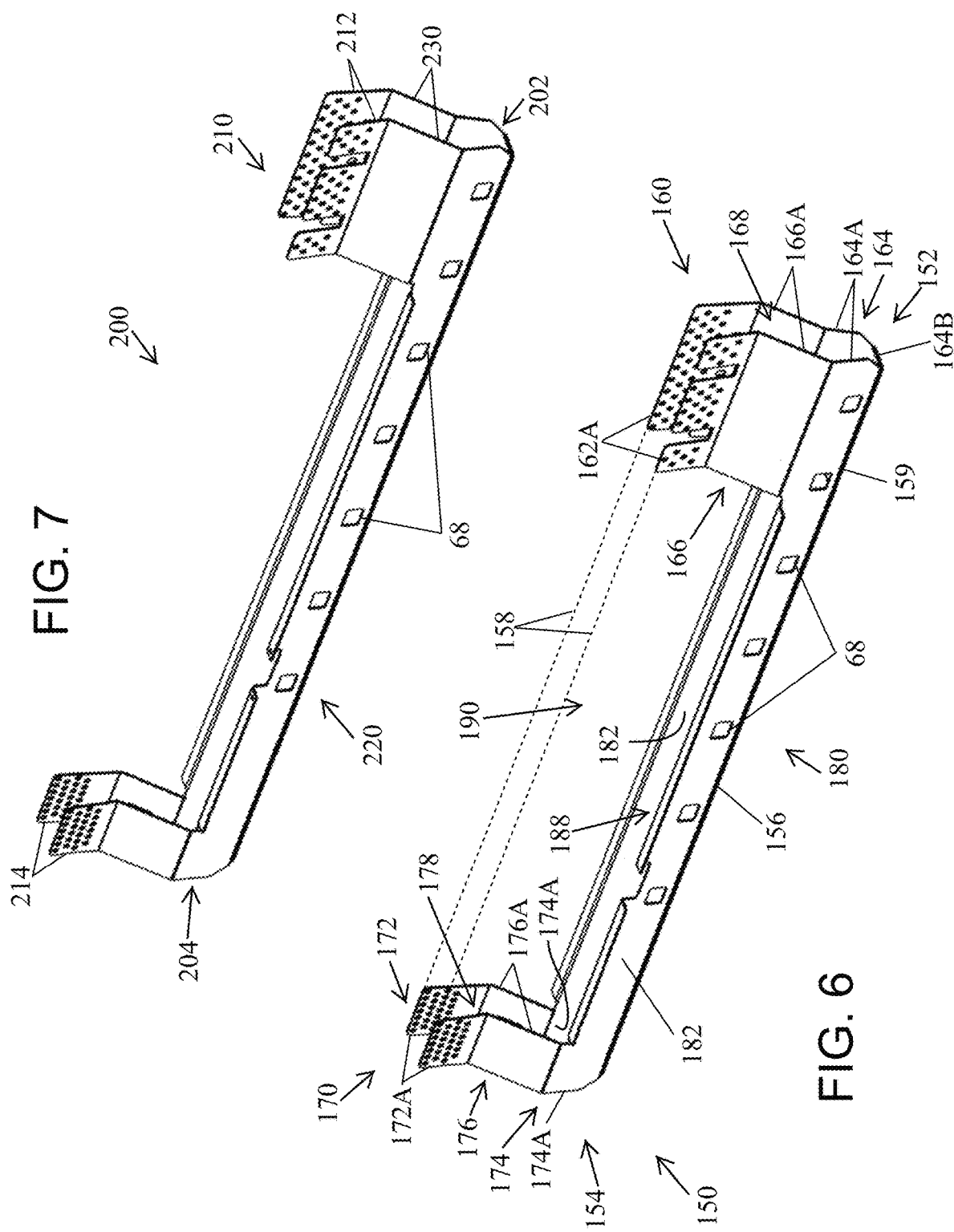

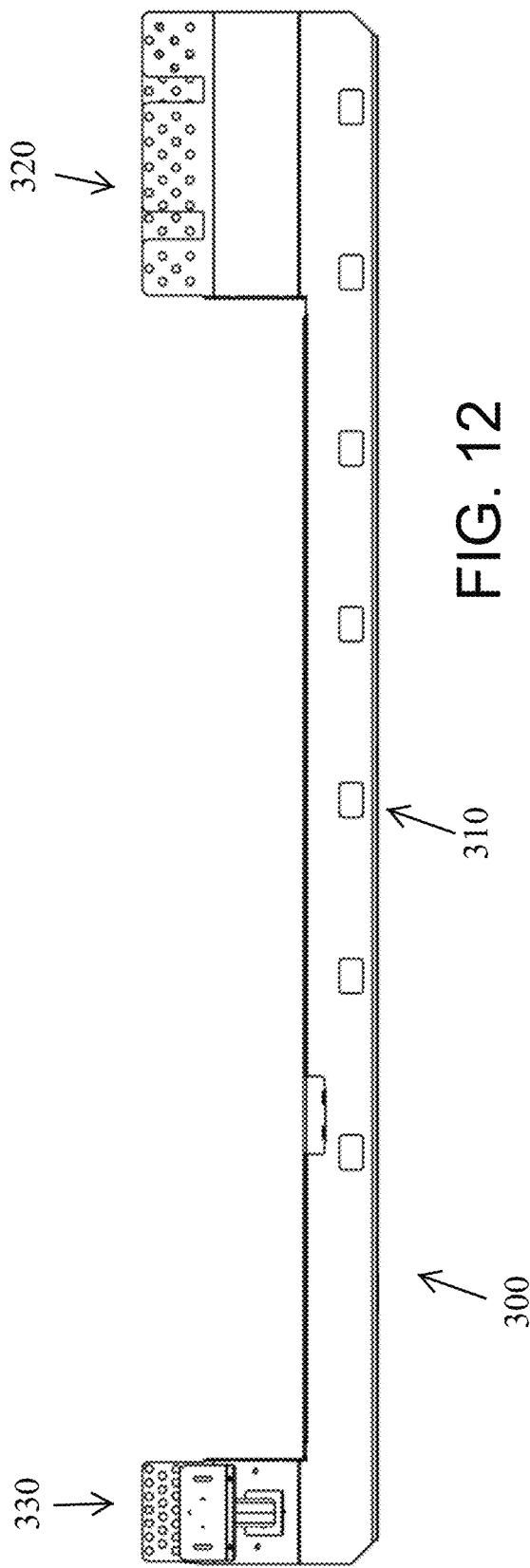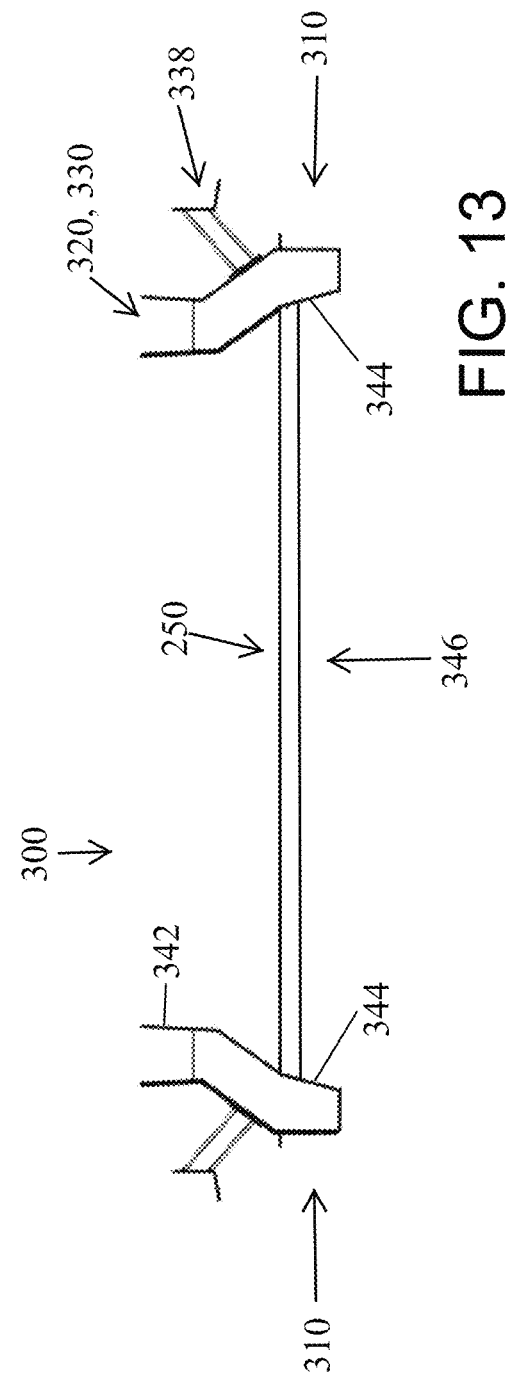
FIG. 12
FIG. 13

VEHICLE AND STRUCTURE THEREFOR

CROSS-REFERENCE TO RELATED APPLICATIONS

N/A

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

TECHNICAL FIELD

The subject matter relates to electric vehicles. The subject matter may relate to a conversion of a vehicle with an internal combustion engine into an electric vehicle. The subject matter may relate to a conversion of a cargo van with an internal combustion engine into an electrically powered passenger van with a low floor portion.

BRIEF DESCRIPTION OF THE DRAWINGS

The accompanying drawings are incorporated in and constitute part of the specification and illustrate various embodiments. In the drawings:

FIG. 1 illustrates a perspective view of a vehicle structure;
FIG. 2 illustrates a perspective view of a vehicle structure;
FIG. 3 illustrates a partial perspective view of the vehicle structure of FIG. 1;
FIG. 4 illustrates a perspective view of a vehicle structure;
FIG. 5 illustrates an end view of the vehicle structure of FIG. 4;
FIG. 6 illustrates a perspective view of a vehicle structure;
FIG. 7 illustrates a perspective view of a vehicle structure;
FIG. 12 illustrates a side view of the floor support assembly of FIG. 11;
FIG. 13 illustrates an end view of the floor support assembly of FIG. 11.

DETAILED DESCRIPTION

Figure 8:
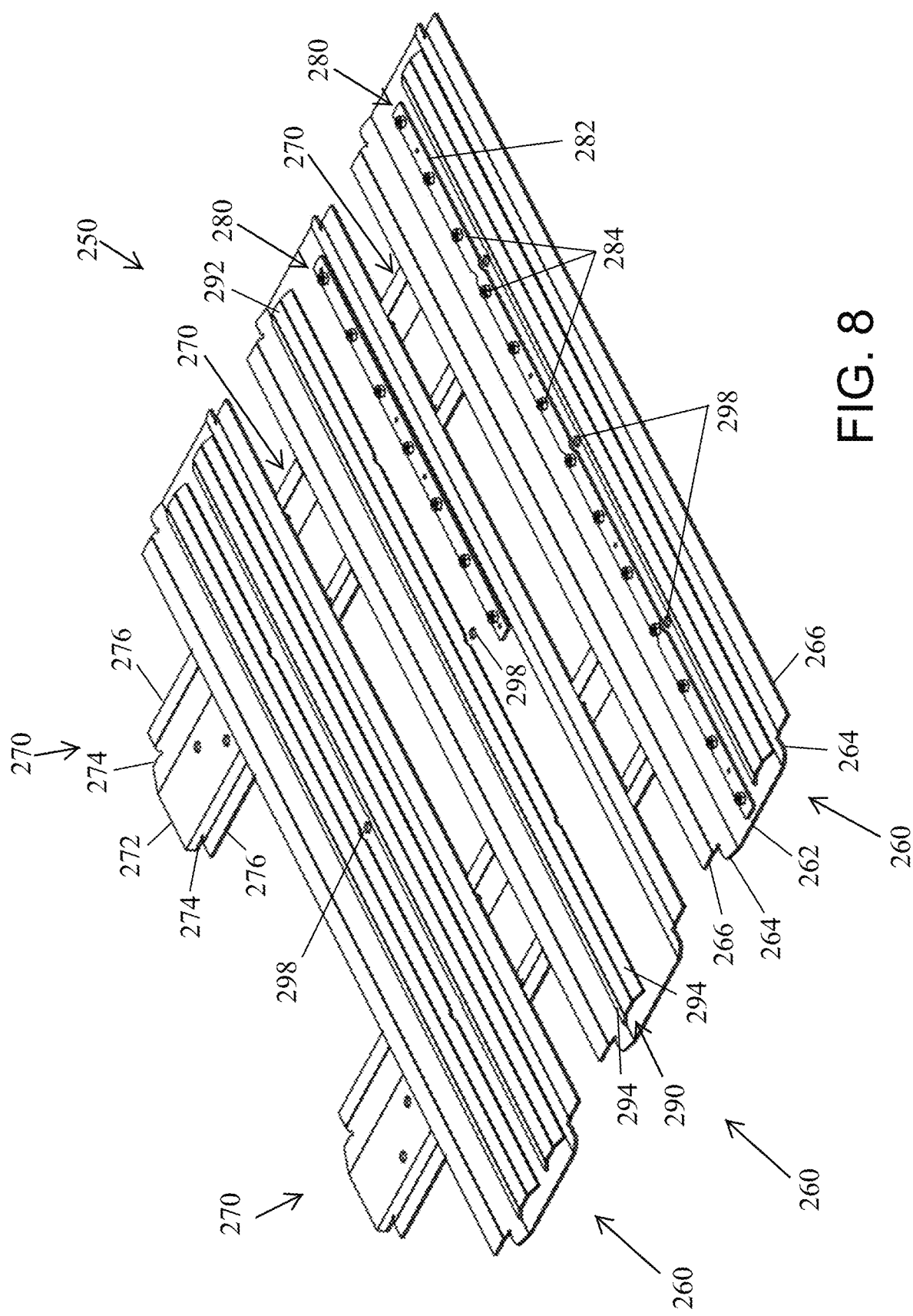
FIG. 8 illustrates a perspective view of a floor support.

Prior to proceeding to the more detailed description of the present subject matter, it should be noted that, for the sake of clarity and understanding, identical components which have identical functions have been identified with identical reference numerals throughout the several views illustrated in the drawing figures.

It is to be understood that the singular forms "a," "an," and "the" include plural referents unless the context clearly dictates otherwise or expressly specified otherwise. Thus, for example, reference to "a component surface" includes reference to one or more of such surfaces.

For purposes here, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives.

For purposes here, the words "comprising," "including," "having," and variants thereof, wherever they appear, shall be construed as open-ended terminology, with the same meaning as if the phrase "at least" were appended after each instance thereof.

The verb "may" is used to designate optionality/noncompulsoriness. In other words, something that "may" can, but need not.

Before elucidating the subject matter shown in the Figures, the present disclosure will be first described in general terms A vehicle structure may be designed as a vehicle side member with a main section, a first flange, a second flange, a third flange and a void between the second and third flanges.

The main section may have a first edge and a second edge. The second edge being disposed at a distance and substantially parallel to the first edge. Each edge from the first and second edges may be a straight edge. The main section also has two surfaces that are disposed at a distance from each other to define a thickness of the main section. Each surface from the first and second surfaces may be a flat surface.

The first flange extends outwardly from the main section at the first edge thereof and along a length of the main section. A width of the first flange may be uniform throughout a length of the first flange. A thickness of the first flange may be identical to a thickness of the main portion.

The second flange is disposed at one end portion of the main section. The second flange has a first portion and a second portion. The first portion may be disposed substantially parallel to the main portion. The first portion may be disposed substantially planar to the main portion. The second portion is disposed between the second edge of the main section and the first portion. The second portion is designed as an inclined portion relative to each of the main section and the first portion. A thickness of the second flange may be uniform throughout. The thickness of the second flange may be identical to the thickness of the main portion. End portion may be referred to as an extremity.

The third flange is disposed at an opposite end portion (extremity) of the main section. The third flange has a first portion and a second portion. The first portion may be disposed substantially parallel to the main portion. The first portion may be disposed substantially planar to the main portion. The second portion of the third flange is disposed between the second edge of the main section and the first portion of the third flange. The second portion of the third flange is designed as an inclined portion relative to each of the main section and the first portion of the third flange. A thickness of the third flange may be uniform throughout. The thickness of the third flange may be identical to the thickness of the main portion.

A length of the third flange may be different than a length of the second flange. A length of the third flange may be substantially equal to a length of the second flange. A slope of the second portion of the third flange may be designed with a different angle than a slope of the second portion of the second flange. A slope of the second portion of the third flange may be substantially identical to a slope of the second portion of the second flange. The main section may be adapted with an optional fourth flange disposed in a void between the first flange and the second flange.

An optional fourth flange may extend outwardly from the main section at the second edge of the main section between the second and third flanges.

The vehicle side member, as described above, may be designed as a one-piece component from a sheet of metal. The one-piece component may be manufactured by a press forming operation. The one-piece component may be manufactured as a stamping. The one-piece component may be manufactured as a casting.

The vehicle side member may be adapted with a plurality of apertures, disposed at a distance from each other, through a thickness of the first flange. The plurality of apertures may be drilled through the thickness of the first flange. The plurality of apertures may be punched through the thickness of the first flange. The plurality of apertures may be casted in during the casting process. The plurality of apertures may be threaded. In other words, the plurality of apertures may be provided as threaded apertures.

The vehicle side member may be further adapted with a plurality of projections. Each projection from the plurality of projections being disposed at one aperture from the plurality of apertures. Each projection has an internal boar with a thread aligned with the aperture and is being accessible therefrom. The threaded projection may be welded to the first flange. The projection may be casted with the threaded aperture being drilled by a secondary drilling operation and then tapped by a tapping operation.

The threaded projection may be provided as a threaded nut.

The vehicle side member may be adapted with a plurality of apertures, at a distance from each other, through a thickness of the main section. The plurality of apertures may be drilled through the thickness of the main section. The plurality of apertures may be punched through the thickness of the main section. The plurality of apertures may be casted in during the casting process.

The vehicle side member may be adapted with a plurality of first apertures, at a first distance from each other, through a thickness of the first flange and a plurality of second apertures, at a second distance from each other, through a thickness of the main section, the second distance being substantially equal to the first distance. The plurality of second apertures may be sized larger than the plurality of first apertures.

The vehicle side member may be adapted with an optional notch in the main portion and the fourth flange, when provided.

The vehicle side member may be adapted with optional drainage apertures disposed along a junction of the main portion and the first flange.

In a vehicle, the vehicle side member is directed in a longitudinal direction of the vehicle between the rear end and the front end of the vehicle. The vehicle side member may be referred to as a vehicle side rail, as a side rail for a vehicle or as a vehicle side sill.

A vehicle structure may be designed as a vehicle side sill with a first end section, a second end section, and a middle or a third section.

The first end section may be designed with a first portion, a second portion, and a third portion. The first portion may comprise two walls disposed at a distance from each other. The two walls may be parallel to each other. The two walls may define flanges of the first portion. The flanges may be used for mounting the first end section and the vehicle side sill to a vehicle structure.

The second portion may be also designed with two walls disposed at a distance from each other. The two walls of the second portion may be parallel to each other. The second portion may additionally comprise another or a third wall that connects the two walls and defines a generally U-shaped configuration of the second portion.

The third portion is disposed between and connects the first and second portions. The third portion may also comprise two walls. One of the two walls may be sloped. The sloped wall offsets one wall of the first portion from one wall of the second portion. The third portion may have two sloped walls. The two sloped walls offset the second portion from the first portion. The third portion may have a sloped surface. The sloped surface may be integrated into one of the two walls. The third portion may have two sloped surfaces. Each sloped surface may be integrated into a respective wall from the two walls. In other words, each wall may be provided as a sloped wall.

The first end section may be designed with a hollow interior. Each of the first, second and third portions may include a portion of the hollow interior. The first end section may be manufactured as a one-piece component. The one-piece component may be manufactured by a casting process. The first end section may be designed with each portion being an independent component and being rigidly connected to remaining portions. The rigid connection may be manufactured by a welding process.

The second end section may be aligned and disposed coplanar with the first end section along a length of the vehicle side sill. The second end section may be designed with a first portion, a second portion, and a third portion. The first portion may comprise two walls disposed at a distance from each other. The two walls may be parallel to each other. The two walls may define flanges of the first portion. The flanges may be used for mounting the second end section to a vehicle structure. The flanges may be used for mounting the second end section and the vehicle side sill to the vehicle structure.

The second portion of the second section may be also designed with two walls disposed at a distance from each other. The two walls of the second portion may be parallel to each other. The second portion may additionally comprise another or a third wall that connects the two walls and defines a generally U-shaped configuration of the second portion.

The third portion of the second section is disposed between and connects the first and second portions. The third portion may also comprise two walls. One of the two walls may be sloped. The sloped wall offsets one wall of the first portion from one wall of the second portion. The third portion may have two sloped walls. The two sloped walls offset the second portion from the first portion. The third portion may have a sloped surface. The sloped surface may be integrated into one of the two walls. The third portion may have two sloped surfaces. Each sloped surfaces may be integrated into a respective wall from the two walls. In other words, each wall may be provided as a sloped wall.

The second end section may be designed with a hollow interior. Each of the first, second and third portions may include a portion of the hollow interior. The second end section may be manufactured as a one-piece component. The one-piece component may be manufactured by a casting process. The second end section may be designed with each portion being an independent component and being rigidly connected to remaining portions. The rigid connection may be manufactured by a welding process.

The middle section joins first and second end sections. The middle section comprises a plurality of apertures. The middle section may comprise a wall and a flange. The flange extends outwardly from the main section along one edge thereof. The apertures may be through a thickness of the wall. The apertures may be through a thickness of the flange. The middle section may comprise a plurality of threaded apertures through the thickness of the flange. The middle section may comprise a plurality of apertures and a plurality of threaded nuts, each threaded nut being in an alignment with an aperture from the plurality of apertures. The apertures through the flange may be used to fasten another component of a vehicle to the vehicle side sill. These apertures may be referred to as fastening apertures. These apertures may be referred to as mounting apertures. The apertures through the main portion may be used as access apertures to fasteners used to fasten another component of a vehicle to the vehicle side sill. These apertures may be referred to as access apertures.

The middle section may comprise a plurality of mounting apertures through a thickness of a first wall and a plurality of access apertures through a thickness of a second wall, the second wall being connected to the first wall, and each access aperture from the plurality of access apertures being aligned with one mounting aperture from the plurality of mounting apertures.

The middle section may be designed with two or more walls defining a hollow interior of the middle section. The middle section may be manufactured from a tubular component.

In a vehicle, the vehicle side sill is disposed longitudinally between the rear end and the front end of the vehicle. The vehicle side sill may be referred to as a vehicle side rail, as a side rail for a vehicle or as a vehicle side member.

A vehicle structure may be designed as a vehicle side sill with a first mounting section, a second mounting section, and a brace connecting the first and second mounting sections. The first and second mounting portions are designed to mount the vehicle side sill to another vehicle structure.

The first mounting section may include a first portion, a second portion, and a third portion connecting the first and second portions.

The first portion may comprise two walls disposed at a distance from each other. The two walls may be parallel to each other. The two walls may define mounting flanges of the first portion.

The second portion also comprises two walls disposed at a distance from each other. The two walls of the second portion may be parallel to each other. The second portion may additionally comprise another or a third wall that connects the two walls and defines a generally U-shaped configuration of the second portion. The second portion may be designed with a plurality of mounting apertures through a thickness of the third wall of the second mounting portion. The second mounting portion may be designed with a first aperture through a thickness of the third wall of the second portion and a second aperture through a thickness of another wall of the second portion. The second aperture may be aligned with the first aperture. The another wall may be disposed adjacent and be connected to the third wall. The first aperture may be provided as a threaded aperture.

The third portion is disposed between and connects the first and second portions. The third portion comprises a sloped surface. The third portion may comprise two walls. The sloped surface may be integrated into one of the two walls. The third portion may have two sloped surfaces. Each sloped surface may be integrated into a respective wall from the two walls. The two walls may be sloped and parallel to each other. Sloped walls offset the first portion from the second portion.

The first mounting section may be designed with a hollow interior. Each of the first, second and third portions may include a portion of the hollow interior. The first mounting section may be manufactured as a one-piece component. The one-piece component may be manufactured by a casting process. The first mounting section may be designed with each portion being an independent component and being rigidly connected to remaining portions. The rigid connection may be manufactured by a welding process.

The second mounting section being disposed at a distance from the first mounting section along a length of the vehicle side sill. Thus, the second mounting section is separated by a void from the first mounting section. The second mounting section may include a first portion, a second portion, and a third portion connecting the first and second portions.

The first portion of the second end section may comprise two walls disposed at a distance from each other. The two walls may be parallel to each other. The two walls may define mounting flanges of the first portion.

The second portion of the second end section may also comprise two walls disposed at a distance from each other. The two walls of the second portion may be parallel to each other. The second portion may additionally comprise another or a third wall that the two walls and defines a generally U-shaped connects configuration of the second portion. The second portion may be designed with a plurality of mounting apertures through a thickness of a wall of the second mounting portion The second mounting portion may be designed with a first aperture through a thickness of the third wall of the second portion and a second aperture through a thickness of another wall of the second portion. The second aperture being aligned with the first aperture. The another wall may be disposed adjacent and be connected to the third wall. The first aperture may be provided as a threaded aperture.

The third portion of the second end section is disposed between and connects the first and second portions. The third portion comprises a sloped surface. The third portion may comprise two walls. The sloped surface may be integrated into one of the two walls. The third portion may have two sloped surfaces. Each sloped surface may be integrated into a respective wall from the two walls. The two walls may be sloped and parallel to each other. Sloped walls offset the first portion from the second portion.

The second mounting section may be designed with a hollow interior. Each of the first, second and third portions may include a portion of the hollow interior. The second mounting section may be manufactured as a one-piece component. The one-piece component may be manufactured by a casting process. The second mounting section may be designed with each portion being an independent component and being rigidly connected to remaining portions. The rigid connection may be manufactured by a welding process.

The brace may comprise a plurality of apertures. The brace may be designed with two or more wall defining a hollow interior of the brace. The plurality of apertures are formed through a thickness of one wall. The one wall is aligned with the third wall of the second portion of each of the first and second sections. Each aperture from the plurality of apertures may be provided as a threaded aperture. Each aperture from the plurality of apertures may be adapted with a threaded projection. Each aperture from the plurality of apertures may be adapted with a threaded nut.

The brace may comprise a plurality of first apertures through a thickness of one wall and a plurality of second apertures through a thickness of an adjacent wall. Each second aperture from the plurality of second apertures being aligned, along the length of the vehicle side sill, with one first aperture from the plurality of first apertures. A size of the brace in a plane normal to a length of the vehicle side sill may be smaller than a size of the first and second first portion. The brace may define a generally U-shaped configuration of the vehicle side sill. In a vehicle, the plurality of first apertures may be used for mounting, by way of fasteners, an energy source. The plurality of second apertures may be used as access apertures for a tool to reach a threaded nut or a head of a threaded bolt passed through a respective first aperture.

In a vehicle, the vehicle side sill is disposed longitudinally between the rear end and the front end of the vehicle. The first mounting section and the second mounting section extend upwardly to mount the vehicle side sill to another vehicle structure. Thus, the first and second portions of each of the first and the second mounting sections are offset from each other by the third portion in a vertical plane. The vehicle side sill may be referred to as a vehicle side rail or as a side rail for a vehicle.

A vehicle structure may be designed as a vehicle side sill with a first mounting portion, a second mounting portion, and a sloped surface connecting the first mounting portion with the second mounting portion. The first mounting portion may be designed with a first pair of flanges disposed at one end of the vehicle side sill and a second pair of flanges disposed at an opposite end of the vehicle side sill. The second mounting portion may be designed with a plurality of mounting apertures through a thickness of a wall of the second mounting portion.

The second mounting portion may be designed with a plurality of mounting apertures through a thickness of a first wall of the second mounting portion and a plurality of access apertures through a thickness of a second wall of the second mounting portion. Each access aperture from the plurality of access apertures being aligned with one mounting aperture from the plurality of mounting apertures. Each mounting aperture from the plurality of mounting apertures may be provided as a threaded aperture. Each mounting aperture from the plurality of mounting apertures may be adapted with a threaded projection. Each mounting aperture from the plurality of mounting apertures may be adapted with a threaded nut. The first wall may be disposed adjacent and connected to the first wall. The plurality of mounting apertures may be provided as threaded apertures. The sloped surface may be provided as a portion of a wall connecting the first and second mounting portions. The sloped surface may be provided as a portion of two walls connecting each pair of flanges of the first mounting portion with the second mounting portion.

In a vehicle, the vehicle side sill is directed longitudinally between the rear end and the front end of the vehicle. The vehicle side sill may be referred to as a vehicle side rail, as a side rail for a vehicle or as a vehicle side member.

A vehicle structure may be designed as a vehicle side rail with a main section, a first end section, a second end section, a cavity or a void between the first and second end sections and a plurality of apertures through a wall of the main section.

The first end section is disposed at one extremity of the main section and along a length of the main section. The first end section comprises two first flanges disposed at a distance from each other and at a distance from the main portion and two second flanges, each second flange sloped relative to the main portion and to a respective first flange. The second end section is disposed at another extremity of the main section and along the length of the main section, the second end section comprises two third flanges disposed at a distance from each other and at a distance from the main portion and two fourth flanges, each fourth flange sloped relative to the main portion and to a respective third flange. The two first flanges are being aligned with the two third flanges. The two second flanges being aligned with the two fourth flanges. The apertures are disposed at a distance from each other along the length of the main portion.

The vehicle side rail may further include another plurality of apertures through another wall of the main section, each aperture from the another plurality of apertures being aligned, along the length of the main portion, with one aperture from the plurality of apertures.

The first and second end sections may be designed to mount the vehicle side rail to another structure of the vehicle, as is described above. In other words, first and second end sections may be designed as mounting sections.

In a vehicle, the vehicle side rail is directed longitudinally between the rear end and the front end of the vehicle. The vehicle side rail may be referred to as a vehicle side sill or as a vehicle side member.

A vehicle structure may be designed with a first wall, a second wall, a third wall and a void. The first wall may have a first sloped portion mediate terminal edges of the first wall. The second wall may have a second wall with a second sloped portion mediate terminal edges of the second wall, the second wall disposed at a distance from the first wall, the second sloped portion disposed opposite the first sloped portion. The third wall connects one terminal edge of the first section with one terminal edge of the second section. The cavity is provided through each of the first and second walls, the cavity being in an open communication with an opposite terminal edge in each of the first and second portions. The vehicle structure may include a plurality of apertures through a thickness of the third wall that are disposed at a distance from each other along a length of the vehicle structure. The vehicle structure may include a first plurality of apertures through a thickness of the third wall and a second plurality of apertures through a thickness of one wall from the first and second wall, the second plurality of apertures being disposed adjacent to the third wall.

In a vehicle, the vehicle structure is directed longitudinally between the rear end and the front end of the vehicle.

A vehicle structure may be designed as a floor support with a plurality of first members and a plurality of second members. In a vehicle, the first members may be directed in a lateral direction of the vehicle and the second members are directed in a longitudinal direction of the vehicle. Each first member from the plurality of first members may be designed so that one end is rigidly connected to one vehicle side sill or side rail from the two vehicle side sills or side rails, as described above, and has another end rigidly connected to another vehicle side sill or side rail from the two vehicle side sills or side rails. The first member may be referred to as a cross member. The second member may be referred to as a brace.

The plurality of second members are disposed within gaps between a pair of adjacent first members and along lengths of the first members. Only one second member may be disposed between two first members. Two or more second member may be disposed at a distance from each other between two first members. Each second member from the plurality of second members has one end connected to one first member and has another end connected to an adjacent first member. The connection may be a permanent connection by a welding process when first and second members are manufactured from metal. The plurality of first members and the plurality of second members may be designed such that a thickness of the floor support is being 1.0 inch or less while meeting requirements of federal motor safety vehicle standard (FMVSS) 305. The plurality of first members and the plurality of second members may be designed such that a thickness of the floor support is being 0.5 inches or less while meeting requirements of the FMVSS 305.

Each first member may be designed with a main portion and two flanges, each flange upstands on the main portion at an edge thereof. The flange may be disposed at an incline to the main portion. The first member may be designed with two optional returned flanges. Each optional return flange extends outwardly from an edge of the flange. The optional return flanges define a hat-type first-section of the first member in a plane normal to a length thereof.

The second member may be also designed with a main portion and flanges extending outwardly at each edge of the main portion. A length of the second member is disposed normal to the length of the first member. A thickness of the second member is sized so as to be equal to or less than a thickness of the first member. Such thickness of the second member does not increase a thickness of the floor support.

The floor support may be provided as an assembly of first members and second members, as described above. The first members and second members may be manufactured from metal and welded to each other. Metal may be a steel. Metal may be an aluminum. Aluminum may reduce weight of the floor support. The vehicle structure may be provided as a casting. Casting may reduce manufacturing costs of the floor support.

The floor support may be adapted with an optional wheelchair tie-down mounting component. The wheelchair tie-down mounting component may be designed as an elongated member (strip) with a plurality of threaded receptacles disposed along a length of the elongated member. The threaded receptacle may be designed as a threaded aperture within a thickness of the elongated member. The threaded aperture may be a blind threaded aperture. The threaded receptacle may be provided as a threaded aperture within an abutment or protrusion on a surface of the elongated member. The threaded receptacle may be provided as a threaded nut on a surface of the elongated member. The wheelchair tie-down mounting component may be mounted on the main portion within the hollow interior of the first member. The wheelchair tie-down mounting component may be provided on a portion of first member from the plurality of first members. The wheelchair tie-down mounting components may be attached to some first members from the plurality of first members. The wheelchair tie-down mounting component may be provided as a plurality of threaded receptacles disposed on a surface of the first member without the elongated member. The optional wheelchair tie-down mounting component may be provided as a plurality of wheelchair tie-down mounting components.

The floor support may be designed with a plurality of optional stiffening components or stiffeners. A length of the stiffening component, when provided, may be equal to a length of the first member. Then the stiffening component may be also rigidly connected, for example by a welding process, to one or both side sills. The length of the stiffening component, when provided, may be smaller than the length of the first member. A cross-section of the optional stiffening component may be shaped similar to a cross-section of the first member but sized smaller to be positioned within a hollow interior of the first member. Furthermore, the optional stiffening component may be inverted during attachment so that a main portion of such optional stiffening component is disposed generally parallel to the main portion of the first member, while being disposed at a distance therefrom. Two optional stiffening components may be disposed within the hollow interior of one first member. One optional stiffening component may be disposed within the hollow interior of one first member in a combination with one optional wheelchair tie-down mounting component. The optional stiffening component may be also provided within one or more second members.

The floor support may be designed with first members only, particularly where the thickness of the floor support may be increased.

The floor support may be designed with first members and stiffening components and without the second members, particularly where the thickness of the floor support may be increased.

The floor support may be adapted with an optional wheelchair ramp mounting component. Such optional wheelchair ramp mounting component may be provided as one or more threaded receptacle.

This vehicle structure may be referred to as a vehicle floor support. This vehicle structure may be referred to as a vehicle subfloor. This vehicle structure may be referred to as a floor mounting component.

The vehicle structure may be further adapted with the side rail or side sill, as described above, at each lateral side, i.e. each end of the first member. The side rail or the side sill is directed along a longitudinal direction of the vehicle. The two vehicle side sills or side rails may be designed as mirror images of each other.

A vehicle structure may be designed as an assembly of a first floor section, such as the floor support described above, and a second floor section that extends from one end of the first floor section. An area of the second floor section may be sized smaller than an area of the first floor section. A first mounting bracket extends outwardly from one end of each vehicle side sill. The first mounting bracket comprises two first flanges spaced apart from each other and oriented along a length of a respective vehicle side sill. The two first flanges offset inwardly from the respective vehicle side sill and are connected to one end of the respective vehicle side sill with a first inclined section. A second mounting bracket extends outwardly from another end of the each vehicle side sill. The second mounting bracket includes two second flanges spaced apart from each other and oriented along the length of the respective vehicle side sill. The two second flanges offset inwardly from the respective vehicle side sill and are connected to an opposite end of the respective vehicle side sill with a second inclined section. Two third mounting brackets are also provided. Each third mounting bracket extends outwardly from the second inclined section. Each third mounting bracket includes an L-shaped flange. Two fourth mounting brackets extend outwardly from a distal edge of the second floor section. Each fourth mounting bracket includes two flanges spaced apart from each other and oriented along the distal edge of the second floor section. In the floor support, the two vehicle side sills, the plurality of cross members and the plurality of braces define a cavity of the floor, the cavity being sized to receive an energy source therewithin. The vehicle structure may further include elongated wheelchair tie-down mounting components within the first floor section, a length of each wheelchair tie-down mounting component disposed in a direction between the two vehicle side sills.

The vehicle structure may further include close-out panels upstanding along a periphery of the first and second floor sections.

The second floor section may include a step. The step may include openings for retractable wheelchair restraints.

The vehicle structure may be used to position an energy source under the first floor section between the vehicle side sills and attach a casing of the energy source to the vehicle side sills.

The energy source may be provided as a high voltage source. High voltage source may be an electric battery. The electric battery may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The electric battery may be designed as a single unit within a single-piece enclosure. The electric battery may be designed as an assembly of contained within a single piece or multi-piece enclosure. The individual batteries are electrically interconnected to achieve the desired voltage and capacity for a particular application. The electric battery may be of a type as used on Tesla vehicles. This electric battery may have a low profile, aiding in a reduction of a ground clearance.

The energy source may use a hydrogen fuel cell. The energy source may use a collection of hydrogen fuel cells. The collection of fuel cells may be referred to as a hydrogen fuel cell stack. The fuel cell may be designed with an anode, a cathode, and a catalyst that triggers the separation of electrons and protons from hydrogen gas pumped inside. Hydrogen is combined with oxygen inside the fuel cell stack to generate electricity via reverse electrolysis. The electrons are removed from the hydrogen gas, sent through the circuit to power the motor, and combine with oxygen on the other side of the circuit to form water vapor, which is vented via the car's exhaust. This energy source may further comprise a tank designed to store hydrogen.

The energy source may be designed as a combination of an electric battery, as described above, and hydrogen fuel cells, as described above.

This vehicle structure may be provided as a pre-assembled insert to modify an original manufacturing equipment (OEM) vehicle.

A vehicle structure may be designed as a vehicle floor with a floor support, as described above. The floor support may be referred to as a first floor section in this design. A second floor section is connected at a proximal edge thereof to the first floor section along one edge of the first floor section, a width of the second floor section being smaller than a width of the first floor section. The second floor section is disposed coplanar with the first floor section. The vehicle floor may be further adapted with close-out panels attached along a periphery of the first and second floor portions and extending upwardly.

A vehicle structure may be designed as a vehicle floor with a first floor section. The first floor section may include two vehicle components disposed at a distance from each other along a width of the first floor section, each vehicle component comprising a sloped surface, the sloped surface in both vehicle components defining a cavity, a plurality of cross members, each cross member from the plurality of cross members having one end rigidly connected to one vehicle component from the two vehicle components and having another end rigidly connected to another vehicle side sill from the two vehicle components, a plurality of braces disposed within gaps between a pair of adjacent cross members, each brace from the plurality of braces having one end connected to one cross member and having another end connected to an adjacent cross member; a wheelchair tie-down strips attached to some cross members from the plurality of cross members, where a thickness of the plurality of cross members and the plurality of braces being. 0.5 inches or less.

The vehicle floor may be further designed with a second floor section connected at a proximal edge thereof to the first floor section along one edge of the first floor section, a width of the second floor section being smaller than a width of the first floor section. Two first flanges are spaced apart from each other and oriented along a length of the respective vehicle component, the two first flanges offset inwardly from the respective vehicle component and connected to one end of the respective vehicle component with a first inclined section. Two second flanges are spaced apart from each other and oriented along the length of the respective vehicle component, the two second flanges offset inwardly from the respective vehicle component and connected to an opposite end of the respective vehicle component with a second inclined section. Two third flanges spaced apart from each other and oriented along a distal edge of the second floor section, each third flanges connected to a distal edge with a straight section. An L-shaped flange extends from each second inclined section. The two vehicle side sills, the plurality of cross members and the plurality of braces defining a cavity of the floor, the cavity being sized to receive an energy source cell therewithin.

A vehicle structure may be designed with two vehicle side sills, a plurality of cross members and a plurality of braces. Each vehicle side sill from two vehicle side sills is as described above, except that the vehicle side sills are a mirror image of each other. The two vehicle side sills are disposed at a distance from each other. The two vehicle side sills may be disposed at a distance from each other along a width of the vehicle body. The sloped surfaces in the vehicle side sills are disposed outwardly from each other to increase a width of a cavity in a bottom portion of the vehicle body under the plurality of cross members and the plurality of braces.

Each cross member may be the first member as described above. Each cross member from the plurality of cross members has one end rigidly connected to one vehicle side sill from the two vehicle side sills and has another end rigidly connected to another vehicle side sill from the two vehicle side sills.

Each brace may be the second member as described above. Each brace from the plurality of braces having one end rigidly connected to one cross member and has another end rigidly connected to another cross member.

The cross members and braces may be designed with a thickness of 0.5 inches or less. The cross members and braces may be designed with a thickness of 1.0 inch or less. In either design, the vehicle structure is sufficient to meet applicable vehicle standards.

A vehicle structure may be designed with two vehicle side sills, a plurality of cross members and a plurality of braces. Each vehicle side sill from two vehicle side sills may be designed as described above, except that the vehicle side sills are a mirror image of each other and are provided without mounting flanges and slopped surfaces or walls. In other words, a height of each side sill may be about equal to a thickness of the cross members and braces. The two vehicle side sills are disposed at a distance from each other. The two vehicle side sills may be disposed at a distance from each other along a width of the vehicle body. The sloped surfaces in the vehicle side sills are disposed outwardly from each other to increase a width of a cavity in a bottom portion of the vehicle body.

A vehicle structure may be designed as a vehicle chassis with two vehicle side sills disposed at a distance from each other along a width of the vehicle chassis, the two vehicle side sills directed in a longitudinal direction between a front end and a rear end of a vehicle. In view of the above, each vehicle side sill may be designed with a first mounting section, a second mounting section, the second mounting section being disposed at a distance from the first mounting section along a length of the vehicle side sill, and a brace connecting the first and second mounting sections and defining a generally U-shaped configuration of the vehicle side sill, each of the first and second mounting sections comprises a sloped surface with the slopped surfaces disposed outwardly from each. The vehicle chassis m also designed with a plurality of cross members. Each cross member from the plurality of cross members has one end rigidly connected to one vehicle side sill from the two vehicle side sills and has another end rigidly connected to another vehicle side sill from the two vehicle side sills.

The vehicle chassis may be also designed with a plurality of braces. Each brace from the plurality of braces having one end rigidly connected to one cross member and has another end rigidly connected to another cross member.

Each vehicle side sill may be adapted with a means for detachably fastening an energy source, as described above.

The means may include a plurality of mounting apertures in the each vehicle side sill, each mounting aperture from the plurality of mounting apertures alignable with an aperture in a flange extending from an enclosure of the energy source. The means may further include a plurality of access apertures in the each vehicle side sill, each access aperture from a plurality of access apertures being aligned, along the length of the each vehicle side sill, with a respective mounting aperture from the plurality of mounting apertures.

The means may include a plurality of threaded apertures in the each vehicle side sill, each threaded aperture from the plurality of threaded apertures aligned with an aperture in an electric battery cell flange.

The means may include a plurality of apertures in the each vehicle side sill, each aperture from the plurality of apertures aligned with an aperture in a flange extending from an enclosure of the energy source, and a plurality of threaded nuts, each threaded nut being rigidly attached to the vehicle side sill in an alignment with an aperture from the plurality of apertures.

The vehicle chassis may be further adapted with a floor mounting component attached to two vehicle side sills. The floor mounting component may be designed as an assembly of first members and second members being rigidly attached to each other. The floor mounting component may be designed with a thickness of 0.5 inches or less. The floor mounting component may be designed with a thickness of 1.0 inch or less.

A vehicle structure may be designed as a vehicle chassis with a front section designed to receive a front wheel set and a vehicle drive unit, with a rear section designed to receive a rear wheel set, the rear section being coplanar with the front section, and with a middle section. The middle section may be designed with two first components, a plurality of second components, each second component with one end rigidly connected to one first component from the two first components and with another end rigidly connected to another first component from the two first components, and a cavity defined by the two first components and the plurality of second components. The first components may be provided as a side rail or a side sill, as described above. Additional components may connect the two first components and the plurality of second components to front and rear sections in an offset relationship from a plane of the front and rear sections.

A vehicle structure may be designed with two side members, a plurality of first members and a plurality of second members. The two side members are disposed laterally at a distance from each other along a width of the vehicle structure. Each side member from the two side members is directed in a longitudinal direction between a front end of the vehicle and a rear end of the vehicle. The plurality of first members are disposed at a distance from each other along the longitudinal direction, each first member from the plurality of first members having one end rigidly connected to each side member. The plurality of second members are disposed at a distance from each other in gaps between two first members and rigidly attached to a respective pair of first members. The vehicle structure may further include a plurality of stiffeners, a stiffener from the plurality of stiffeners disposed within a thickness of a first member from the plurality of first members, the stiffener having an end connected to the each side member. The vehicle structure may further include a plurality of wheelchair tie-down mounting strips, each wheelchair tie-down mounting strip from the plurality of wheelchair tie-down mounting strips disposed within a thickness of the cross member from the plurality of cross members. The vehicle structure may further include a first flange upstanding on one end of the each side member and a second flange upstanding on a longitudinally opposite end of the each side member, each of the first and second flanges comprising a slopped portion.

A vehicle structure may be designed with an energy source, a plurality of first members and a plurality of second members. The energy source has an enclosure. The plurality of first members may be rigidly attached to the enclosure where the plurality of first members are disposed at a distance from each other. The plurality of second members are positioned, at a distance from each other, in gaps between two first members. The plurality of second members may be also rigidly attached to the enclosure and to the respective first members. The vehicle structure may further include a plurality of stiffeners where a stiffener from the plurality of stiffeners disposed within a thickness of a first member from the plurality of first members. The vehicle structure may further include a plurality of wheelchair tie-down strips where each wheelchair tie-down strip from the plurality of wheelchair tie-down strips disposed within a thickness of the cross member from the plurality of cross members.

A vehicle may be designed with a vehicle structure, as described above.

The vehicle may be an all-electric vehicle, also referred to as an EV. The electric vehicle may be a plug-in hybrid vehicle, also referred to as a PHEV. The EV and/or PHEV may be designed with regenerative braking system to charge the electric battery. The electric vehicle may be a hybrid vehicle (HEV), that utilizes multiple energy sources one of which is an electric drive unit. The electric drive unit can be also referred to as an electric drive motor. The electric drive unit can be also referred to as a propulsion.

The electric vehicle may be a fuel cell electric vehicle (FCEV) that uses fuel cells to power the electric drive motor. The electricity that is generated from the hydrogen fuel cells may power a direct current (DC) electric drive motor directly. The electricity that is generated from the hydrogen fuel cells may power an alternative current (AC) electric drive motor through an inverter. The FCEV may also include an electric battery. In this design, the electricity that is generated from the hydrogen fuel cells may charge an electric battery, for example such as the lithium-ion battery, that helps power the electric motor and can store the energy for later use. The electric battery may also capture power from the vehicle's regenerative braking system for later use and may store excess power from the fuel cell stack during low-energy driving.

The vehicle may be provided with an internal combustion engine. The above vehicle structure modifies such vehicle into an electric vehicle of into an electric hybrid vehicle.

The vehicle, as described above, may be designed with a floor surface at a height of more than 13.0 inches from a running surface and requiring a step at a door opening to reduce first step height to a height below 13.0 inches. The vehicle, as described above, may be designed with a floor surface at a height of less than 11.0 inches from a surface and not requiring a step at a door opening. The height may be measured from a running surface of the vehicle. The height may be measured from a surface other than the running surface. This surface may be a ground surface. This surface may be a platform surface.

An energy source, as described above, is received within a cavity of the body and under a floor support, the energy source being fastened to two vehicle side sills within the vehicle body, the energy source enclosure defining a ground clearance of between 4.0 inches and 7.0 inches. The ground clearance may refer to a distance between a lowermost point of the energy source enclosure and a running surface. The running surface may be a road surface. The ground clearance may vary depending on a laden condition of the vehicle.

In a vehicle, as described above, a vehicle floor is positioned on the floor support, the vehicle floor designed with grooves aligned with wheelchair tie-down mounting components (strips) within the floor support. The vehicle floor and, more particularly, a visible surface of the vehicle floor may define a single step between 8.0 inches and 13.0 inches from a ground. The vehicle floor and, more particularly, a visible surface of the vehicle floor may define a single step between 8.0 inches and 11.0 inches from a ground. Wheelchair tie-downs may be fastened to wheelchair tie-down mounting components within the floor support without a direct contact of fasteners with the energy source. The wheelchair tie-downs secure the vehicle floor to the floor support. The electric vehicle may be adapted with an optional wheelchair ramp mounted on the vehicle floor. An optional shield may be mounted to the vehicle side sills and a cradle of the electric drive unit to shield an exposed front portion of the energy source enclosure. The shield may be designed with a first flange configured to be attached to a drive unit cradle of the electric vehicle, a second flange disposed parallel to and a distance from the first flange, the second flange configured to contact an enclosure of an energy source, and a component connecting the first and second flanges therebetween, the component disposed at an incline to each of the first and second flanges. The shield provides a means for shielding an exposed end of the energy source installed in a vehicle.

A vehicle may be designed with an assembly of vehicle side sills and cross members, as described above. Two wheel assemblies may support the assembly of vehicle side sills and cross members. A drive unit may be mounted at a front end of the vehicle. The drive unit may be mounted at a rear end of the vehicle. The drive unit may be mounted on the assembly of vehicle side sills and cross members. The drive unit may be mounted undependably from the assembly of vehicle side sills and cross members. A passenger compartment is mounted on the assembly of vehicle side sills and cross members. An energy source is detachably attached to the assembly of vehicle side sills and cross members. A floor substrate is attached to the assembly of vehicle side sills and cross members. The floor substrate may be designed with first stiffening components disposed at a distance from each other. Each first stiffening component includes a first flange, a second flange, and a wall connecting the first and second flanges. Second stiffening components are disposed within gaps between the first stiffening components and at a distance from each other. Receptacles are mounted, in a series and at a distance from each other, to one of the first and second stiffening components within a thickness of the floor substrate and within a section of the floor substrate disposed above an enclosure of the energy source, each receptacle is designed with a blind threaded bore. A floor panel is positioned on the floor substrate. The floor panel includes groves within a thickness of the floor panel, each groove being aligned with a respective series of receptacles, the each groove comprising first apertures, each first aperture is aligned with one receptacle. A wheelchair tie-down track is positioned within one groove from the grooves, the wheelchair tie-down track comprising second apertures, each second aperture is aligned with one first aperture, the wheelchair tie-down track designed to detachably fasten the floor panel to the floor substrate. The floor substrate is designed to detachably fasten the floor panel with the wheelchair tie-down track without a contact of fasteners with an energy source enclosure mountable below the floor substrate. A thickness of the floor substrate may be 0.5 inches or less. A thickness of the floor substrate may be 1.0 inch or less. The floor substrate may be designed and mounted such that the floor panel defines a single step of between 8.0 inches to 13.0 inches from a running surface. The floor substrate may be designed and mounted such that the floor panel defines a single step of between 8.0 inches to 11.0 inches from a running surface. The running surface may be a ground surface. The vehicle may be designed with a single groove and a single wheelchair tie-down track sized and positioned sufficiently to detachably fasten the floor panel to the floor substrate.

The vehicle may be adapted with an optional wheelchair ramp mounted on the vehicle floor panel. In this design, the vehicle floor panel may be provided with one or more apertures exposing one or more threaded receptacles within the floor support. The vehicle floor panel may be designed with threaded receptacles within a thickness of the vehicle floor panel. The threaded receptacle may be a threaded aperture. Thus, the optional wheelchair ramp may be provided as above-floor mounted ramp. The vehicle may be adapted with an optional wheelchair lift mounted on the vehicle floor panel. Thus, the optional wheelchair lift may be provided as above-floor mounted lift. The optional wheelchair ramp or lift may be of a type as manufactured by MPower Engineering, Inc of Tarzana, California. The optional wheelchair ramp or lift may be of a type as manufactured by BraunAbility of Winamac, Indiana. The vehicle floor may be designed with a mounting provisions to attach the optional wheelchair ramp or optional wheelchair lift either at assembly or at a later date. The optional mounting provision may comprise threaded apertures within the floor thickness. The optional mounting provision may comprise threaded receptacles within the floor thickness. Threaded receptacles may be attached to the assembly of vehicle side sills and cross members.

An optional battery shield, as described above, may be mounted to the vehicle side sills and a cradle of the electric drive unit.

A vehicle may be designed with an assembly of vehicle side sills and cross members, as described above. Two wheel assemblies may support the assembly of vehicle side sills and cross members. A passenger compartment is mounted on the assembly of vehicle side sills and cross members. A drive unit is mounted at a front end of the vehicle. An energy source is detachably attached to the assembly of vehicle side sills and cross members. A floor substrate is attached to the assembly of vehicle side sills and cross members above an enclosure of the energy source. The floor substrate may be designed with first stiffening components disposed at a distance from each other. Each first stiffening component includes a first flange, a second flange, and a wall connecting the first and second flanges. Second stiffening components are disposed within gaps between the first stiffening components and at a distance from each other. Threaded receptacles are mounted, in a series and at a distance from each other, to one of the first and second stiffening components within the thickness of the floor substrate and within a section of the floor substrate disposed above a battery cell portion of an energy source. A floor is positioned on the first and second stiffening components, the floor includes groves within a thickness of the floor, each groove being aligned with a respective series of receptacles, the each groove comprising first apertures disposed in a series with each other along a length of the each groove. The floor may be provided as one or more vehicle floor panels, as described above. A wheelchair tie-down track is positioned within one groove from the grooves, the wheelchair tie-down track includes second apertures, each second aperture being in an aligned relationship with one first aperture. The floor substrate is designed to detachably secure, with the wheelchair tie-down track fastened to the receptacles, the floor to the first stiffening components without a contact of fasteners with the energy source enclosure sized and shaped to be positioned in a cavity under the floor substrate. More than one groove and wheelchair tie-down track may be provided. The vehicle may be adapted with an optional wheelchair ramp or an optional wheelchair lift mounted on the vehicle floor. An optional battery shield, as described above, may be mounted to the vehicle side sills and a cradle of the electric drive unit.

A vehicle may be designed with two vehicle components disposed parallel and at a distance from each other, the two vehicle components extending along a length of the vehicle. Two wheel assemblies may support the two vehicle components. An electric drive unit is mounted on the two vehicle components. A passenger compartment is also mounted on the two vehicle components. A floor substrate is detachably attached to the two vehicle members, the floor substrate includes a plurality of receptacles. An energy source with an enclosure, the enclosure rigidly attached to the two vehicle components and to the floor substrate. A floor is positioned on the floor substrate. The floor may be provided as one or more vehicle floor panels, as described above. The floor may include groves within a thickness of the floor, each groove comprising a series of first apertures along a length of the each groove, at least some of the first apertures being aligned with receptacles within the floor substrate. A wheelchair tie-down track may be positioned within one groove from the grooves, the wheelchair tie-down track comprising second apertures, each second aperture being in an aligned relationship with one first aperture. The vehicle may be adapted with an optional wheelchair ramp or an optional wheelchair lift mounted on the vehicle floor. An optional battery shield may be mounted to the vehicle side sills and a cradle of the electric drive unit.

A vehicle may be designed with a unibody with a passenger compartment, windows and a passenger door. Two wheel assemblies support the unibody. A floor, as described above and including the subfloor, is also provided, where a distance between an upper surface of the floor and a running surface being between 8.0 inches and 11.0 inches. An energy source is mounted below the floor. The energy source may be a low height profile electric battery as used on Tesla vehicles. The floor may be designed with a thickness sufficient to provides a clearance of no more than 4.0 inches between an enclosure of the energy source and a running surface. The floor may be designed with a thickness sufficient to provides a clearance of between 4.0 inches and 7.0 inches between an enclosure of the energy source and a running surface. A drive unit is operable from the energy source. A ramp assembly may be mounted on the floor, the ramp assembly, when fully deployed, assembly designed to provide a sloped surface between the floor and a ground surface with a slope being at least 1:6. The ground surface may be the running surface. The ground surface may be a curb adjacent a vehicle exterior. The ground surface may be a platform adjacent a vehicle exterior. Wheelchair tie-down tracks may be disposed within a thickness of the floor.

A vehicle compliant with American with Disability Act (ADA) requirements may be designed with a unibody with a passenger compartment, windows and a passenger door. Two wheel assemblies may support the unibody. A floor, as described above, is detachably attached to the unibody where a distance, aided by a low profile energy source and a low profile floor support, between an upper surface of the floor and a running surface being less than 11.0 inches. An energy source is also provided. A drive unit is operable from the energy source. A first mounting system is disposed within the unibody, the first mounting system is designed with sloped surfaces that offset a pair of mounting portions and that increase a space below the unibody to mount the energy source below the floor. The first mounting system is designed to allow access to the energy source. A second mounting system is disposed within the unibody, the second mounting system designed to fasten a ramp assembly to the floor above the energy source where first fasteners do not contact energy source enclosure. Wheelchair tie-down tracks are disposed within grooves in the floor, wheelchair tie-down tracks designed to detachably attach the floor to the unibody with second fasteners, where the second fasteners do not contact the enclosure of the energy source.

The vehicle, as described above may be manufactured by retrofitting (modifying) the stock configuration OEM vehicle with an internal combustion engine. Such OEM vehicle may be a RAM Promaster. Such OEM vehicle may be a Ford E-350 van.

Structural integrity of modified stock configuration OEM vehicle may be a subject to Altoona testing. Integrity of modified stock configuration OEM vehicle may be a subject to a structural strength test. Structural integrity of modified stock configuration OEM vehicle may be a subject to a distortion test. Structural strength and distortion tests may be in a compliance with Title 49, subtitle B, Chapter VI, subpart C, section 665.27 requirements.

The vehicle, as described above, may be also designed with an enlarged window opposite a passenger door. The enlarged window has a lower edge being disposed closer to the vehicle floor and below lower edge(s) of the remaining window(s). The lower edge is positioned sufficiently low to allow a wheelchair bound passenger to view exterior surroundings of the vehicle. The ability to view exterior surroundings of the vehicle may reduce if not eliminate a claustrophobic condition that may be experienced by a wheelchair bound passenger who is only able to see an interior wall surface of the vehicle or is only able to view a portion of the exterior surroundings due to a high side wall.

The vehicle, as described above, may be provided as a vehicle with a gross vehicle weight rating (GVWR) of 10,000 pounds or less. GVWR may refer to a maximum loaded weight under which the vehicle can safely operate.

A method of modifying a stock configuration OEM vehicle may include removing a portion of a vehicle floor structure, including vehicle chassis. Removing internal combustion engine and components associated with the internal combustion engine, for example such as an exhaust manifold. Rigidly attaching a vehicle structure into a space remaining after removal of the portion of the vehicle floor structure, the vehicle structure designed with vehicle side sills with sloped surfaces, a floor support with a thickness being less than 0.5 inches, the vehicle side sills defining a cavity under a floor support and the floor support being offset in a downward direction from a remaining original floor portion of the vehicle. Positioning an energy source into the cavity. Rigidly attaching the vehicle structure may include welding flanges to a remaining portion of the vehicle chassis. Fastening flanges of an enclosure of the energy source to the vehicle side sills. Optionally fastening the enclosure to the floor support. Fastening, with fasteners passed through apertures in elongated wheelchair tie-down mounting components and wheelchair tie-down tracks, a floor panel to the floor support without a contact of the fasteners with the enclosure. Installing an electric propulsion into a space previously occupied by the internal combustion engine. Installing a door system into a door opening partially defined by a low floor portion. This method results in converting the internal combustion wheeled vehicle with an original manufacturing equipment (OEM) floor into a low floor electric vehicle defining a first step of 8.0 inches to 11.0 inches. The first step may be measured from a running surface. The first step may be measured from a surface other than the running surface. This surface may be a ground surface. This surface may be a platform surface.

A method of modifying an OEM vehicle may include removing a portion of a vehicle floor. Removing a portion of a vehicle side wall. Removing a portion of vehicle side rails and cross members. Removing a cradle with an internal combustion engine. Installing an insert into a void within a vehicle, the void defined by a removed portion of the vehicle side rails and cross members and a removed portion of the vehicle floor, the insert comprising an insert subfloor offset downwardly from a remaining original portion of the vehicle floor. Detachably fastening, with fasteners, an enclosure of an energy source to vehicle members of the insert and to the insert subfloor. Detachably fastening, with wheelchair tie-downs and fasteners, an insert floor to an insert subfloor, the insert floor being disposed below a remaining portion of vehicle floor, the fasteners clearing the enclosure of the energy source. Attaching a ramp assembly with a foldable ramp to the insert subfloor. Installing another cradle with an electric drive unit (electric propulsion). Installing a door system into a door opening partially defined by a low floor portion. This method results in converting an OEM vehicle with a high floor and an internal combustion vehicle into an electric vehicle compliant with America Disability Act (ADA) requirements.

A method of modifying a stock configuration electric OEM vehicle may include removing an OEM energy source from the underside of the vehicle and removing a portion of a vehicle floor structure. Rigidly attaching a vehicle structure into a space remaining after removal of the portion of the vehicle floor structure, the vehicle structure designed with vehicle side sills with sloped surfaces, a floor support with a thickness being less than 0.5 inches, the vehicle side sills defining a cavity under a floor support and the floor support being offset in a downward direction from a remaining original floor portion of the vehicle. Positioning a new energy source into the cavity. Fastening flanges of an enclosure of the new energy source to the vehicle side sills. Optionally fastening the enclosure to the floor support.

Fastening, with fasteners passed through apertures in elongated wheelchair tie-down mounting components and wheelchair tie-down tracks, a floor panel to the floor support without a contact of the fasteners with the enclosure of the new energy source. Installing a door system into a door opening partially defined by a low floor portion. This method results in converting an OEM electric vehicle with a high floor into a low floor electric vehicle defining a first step of 8.0 inches to 11.0 inches from a running surface.

A method of designing an electric vehicle compliant with America Disability Act (ADA) requirements may be achieved by mounting a floor to define a first step of between 8.0 inches to 11.0 inches. Fastening the floor to a vehicle subfloor with wheelchair tie-down tracks, positioned within groove in a thickness of the floor, to the vehicle subfloor. Fastening an energy source to the subfloor to define a ground clearance of between 4.0 inches and 7.0 inches. Fastening a wheelchair ramp to a surface of the floor, the wheelchair ramp designed to provide a surface with a slope being at least 1:6.

A method of modifying an electric OEM vehicle may include removing an OEM energy source from the underside of the vehicle and removing a portion of a vehicle floor. Removing a portion of vehicle side rails and cross members. Installing an insert into a void within a vehicle, the void defined by a removed portion of the vehicle side rails and cross members and a removed portion of the vehicle floor, the insert comprising an insert subfloor offset downwardly from a remaining original portion of the vehicle floor. Detachably fastening, with fasteners, an enclosure of a new energy source to vehicle members of the insert and to the insert subfloor. Detachably fastening, with wheelchair tie-downs and fasteners, an insert floor to an insert subfloor, the insert floor being disposed below a remaining portion of vehicle floor, the fasteners clearing the enclosure of the new energy source. Attaching a ramp assembly with a foldable ramp to the insert subfloor. Installing a door system into a door opening partially defined by a low floor portion. This method results in converting an OEM electric vehicle with a high floor into a low floor electric vehicle compliant with America Disability Act (ADA) requirements.

The method, as described above, may further include attaching a shield to the another cradle, the shield designed to shield a front portion of the energy source protruding below the another cradle.

The method, as described may above, further include offsetting a portion of each vehicle member within the insert outwardly from each remaining vehicle member of the vehicle.

In the method, as described above, detachably fastening the floor insert may be achieved by providing the floor insert with grooves, each groove designed to receive a wheelchair tie-down track.

In the method, as described above, detachably fastening the floor insert may be achieved by fastening the floor insert comprises installing threaded receptacles within the insert subfloor.

In the method, as described above, installing the insert may be achieved by providing the insert subfloor with first and second stiffening components.

In the method, as described above, installing the insert may be achieved by positioning the insert floor at a distance between 8.0 inches and 11.0 inches from a running surface.

In the method, as described above, installing the energy source may be achieved by positioning a bottom surface of an enclosure of the energy source at a distance of between 4.0 inches and 7.0 inches from a running surface.

In the method, as described above, installing the electric propulsion may include electrically connecting the electric propulsion to the energy source.

In the method, as described above, installing the electric propulsion may include connecting electric propulsion to a vehicle computer.

In the method, as described above, installing the electric propulsion may include re-programming the vehicle computer to receive input signals from the electric propulsion.

In the method, as described above, installing the electric propulsion may include re-programming the vehicle computer to transmit output signals to the electric propulsion.

In the method, as described above, installing the insert may be achieved by installing a step between a surface of the remaining portion of the original vehicle floor and an insert subfloor, the step comprising a step surface.

In the method, as described above, installing the insert may be achieved by welding flanges of the insert to a vehicle frame of a vehicle chassis.

The method, as described above, may further include forming an aperture through a vertical surface, being normal to the step surface, and installing a retractable wheelchair restraint within the step, the wheelchair restraint accessible through the aperture.

The method, as described above, may further include installing a sliding plug door system in a door opening.

The method, as described above, may further include modifying a window of the vehicle disposed opposite the door opening by moving a lower edge of the window closer to a vehicle floor.

Now in a reference to the drawings.

FIG. 1 illustrates a perspective view of a vehicle structure 10 that includes extremities (ends) 12 and 14, a main section 20, a first flange 30, a second flange 40, a third flange 50 and a void 60 between the second and third flanges, 40 and 50 respectively.

The main section 20 is illustrated with a first edge 22 and a second edge 24. The main section 20 is also illustrated with two surfaces 26 and 28 that are disposed at a distance from each other to define a thickness of the main section 20. An optional fourth flange is referenced with numeral 62. An optional notch 64 may be also provided.

The first flange 30 is illustrated as a continuous flange extending from the first edge 22 of the main section 20 along a length of the main section 20. However, the first flange 30 may be provided in two or more sections and does not have to be a continuous flange.

The second flange 40 is disposed at one end, illustrated as the end 12, of the vehicle side sill 10 and of the main section 20. The second flange 40 has a first portion 42 and a second portion 44. The second portion 44 is designed as an inclined portion relative to each of the main section 20 and the first portion 42. The second flange 40 is illustrated as extending along a portion of a length of the main section 20.

The third flange 50 is disposed at an opposite end, illustrated as the end 14 of the main section 20. The third flange 50 has a first portion 52 and a second portion 54. The second portion 54 is designed as an inclined portion relative to each of the main section 20 and the first portion 52.

A plurality of apertures through a thickness of the first flange 30 are referenced with numeral 34.

A plurality of apertures through a thickness of the main section 20 are referenced with numeral 68. Thus, the vehicle side sill 10 is illustrated with the plurality of first apertures 32 and the plurality of second apertures 68.

This vehicle structure may be referred to as a vehicle side rail. This vehicle structure may be referred to as a vehicle side sill.

FIG. 2 illustrates a perspective view of a vehicle structure 70 that includes extremities (ends) 72 and 74, a main section 80, a first flange 90, a second flange 1000, a third flange 110 and a void 120 between the second and third flanges, 100 and 110 respectively. The main section 80 is illustrated with a first edge 82 and a second edge 84. The main section 80 is also illustrated with two surfaces 86 and 88 that are disposed at a distance from each other to define a thickness of the main section 80. An optional fourth flange is referenced with numeral 122.

The first flange 90 is illustrated as a continuous flange extending from the first edge 82 of the main section 80 along a length of the main section 80. However, the first flange 90 may be provided in two or more sections and does not have to be a continuous flange.

The second flange 100 is disposed at one end, illustrated as the end 72, of the vehicle side sill 70 and of the main section 80. The second flange 100 has a first portion 102 and a second portion 104. The second portion 104 is designed as an inclined portion relative to each of the main section 80 and the first portion 102. The second flange 100 is illustrated as extending along a portion of a length of the main section 80.

The third flange 110 is disposed at an opposite end, illustrated as the end 74 of the vehicle side sill 70 and of the main section 80. The third flange 110 has a first portion 112 and a second portion 114. The second portion 114 is designed as an inclined portion relative to each of the main section 80 and the first portion 112. The flange 100 is illustrated as extending along a portion of a length of the main section 80.

A plurality of apertures through a thickness of the first flange 90 are referenced with numeral 94.

This vehicle structure may be referred to as a vehicle side rail. This vehicle structure may be referred to as a vehicle side sill.

FIG. 3 illustrates a partial perspective view of the vehicle side sill 10 of FIG. 2. A plurality of projections are illustrated as threaded nuts 34, each aligned with a respective aperture 32. Plurality of threaded nuts 34 may be also provided on the vehicle side sill 70.

FIG. 4 illustrates a perspective view of a vehicle structure 130 that is designed as a combination of the vehicle structure 10 of FIG. 1 and the vehicle structure 80 of FIG. 2.

FIG. 5 illustrates an end view of the vehicle side sill 130 of FIG. 4. The first flanges 30 and 90 are illustrated as overlapping each other. One of the main sections 20, 80 may be designed without a first flange, where the vehicle structure 130 only includes one wall, either 30 or 90.

FIG. 6 illustrates a perspective view of a vehicle structure 150 that includes extremities (ends) 152 and 154 and terminal edges 156 and 158.

The vehicle structure 150 is also illustrated with a first section 160, a second section 170, and a middle or a third section 180. The middle or third section 180 may be referred to as a brace between the first section 160 and the second section 170.

The first section 160 is illustrated with a first portion 162, a second portion 164, and a third portion 166. The first portion 162 may comprise two walls 162A disposed at a distance from each other.

The second portion 164 also comprises two walls 164A disposed at a distance from each other. The two walls of the second portion may be parallel to each other. The second portion may additionally comprise another or a third wall 164B that connects the two walls 164A and defines a generally U-shaped configuration of the second portion.

The third portion 166 is disposed between and connects the first and second portions, 162 and 164 respectively. The third portion 166 may also comprise two walls 166A that are both illustrated as sloped walls.

The first section 160 is illustrated with a hollow interior 168.

The second section 170 being aligned and coplanar with the first section 160 along a length of the vehicle side sill 150. The second section 170 may be designed with a first portion 172, a second portion 174, and a third portion 176. The first portion 172 is illustrated with two walls 172A disposed at a distance from each other.

The second portion 174 is also illustrated with two walls 174A disposed at a distance from each other. The second portion may additionally comprise another or a third wall (not shown in FIG. 6) that connects the two walls 174A and defines a generally U-shaped configuration of the second portion.

The third portion 176 is disposed between and connects the first and second portions, 172 and 174 respectively. The third portion 176 is illustrated with two sloped walls 176A.

The second section 170 is illustrated with a hollow interior 178.

The third section 180 joins first and second sections, 160 and 172 respectively. The third section is illustrated with two walls 182 disposed at a distance from each other to define a hollow interior 188 of the third section 180. Access apertures 66, as described above, are illustrated through a thickness of one wall 182. Mounting apertures 32, 94 of FIGS. 1 and 2 are not illustrated in FIG. 6. When mounting apertures 32, 94 are provided as threaded apertures, the access apertures 68 may not be required.

FIG. 6 further illustrates that the first and second sections, 160 and 170 respectively, are aligned with each other and being separated with a void 190. As illustrated, the void 190 is through a portion of the vehicle structure 150 that include first portions 162 and 172 as well as the third portions 166 and 176.

In a further reference to FIG. 6, first, second and third sections, 160, 170 and 180 respectively, may include a portion of the terminal edge 156. Furthermore, the third section 180 may include the second portion 164 of the first section 160 and the second portion 174 of the second section 170. In other words, the first section 160 may be only designed with the first portion 162 and the third portion 166 and the second section 170 may be only designed with the first portion 172 and the third portion 176.

FIG. 7 illustrates a perspective view of a vehicle structure 200 with a first mounting portion 210, a second mounting portion 220, and a sloped surface 230 connecting the first mounting portion 210 with the second mounting portion 220. The first mounting portion is illustrated with a first pair of flanges 212 disposed at one extremity (end) 202 of the vehicle side sill 200 and a second pair of flanges 214 disposed at an opposite extremity (end) 204 of the vehicle side sill 200. The second mounting portion 220 may be designed with a plurality of mounting apertures 32, 92 through a thickness of a wall of the second mounting portion, as described above.

The second mounting portion may be designed with a plurality of mounting apertures 32, 94 through a thickness of a first wall of the second mounting portion and a plurality of access apertures 68 through a thickness of a second wall of the second mounting portion. The sloped surface 230 may be provided as a portion of a wall connecting the first and second mounting portions, 210 and 220 respectively. The sloped surface is illustrated as two sloped walls connecting each pair of flanges of the first mounting portion with the second mounting portion.

FIG. 8 illustrates a perspective view of a vehicle structure, that may be referred to as a floor support 250 for a vehicle. The floor support 250 is illustrated with a plurality of cross (first) members 260. Each cross member 260 from the plurality of cross members 260 is designed to have one end being rigidly connected to one vehicle side sill from the two vehicle side sills, for example such as the vehicle side sill 130 as described above, and to have another end being rigidly connected to another vehicle side sill from the two vehicle side sills. There is also a plurality of braces (second members) 270 disposed within gaps between a pair of adjacent cross members 260.

Each cross member 260 may be designed with a main portion 262 and two flanges 264, that are disposed at an incline to the main portion 262. The cross member 260 is illustrated with two optional returned flanges 266.

The brace 270 is also illustrated with a main portion 272 and flanges 274 extending outwardly at each edge of the main portion 272. Optional return flanges are referenced with numerals 276.

Optional wheelchair tie-down mounting component is referenced with numeral 280 and is illustrated with a plurality of threaded receptacles 284 on an elongated member (strip) 282. The wheelchair tie-down mounting components 280 are illustrated as being attached to some cross members 260. The threaded receptacles 284 may be attached directly to a surface of the cross member 260. Threaded receptacles may be provided as threaded nuts. The elongated member (strip) 282 does not has to be a continuous component and each threaded receptacle may be mounted on an individual components or may be attached directly to the cross member 260. The elongated member 282 allow to provide the wheelchair tie-down mounting component 280 as a subassembly and simplify positioning the optional wheelchair tie-down mounting component 280 in a proper position on the cross member 260.

Optional stiffening components are referenced with numerals 290. A cross-section of the optional stiffening component is illustrated with a main portion 292 and two inclined flanges 294.

Optional apertures are referenced with numerals 298. The optional apertures 298 may be used to attach an enclosure of an energy source to the floor support 250.

Figure 9:
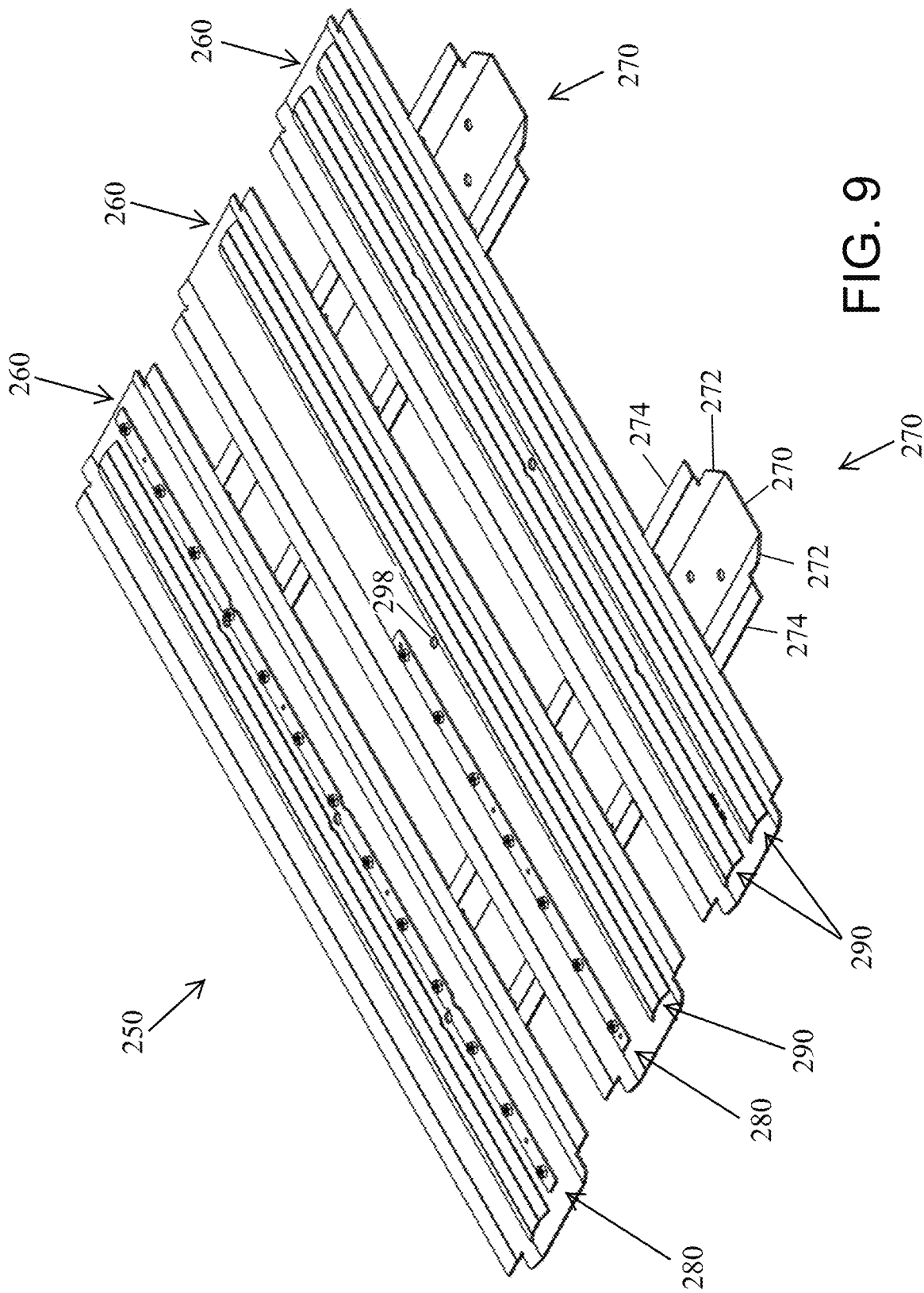
FIG. 9 illustrates a perspective view of the floor support of FIG. 8.

FIG. 9 illustrates another perspective view of the floor support of FIG. 8.

Figure 10:
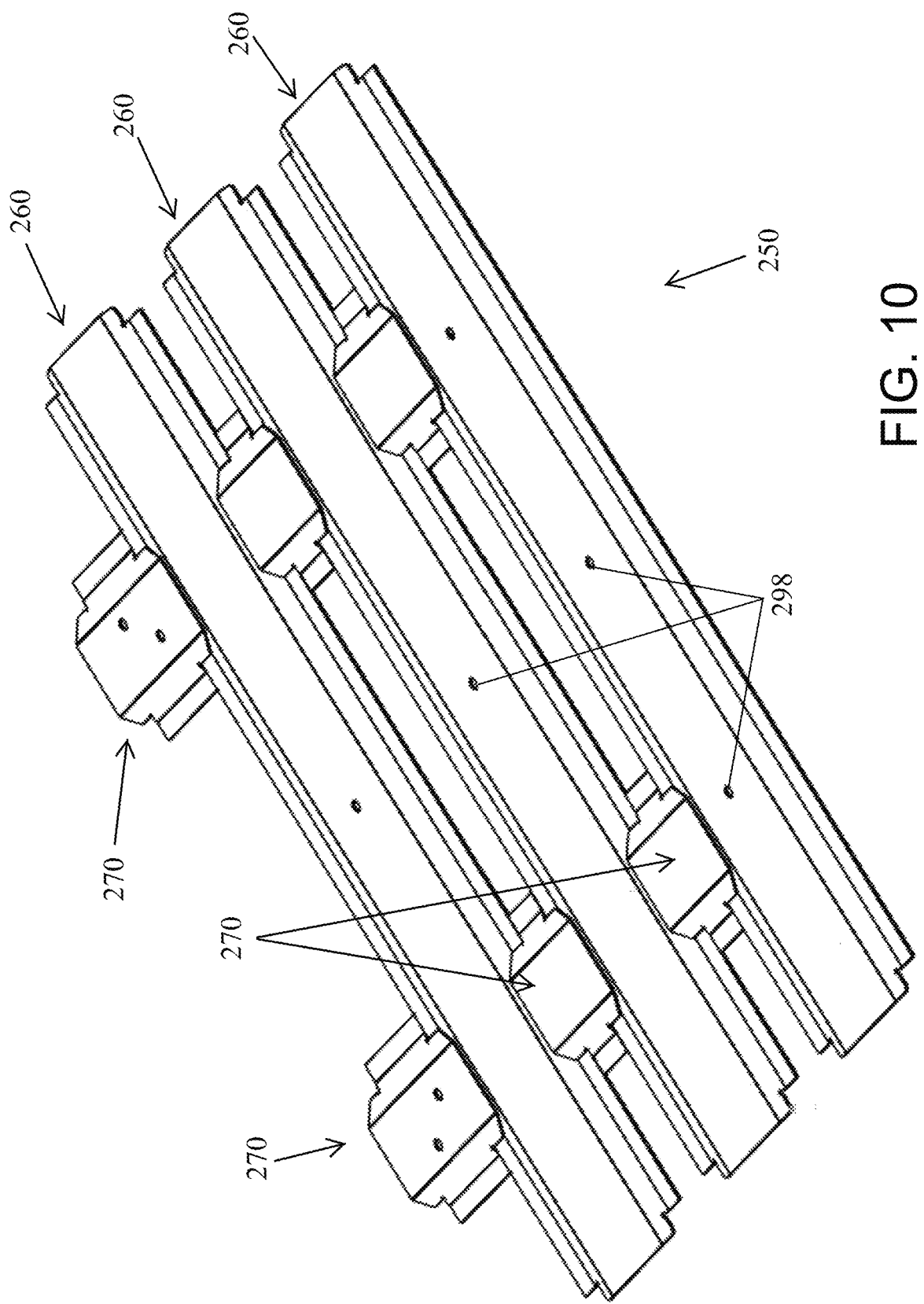
FIG. 10 illustrates a perspective view of the floor support of FIGS. 8-9.

FIG. 10 illustrates another perspective view of the floor support of FIGS. 8-9. FIG. 10 illustrates a bottom view of the floor support 250 when installed into a vehicle. FIG. 10 also illustrates that braces 270 may be of different lengths. The optional apertures 298 are also illustrated.

Figure 11:
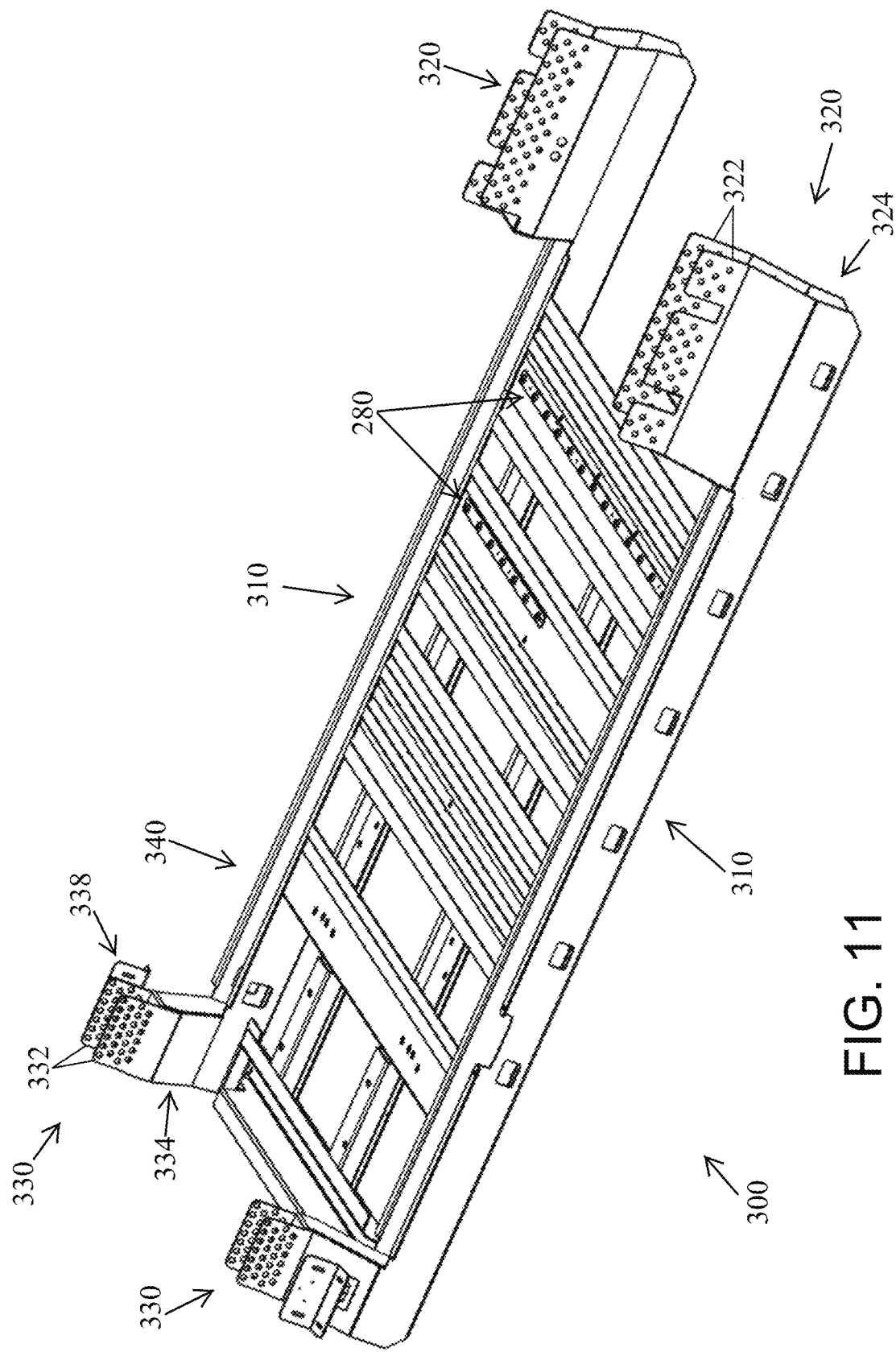
FIG. 11 illustrates a perspective view of a floor support assembly.

FIG. 11 illustrates a perspective view of a vehicle structure, that may be referred to as a floor support assembly 300 for a vehicle with two vehicle side sills 310 and a floor support 250, as described above. The vehicle structure may also be referred to as a vehicle frame. The vehicle side sills 310 may be provided as any side sill 130, 150 and 200 described above. The vehicle side sills 310 in FIG. 11 are mirror images of each other. Each vehicle side sill 310 defines a first mounting bracket 320 that extends outwardly from one end of each vehicle side sill 310. The first mounting bracket 320 comprises two first flanges 322 spaced apart from each other and oriented along a length of a respective vehicle side sill 310. The two first flanges 322 are offset inwardly from the respective vehicle side sill and connected to one end of the respective vehicle side sill with a first inclined section 324. A second mounting bracket 330 extends outwardly from another end of the each vehicle side sill 310. The second mounting bracket 330 includes two second flanges 332 spaced apart from each other and oriented along the length of the respective vehicle side sill 310. The two second flanges 332 offset inwardly from the respective vehicle side sill 310 and connected to an opposite end of the respective vehicle side sill 310 with a second inclined section 334. Two third mounting brackets 338 extend outwardly from two second flanges 332. Each third mounting bracket 338 is illustrated as an L-shaped flange. The floor support assembly 300 may be also designed with an additional floor support 340, also including cross members and braces. The floor support assembly 300 is illustrated with wheelchair tie-down mounting components 280 disposed in a direction between the two vehicle side sills 310.

FIG. 12 illustrates a side view of the floor support assembly 300 of FIG. 11.

FIG. 13 illustrates an end view of the floor support assembly 300 of FIG. 11. FIG. 13 also illustrates that the sloped surface offsets portion 344 outwardly from a portion 342. Such offsets define an enlarged space 346 that allows mounting of a larger energy source. Larger energy source may increase an operating range of the vehicle between recharging.

Figure 14:
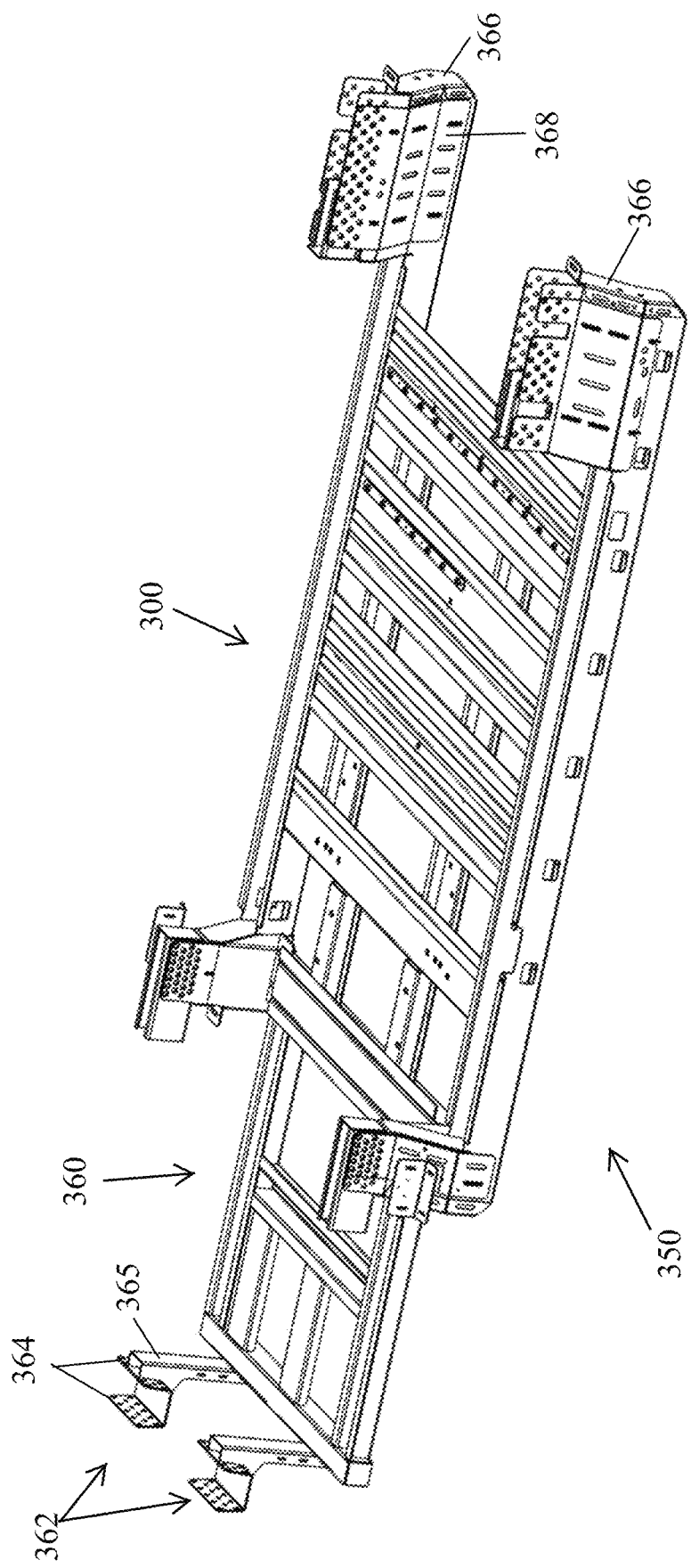
FIG. 14 illustrates a perspective view of a vehicle floor assembly.

FIG. 14 illustrates a perspective view of a vehicle floor assembly 350 that includes the floor support assembly 300 of FIGS. 11-13. The floor support assembly 300 may be referred to as a first floor section 300. The vehicle floor assembly 350 is also illustrated with a second floor section 360 that extends from the first floor section 300. Optional fourth mounting brackets 362, defined by two spaced apart flanges 364, are also illustrated as being upstanding from the second floor section 360 on supports 365. FIG. 14 also illustrates optional components 366 to attach the vehicle floor assembly 350 to a vehicle structure and optional reinforcing components 368.

Figure 15:
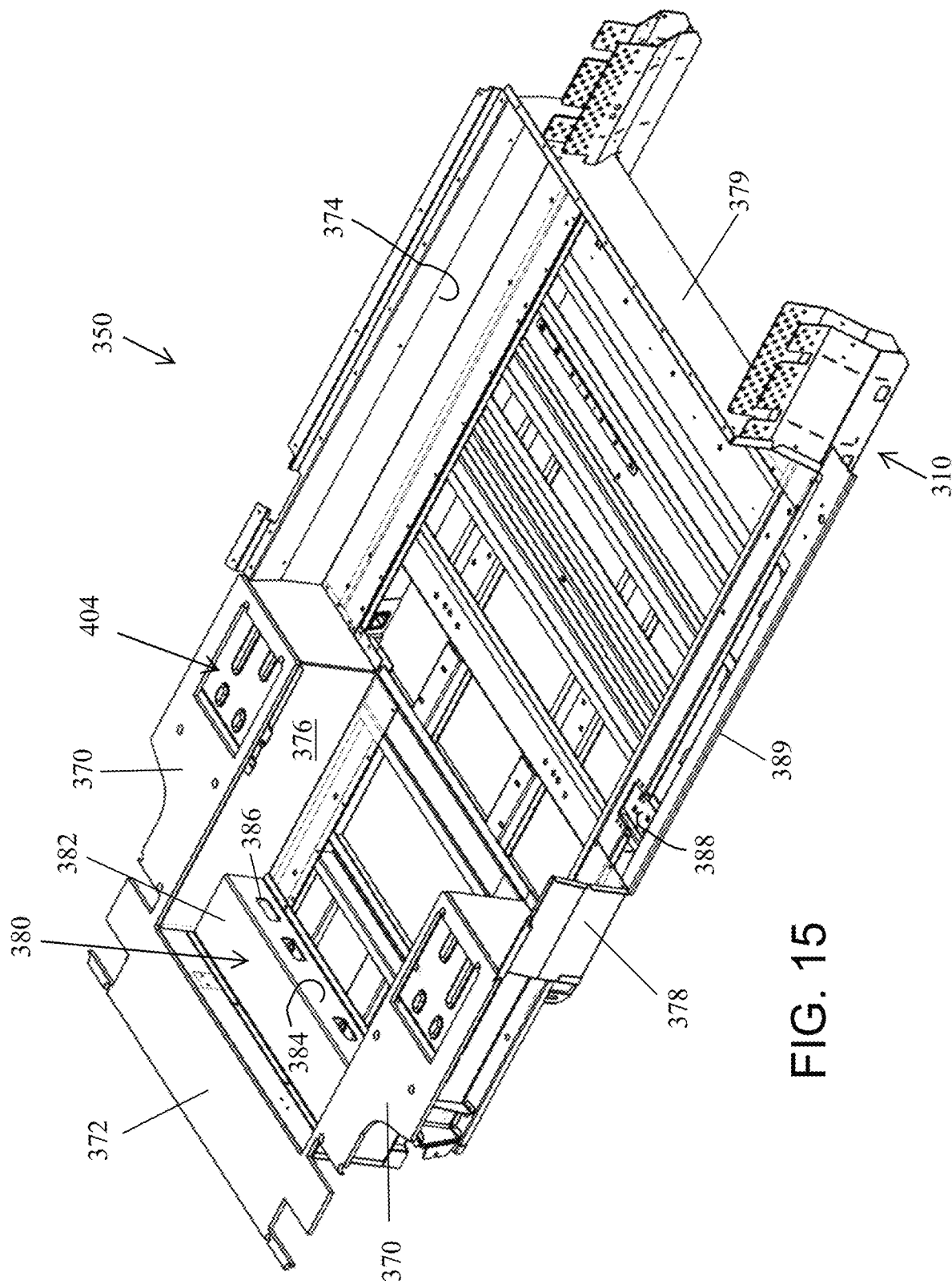
FIG. 15 illustrates a perspective view of a vehicle floor assembly.

FIG. 15 illustrates a perspective view of a vehicle floor assembly 350 of FIG. 14 adapted with floor panels 370, and 372 as well as various close-out panels 374, 376, 378 and 379. FIG. 15 also illustrates a step 380 with a horizontal step surface 382 and a vertical wall 384. Openings 386 are provided within the vertical wall 384 to access retractable wheelchair tie-down assemblies (not shown) within the step 380. An optional floor support 389 extends from one vehicle side sill 310. An optional mounting provision 388 for a retractable latch is also illustrated. Seat mounts 404 are also illustrated.

Figure 16:
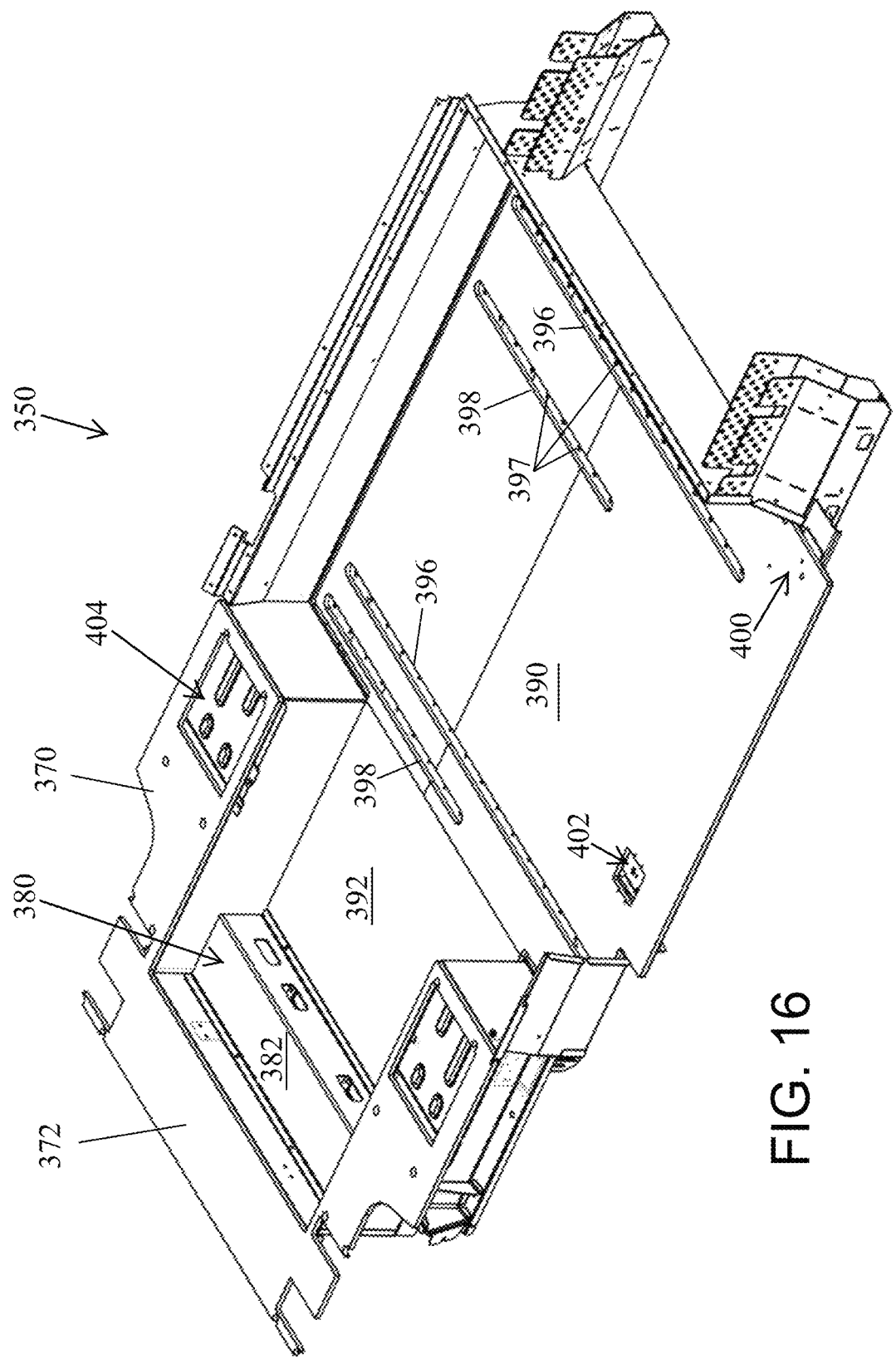
FIG. 16 illustrates a perspective view of a vehicle floor assembly.

FIG. 16 illustrates a perspective view of a vehicle floor assembly 350 of FIGS. 14-15 being further adapted with floor panels 390 and 392. Floor panel 390 are illustrated with grooves 396 and 398 to access wheelchair tie-down mounting components 280 that are also used to detachably fasten the floor panel 390 to the floor support 250 that can be also referred to as a subfloor. A plurality of apertures 397 are aligned with threaded receptacles 284. Also illustrated are a wheelchair ramp mount 400 and a cut-out 402 to access an optional ramp latch mounting 288. The optional latch (not shown) may be of a retractable type and may be used with the wheelchair ramp. The floor panels 390 and 392 define a low floor portion and the floor panel 372 defines a high floor portion. The floor panel 290 may be provided by two or more floor panel sections.

Figure 17:
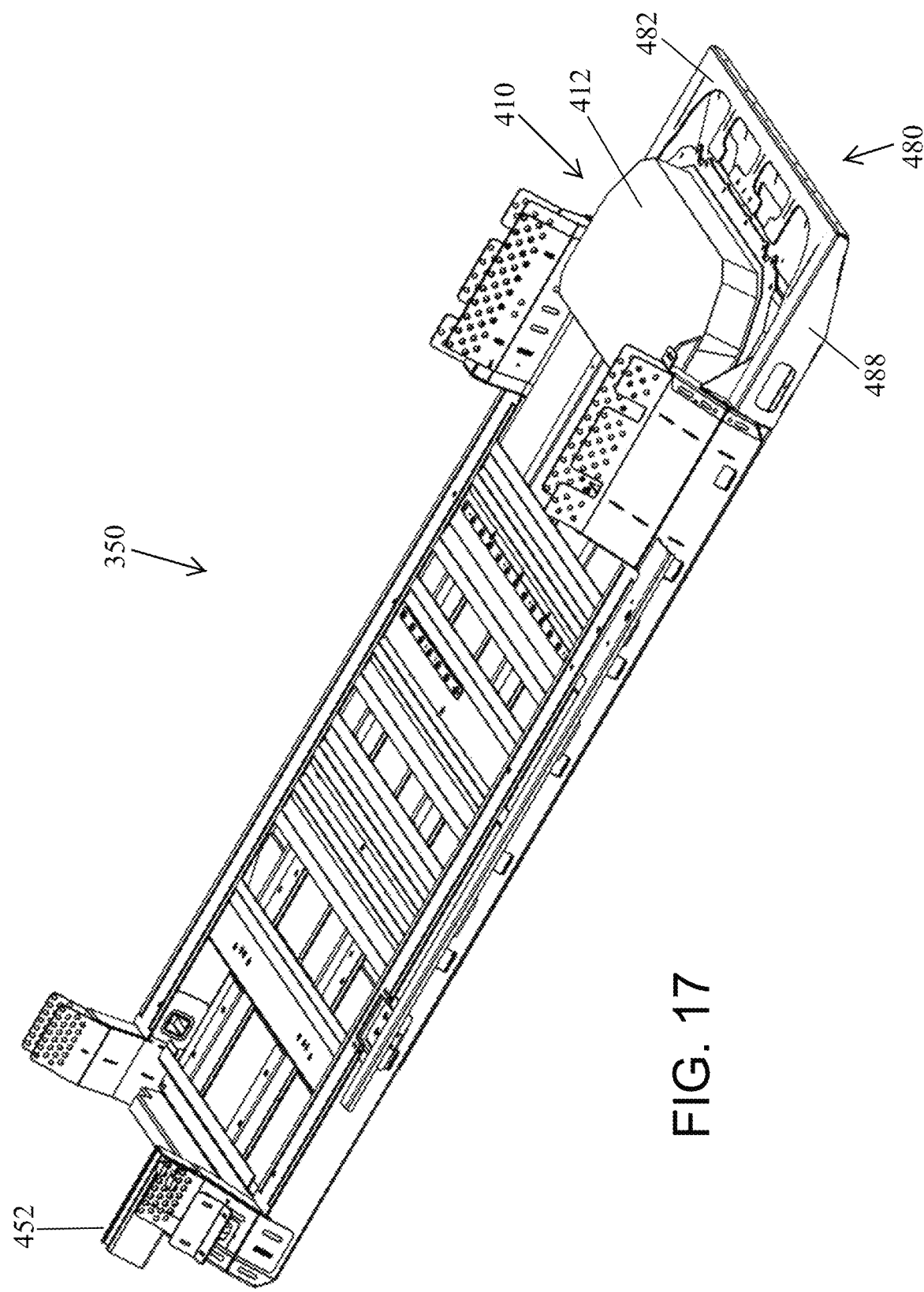
FIG. 17 illustrates a perspective view of the vehicle floor assembly with an energy source.

FIG. 17 illustrates a perspective view of a vehicle floor assembly 350, as described above, with an energy source 410. A portion 452 of a vehicle chassis is also illustrated. The energy source is illustrated as an electric battery. A module 412 of the electric battery is illustrated as being positioned toward a front of the vehicle. The module 412 contains power electronics for the energy source. When the vehicle floor assembly 350 is used to retrofit an internal combustion original equipment manufacturer (OEM) vehicle into an electrically driven vehicle, the module 412 may be position in a space occupied by a gas fuel tank of the OEM vehicle. The orientation can be reversed, where the module 412 of the energy source being oriented toward the rear of the vehicle. The energy source may be of a hydrogen fuel cell type, as described above. Hydrogen tank may be designed to fit under the vehicle's floor in a single piece enclosure with fuel cells. Hydrogen tank may be designed to fit under the vehicle's floor in a separate enclosure that. Hydrogen tank may be designed to fit in a different portion of the vehicle.

Figure 18:
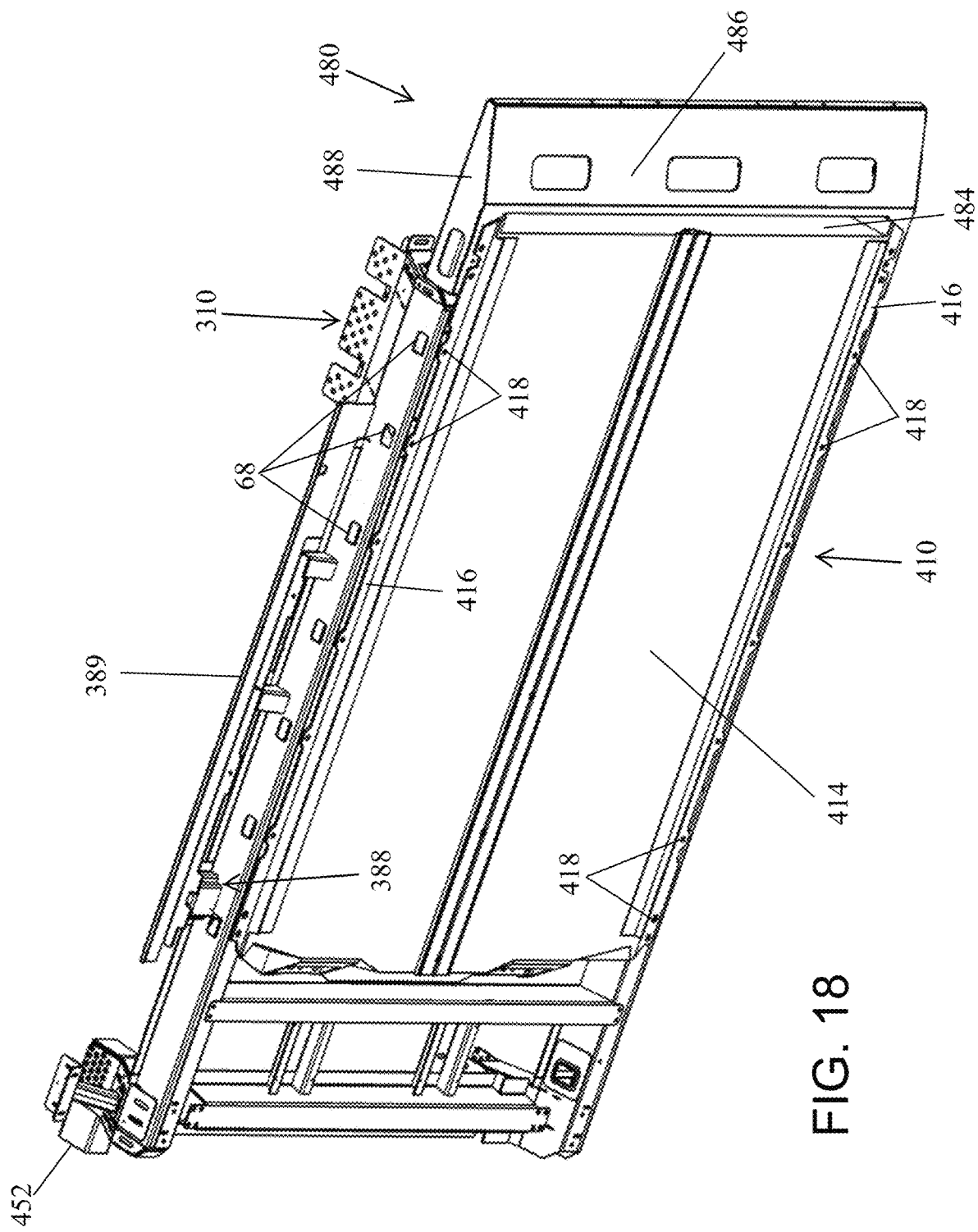
FIG. 18 illustrates another perspective view of the vehicle floor assembly with an energy source.

FIG. 18 illustrates a perspective view of a vehicle floor assembly 350, as described above, with the energy source 410 attached to the vehicle floor assembly 350 at flanges 416 extending from the battery enclosure 414. Mounting apertures 418 in the flanges 416 align with the apertures 32, 94 in the vehicle side sills. Access apertures 68 are also shown when the electric battery 410 is to be fasten to the vehicle side sills 310 with threaded bolts and nuts.

FIGS. 17-18 illustrates an energy source shield 480 that may be designed with a first flange designed to be attached to a drive unit cradle of a vehicle, with a second flange 484 designed to contact the enclosure 414 of an energy source 410 and a component 486 connecting the first and second flanges therebetween, the component 486 disposed at an incline to each of the first and second flanges, 482 and 484 respectively. The energy source shield 480 is thus configured to shield an exposed front end of the energy source 410 which is partially received in a cavity below the assembly of first and second members, 260 and 270 respectively. Optional components 488 may be provided at each side of the energy source shield 480 to attach the energy source shield 480 to each vehicle side sill 310. Inclined orientation of the component 486 improves flow of air under the vehicle.

Figure 19:
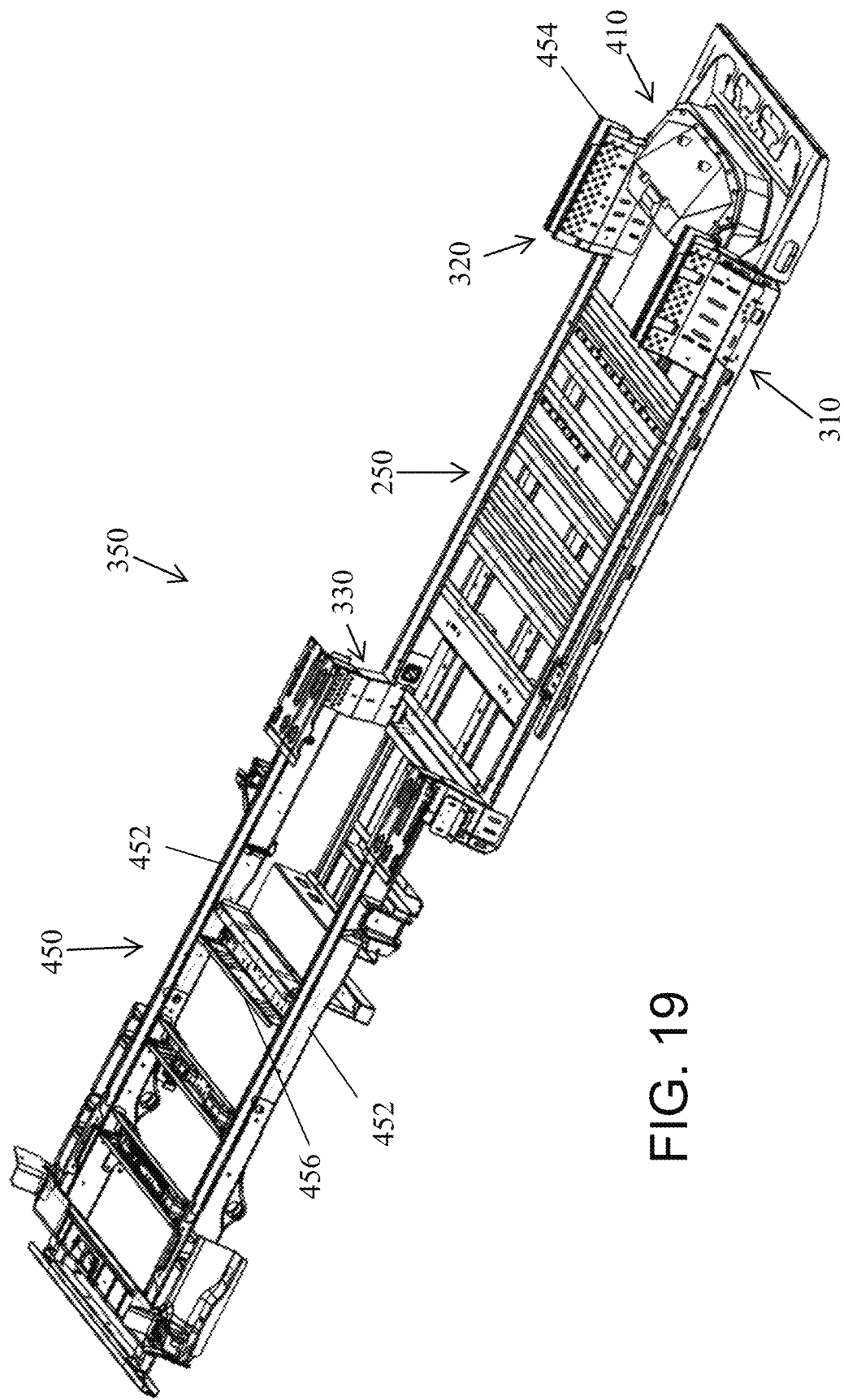
FIG. 19 illustrates a perspective view of a vehicle floor assembly.

FIG. 19 illustrates a perspective view of a vehicle floor assembly 350, as described above, provided as a component of a vehicle chassis 450. The vehicle chassis 450 defines side components 452 that run between a front end and a rear end of the vehicle and that are disposed at a distance from each other along a width of the vehicle. A portion of such elongated side component 452 was earlier illustrated in FIG. 17. Each side component 452 defines a front portion 454. The vehicle chassis 450 also is designed with cross members, for example such as cross member 456. The vehicle floor assembly 350 is integrated into the vehicle chassis 450 where the mounting bracket 320 is attached to one front portion 454, the mounting bracket 330 is attached to a remaining portion of one elongated side component 452 and the optional fourth mounting bracket 362 is attached to the cross member 456. Side components 452 may define a high floor section of the vehicle as compared with a low floor section defined by the vehicle floor assembly 350.

The vehicle floor assembly 350 may be referred to as a chassis insert or as an insert. The vehicle chassis may be referred to as an underbody of the vehicle.

Figure 20:
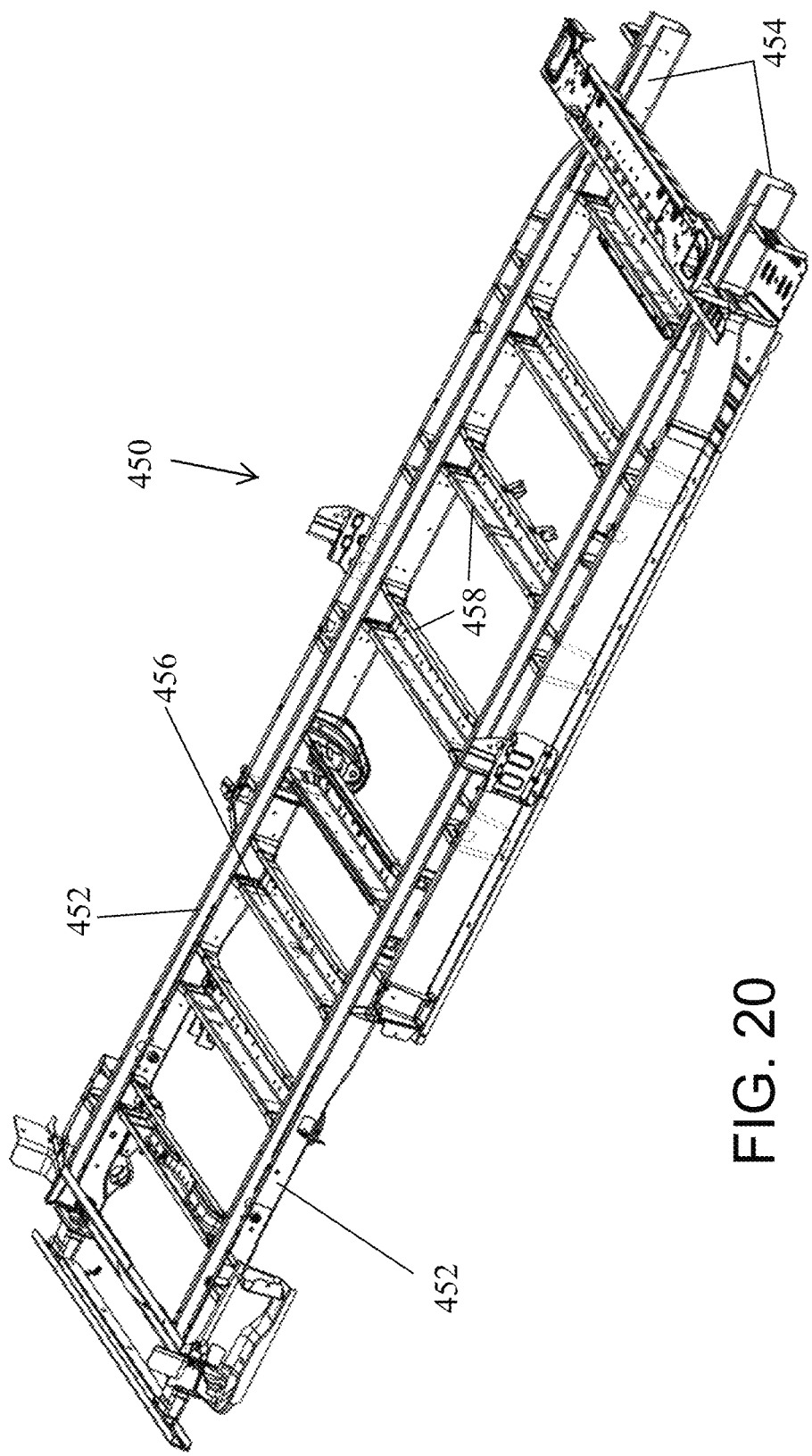
FIG. 20 illustrates a perspective view of a vehicle chassis.

FIG. 20 illustrates a perspective view of the vehicle chassis 450 prior to being modified by the vehicle floor assembly 350. In relevant parts, the vehicle chassis 450 includes two side components 452, each with the front portion 454 and a plurality of cross-members 456, 458. FIGS. 19 and 20 also illustrate a conversion of a chassis in an OEM vehicle into a chassis with a low floor portion.

Figure 21:
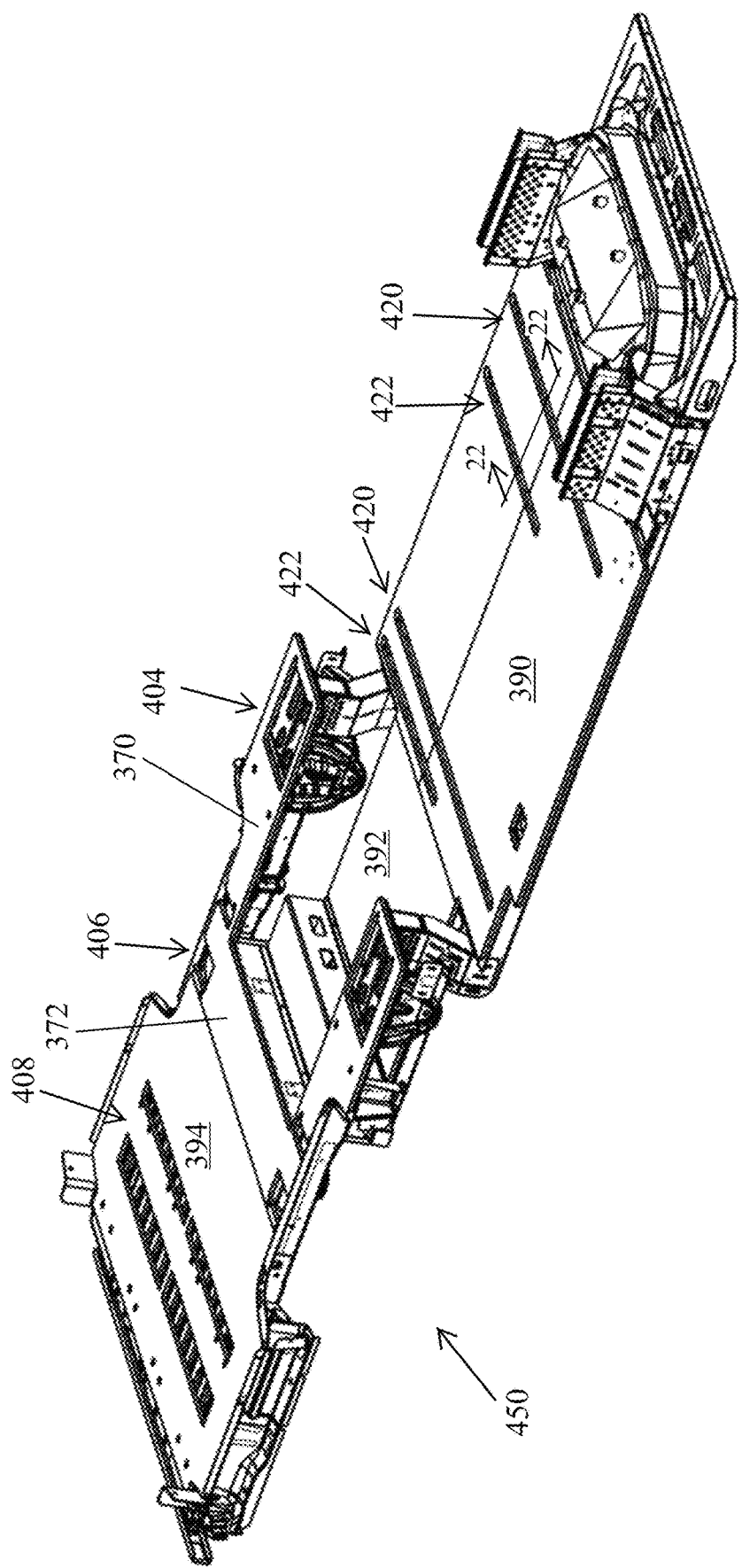
FIG. 21 illustrates a perspective view of vehicle floor assembly and the vehicle chassis.

FIG. 21 illustrates a perspective view of vehicle floor assembly 350 and the vehicle chassis 450 with floor panels 370, 372, 290, 392, and 394. Seat mounts 404, 406 and 408 are also illustrated. Wheelchair tie-down tracks 420 and 422 are also illustrated. Wheelchair tie-down tracks 420 and 422 may differ therebetween in lengths. Wheelchair tie-down tracks 420 and 422 may differ therebetween in appearance when being sourced from different manufacturers.

Figure 22:
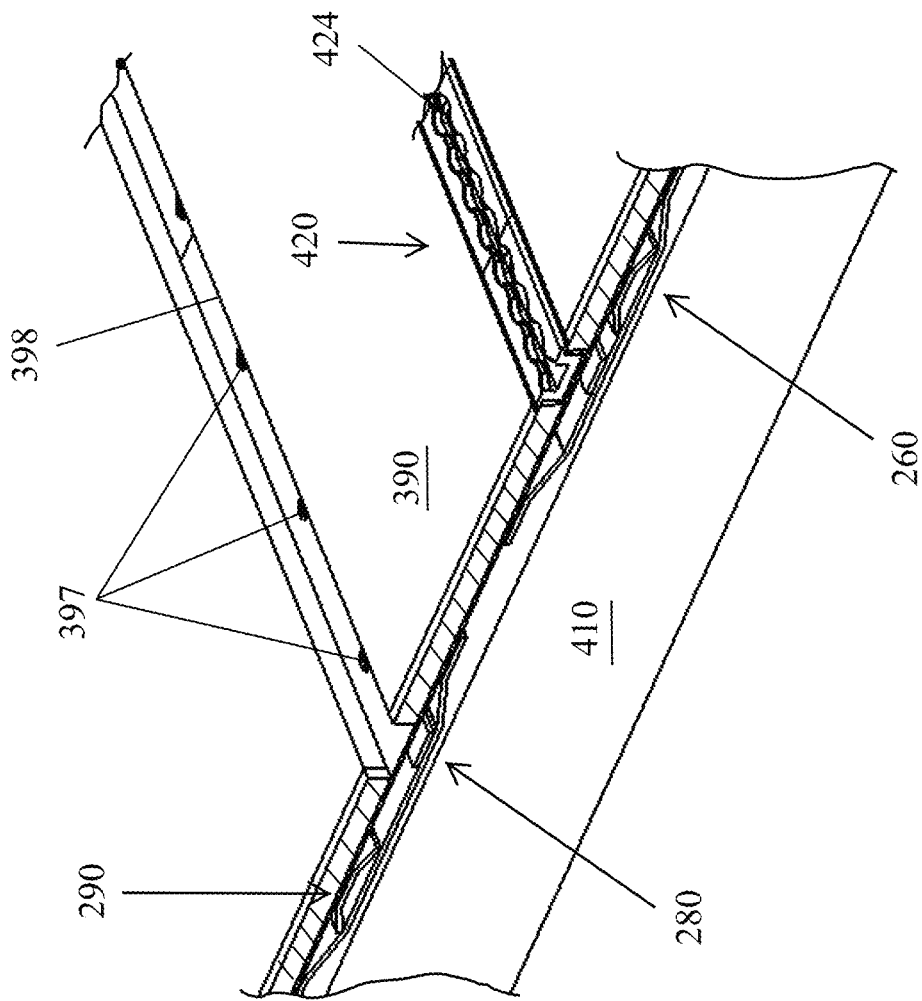
FIG. 22 illustrates a partial cross-sectional view of the vehicle floor assembly of FIG. 21 along lines 22-22.

FIG. 22 illustrates a partial cross-sectional view of the vehicle floor assembly of FIG. 21 along lines 22-22. A wheelchair tie-down track 422 is seated in the groove 398 within the floor panel 390. The groove defines a thickness portion of the floor panel 390 between the wheelchair tie-down track 422 and the threaded receptacles 284. Apertures (may be referred to as second apertures) 424 in the wheelchair tie-down track 422 are aligned with apertures 397 (may be referred to as first apertures) within the groove 398 that, in turn, are aligned with the threaded receptacles. The same arrangement is used to mount longer wheelchair tie-down track 420.

Figure 23:
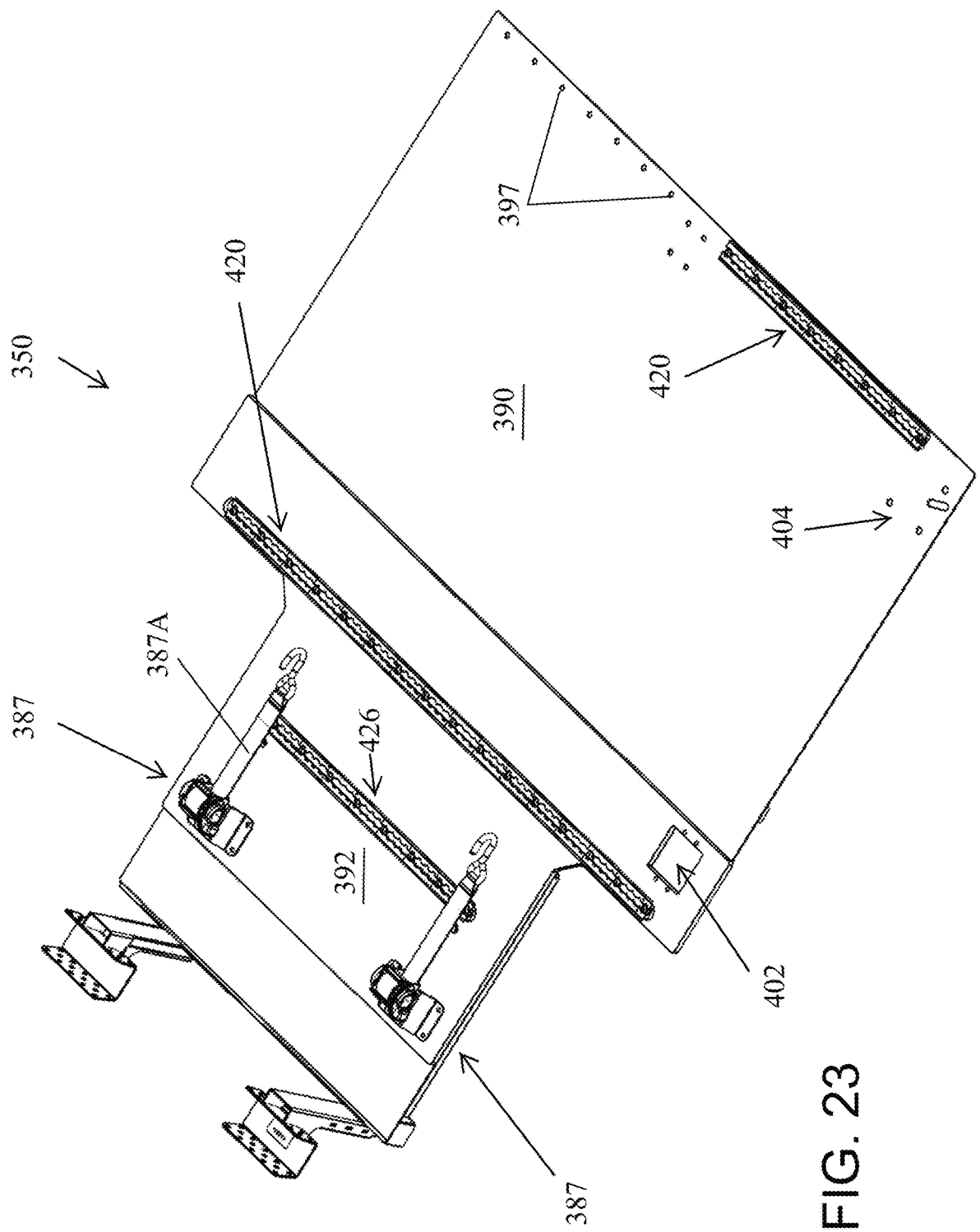
FIG. 23 illustrates a partial perspective view of vehicle floor assembly of FIG. 21.

FIG. 23 illustrates a partial perspective view of vehicle floor assembly 350, and illustrating retractable wheelchair restraints 387. Strap 387A is being shown in an extended position as to engage a portion of the wheelchair. The step components 382 and 384 are being omitted in FIG. 23 for the sake of clarity. An optional wheelchair tie-down strip 426 may be positioned adjacent the step 380.

Figure 24:
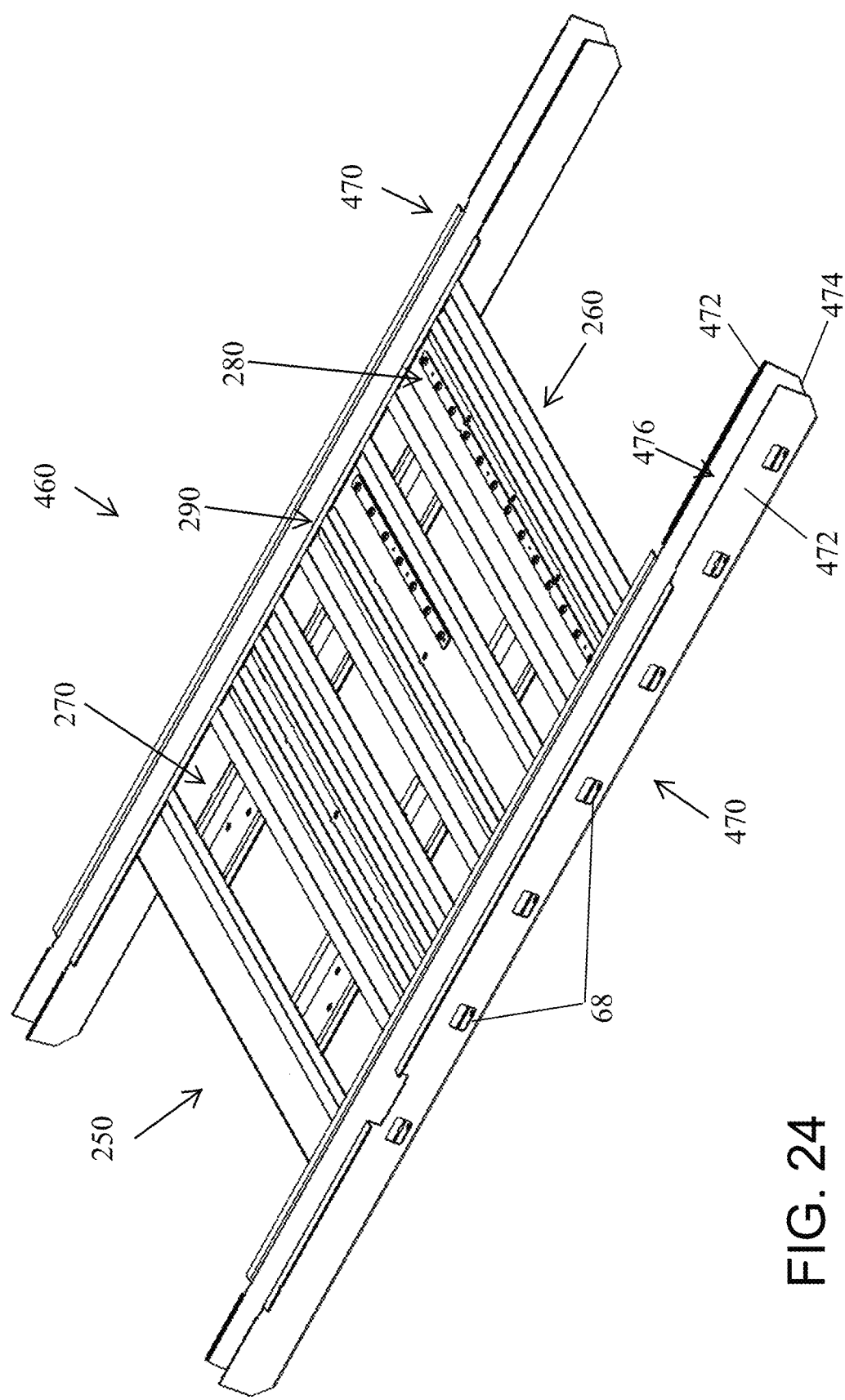
FIG. 24 illustrates a perspective view of a floor support assembly with two members at lateral sides.

FIG. 24 illustrates a perspective view of a vehicle structure 460 that includes the floor support 250, as described above, adapted with two vehicle side members (rails) 470, each at a lateral edge of the floor support 250. Each vehicle side member 470 is illustrated with two walls 472, disposed at a distance with each other and another wall 474 that joins the two walls 472 to define an interior 476 of the vehicle side member 470. Thus, the vehicle side member 470 may be designed as an open channel. It will be understood that the vehicle side member 470 may be designed essentially identical to the vehicle side rail 310, as described above, except for absence of the upstanding flanges, for example such as 320 and 330 of FIG. 11. However, it will be understood that the upstanding flanges may be attached to the vehicle structure 460 or that the vehicle structure 460 and, more particularly, the vehicle side member 470 may be attached to a portion of the vehicle to form a low floor portion. The vehicle structure 460 may be used on vehicles that do not require a high floor area. In other words, the vehicle may be designed as a vehicle with a low floor throughout the interior compartment. The vehicle structure 460 and the vehicle side member 470 may be lengthened in a longitudinal direction with addition of the first members 260 and second members 270. The vehicle structure 460 and vehicle side member 470 may be lengthened in a longitudinal direction with addition of cross members 456. The vehicle structure 460 and the vehicle side member 470 may be lengthened in a longitudinal direction with addition of the first members 260, the second members 270 and the cross members 456. In the lengthened design, the first members 260 and second members 270 may be used in a floor portion designed to attach the energy source 410 thereto. Wheelchair tie-down mounting strips 280 are also illustrated. Optional apertures 68 are also illustrated through a thickness of the wall 472, which defines an exterior wall of the vehicle structure 460. The above described apertures 32, 94 may be also provided through a thickness of the wall 474 so as to attach the energy source under the floor support 250. The open channel design of the vehicle side member 470 may be closed with an additional component. The vehicle side member 470 may be provided as a tubular member.

Figure 25:
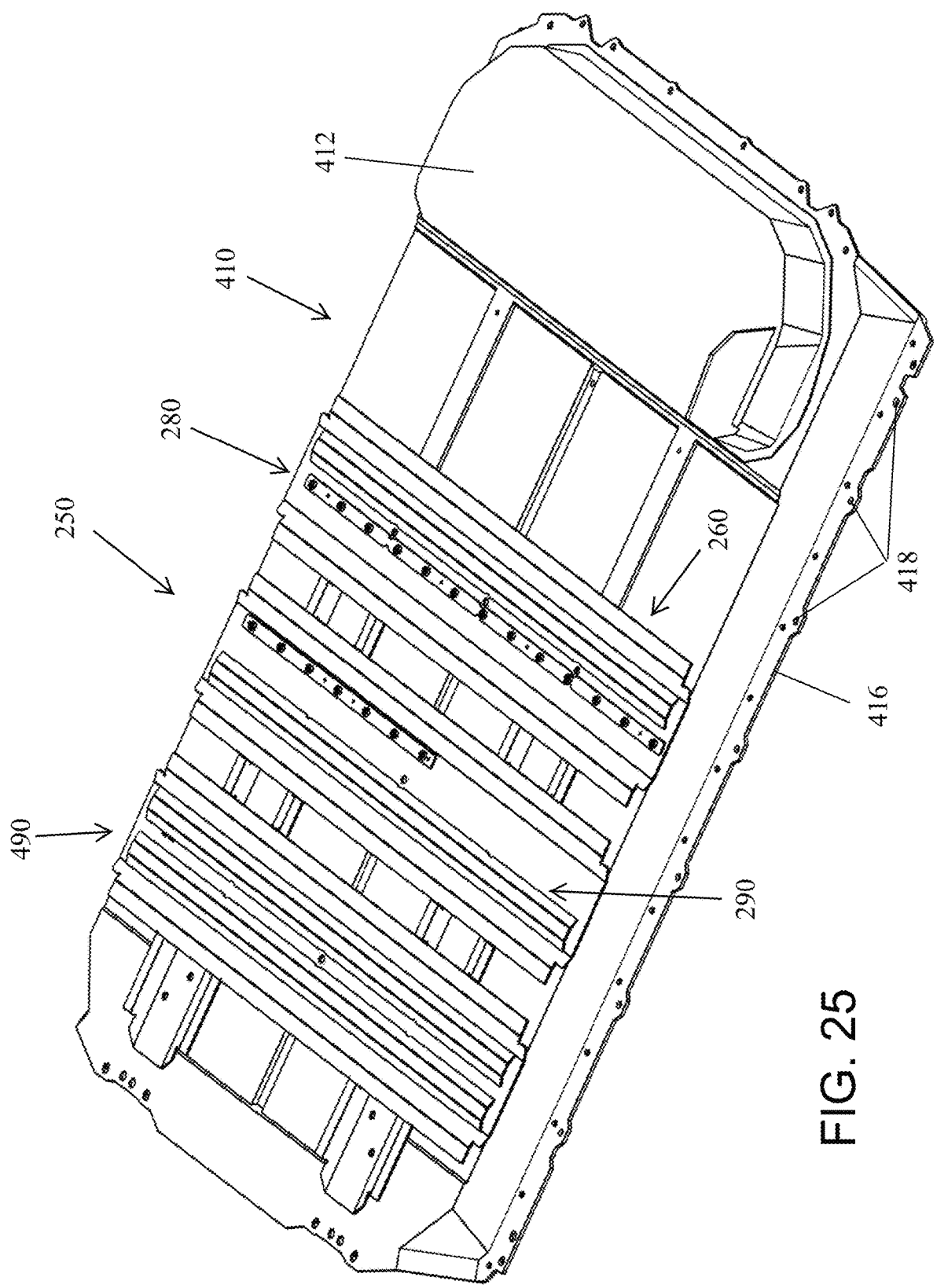
FIG. 25 illustrates a perspective view of a vehicle structure with a floor supported assembly integrated into an enclosure of an energy source.

FIG. 25 illustrates a perspective view of a vehicle structure 490 with a floor support 250, as described above, integrated into an enclosure 414 of an energy source 410, as described above. In this design, the first members 260 and the second members 270 are rigidly and permanently attached to an exterior surface of the enclosure 414, for example by a welding method. Ends of each first member 260 may be rigidly, directly and permanently attached to side members, for example such as side members 310 and 470, as described above. Ends of each first member 260 may be rigidly, indirectly and detachably attached to side members, for example such as side members 310 and 470, as described above, with intermediate components and fasteners.

Figure 26:
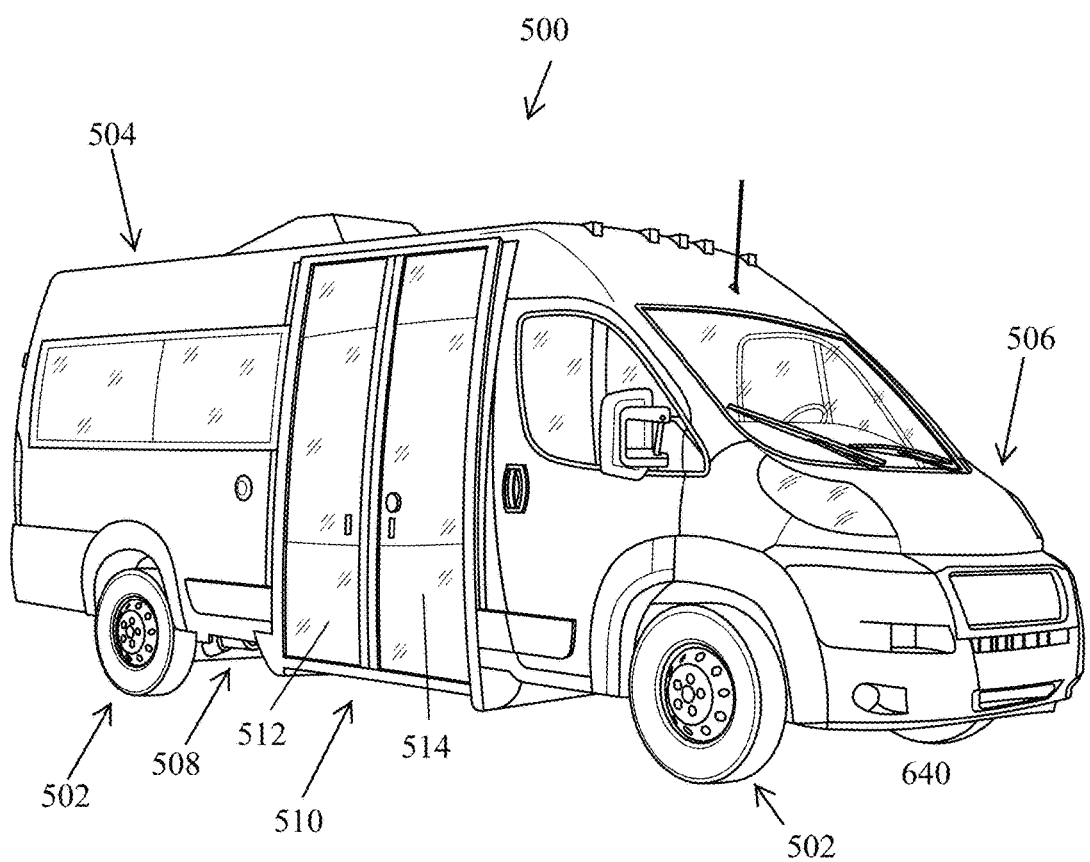
FIG. 26 illustrates a perspective view of a vehicle with doors in a closed position.

FIG. 26 illustrates a perspective view of a vehicle 500 with two wheel assemblies 502 supporting an assembly of vehicle side sills and cross members 508. The assembly of vehicle side sills and cross members 508 may be the chassis 350, as described above. A passenger compartment 504 is mounted on the assembly of vehicle side sills and cross members 508. A drive unit 506 is mounted at a front end of the vehicle 500. An energy source 410 is detachably attached to the assembly of vehicle side sills and cross members, as described above. The vehicle 500 is further illustrated with a door system 510. The door system 510 is illustrated with a pit of doors 512 and 514 in a closed position. The drive unit 506 may be mounted at a rear end of the vehicle 500. Two drive units may be provided, one at the front end and one at the rear end.

Figure 27:
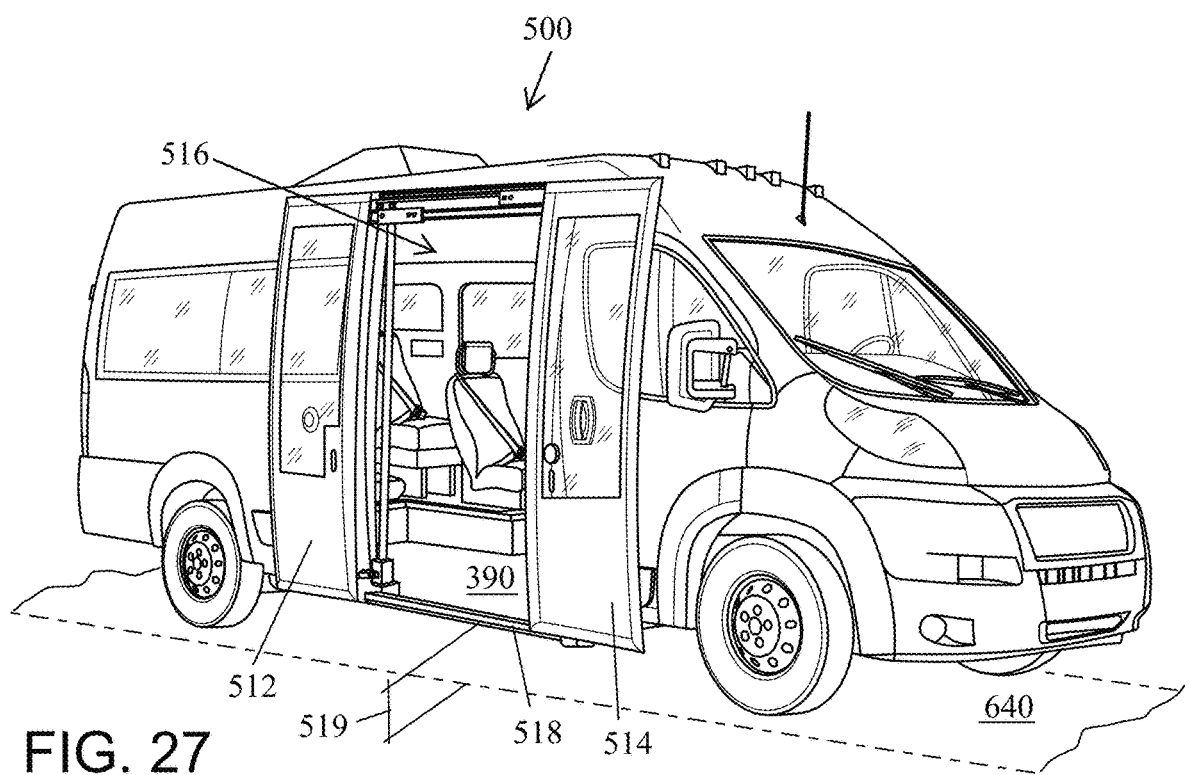
FIG. 27 illustrates a perspective view of a vehicle with doors in an open position.

FIG. 27 illustrates a perspective view of the vehicle 500 with doors 512 and 514 being in an open position, exposing a door opening 516, and a threshold 518 defining a first step 519 with a running surface 640. The running surface 640 may be a ground surface. The door opening 516 is sized to allow egress and ingress of passengers. The doors 512 and 514 are illustrated as a pair of sliding plug doors, being substantially planar to the passenger compartment 504 when in an open position. The door system 510 may be provided with a pair of bi-folding doors. The door system 510 may be provided with a pair of swing plug doors. FIG. 27 also shows a floor panel 390.

Figure 28:
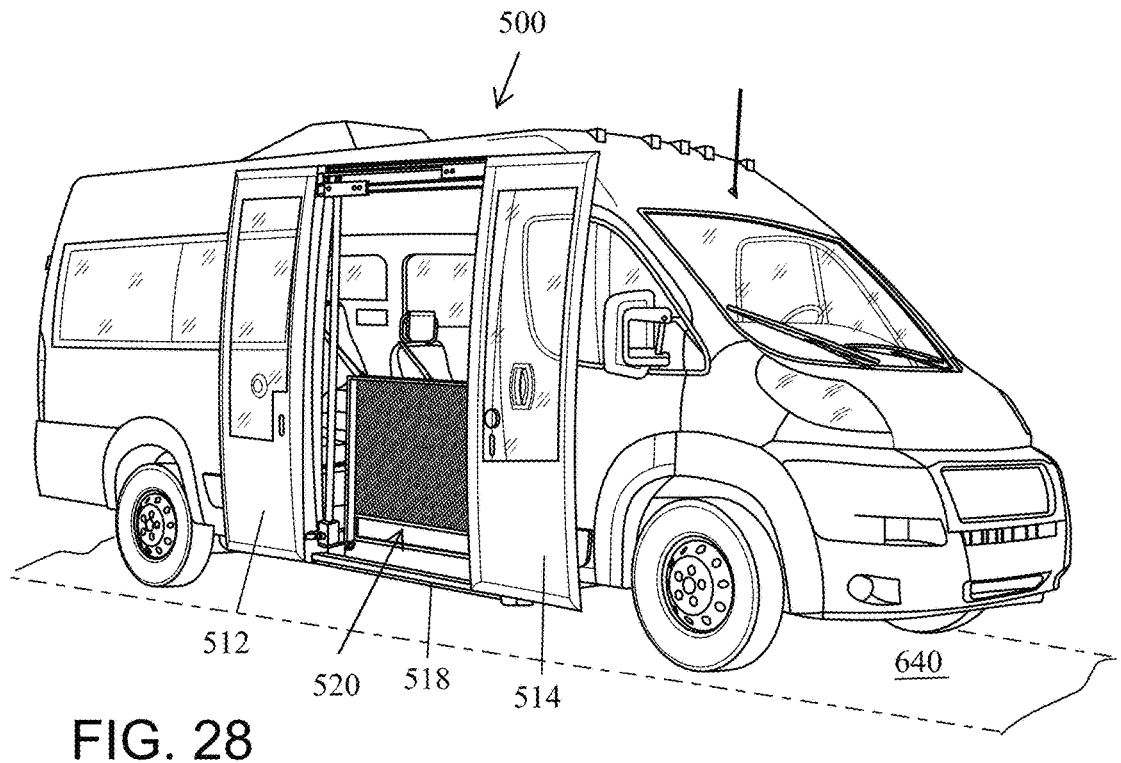
FIG. 28 illustrates a perspective view of a vehicle with doors in an open position and also illustrating an optional wheelchair ramp in a partially deployed position.

FIG. 28 illustrates a perspective view of the vehicle 500 with doors 512, 514 in an open position and also illustrating an optional wheelchair ramp 520 in a partially deployed and a folded position.

Figure 29:
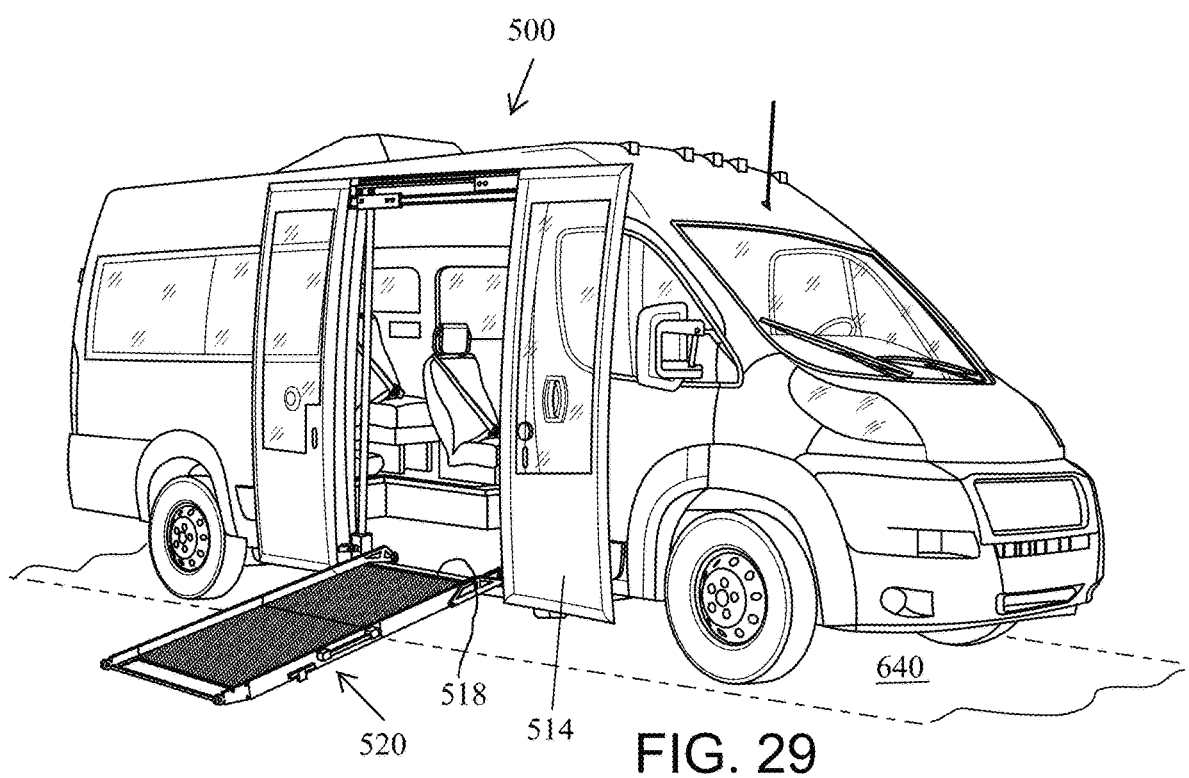
FIG. 29 illustrates a perspective view of a vehicle with doors in an open position and also illustrating an optional wheelchair ramp in a fully deployed position.

FIG. 29 illustrates a perspective view of the vehicle 500 with doors 512, 514 in an open position and also illustrating an optional wheelchair ramp 520 in a fully deployed and an unfolded position. The optional wheelchair ramp 520 is illustrated as a bi-fold ramp with a rear edge being disposed at a threshold 518. The bi-fold ramp minimizes a distance between a top edge thereof and the floor panel 290 to enable a wheelchair-bound passenger a greater view of the exterior surroundings of the vehicle 500, should the optional wheelchair ramp 520 is to be left in the partially deployed position of FIG. 28 during movement of the vehicle 500.

Figure 30:
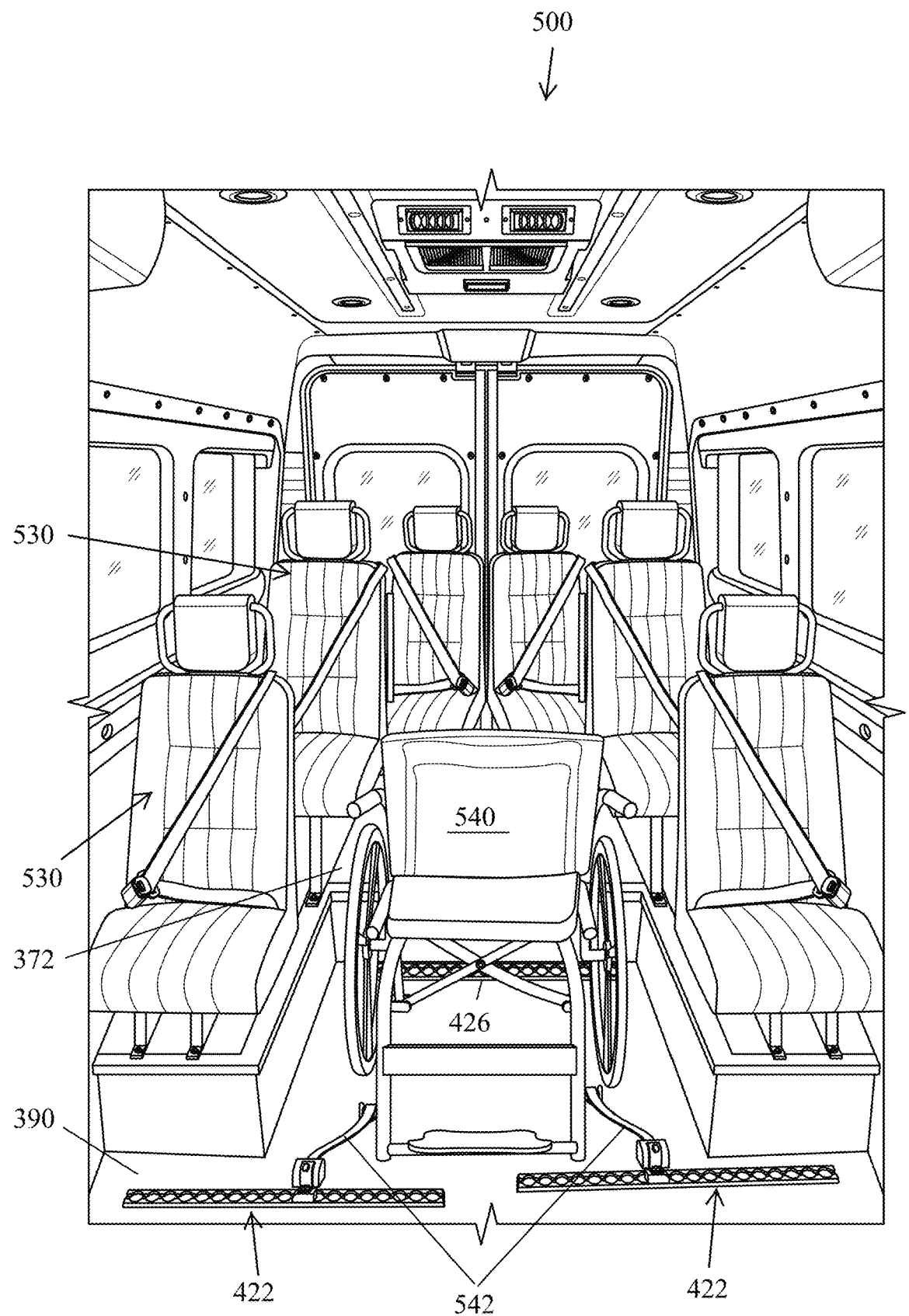
FIG. 30 illustrates a partial perspective view of the interior passenger compartment of the vehicle.

FIG. 30 illustrates a partial perspective view of the interior passenger compartment of the vehicle 500. A step 380 is omitted in FIG. 30. The optional wheelchair tie-down mounting component 426 is illustrated as being mounted at a transition between a high floor panel 372 and the low floor panel 390. Passenger seats 530 are also being illustrated. Passenger seats 530 attach to seat mount 404, 406 and 408, shown for example in FIG. 21. Close-out panels are also illustrated.

Figure 31:
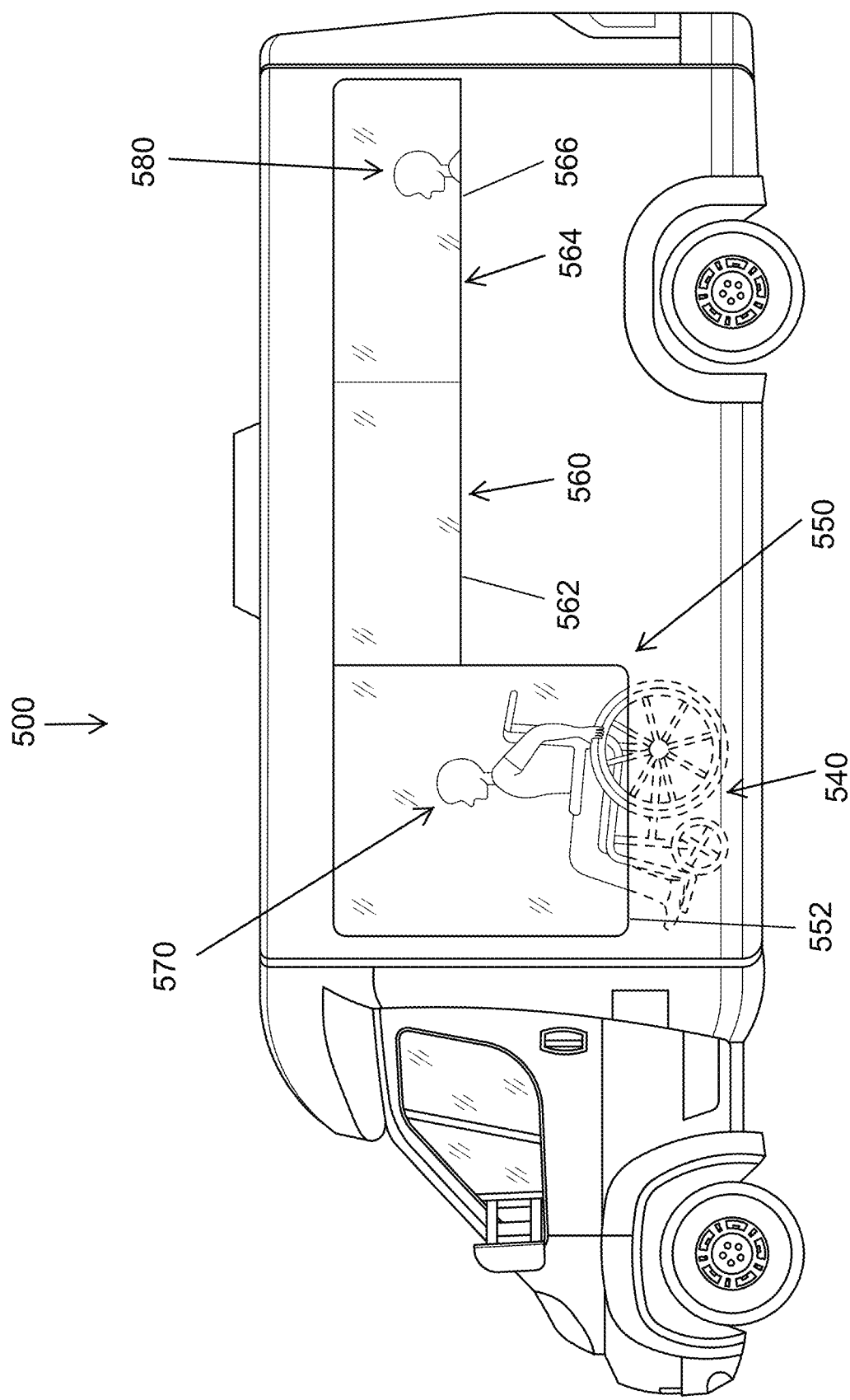
FIG. 31 illustrates the vehicle of FIGS. 27-30 with an enlarged window.

FIG. 31 illustrates the vehicle 500 of FIGS. 26-30 with a side window 550 that is disposed opposite the door system 510. The side window 550 is enlarged as compared to the side windows 560 and 564. More specifically, a lower edge 552 of the side window 550 is positioned further toward the floor panel 390 and positioned lower than a lower edge 562 of the side window 560 and lower than a lower edge 566 of the side window 564. The lower edge 552 is being positioned closer to the floor panel 390 at a distance sufficient for a wheelchair-bound passenger 570 to view exterior surroundings of the vehicle 500. The lower edge 552 may be only positioned at a shoulder level of the wheelchair-bound passenger 570 similar to the position of the lower edge 566 relative to the passenger 580 sitting in the high floor area of the vehicle 500. An ability to view exterior surroundings of the vehicle 500 reduces if not eliminates a claustrophobic condition that may be caused by conventional window size as the wheelchair-bound passenger would be only able to view the interior side wall of the vehicle 500.

Figure 32:
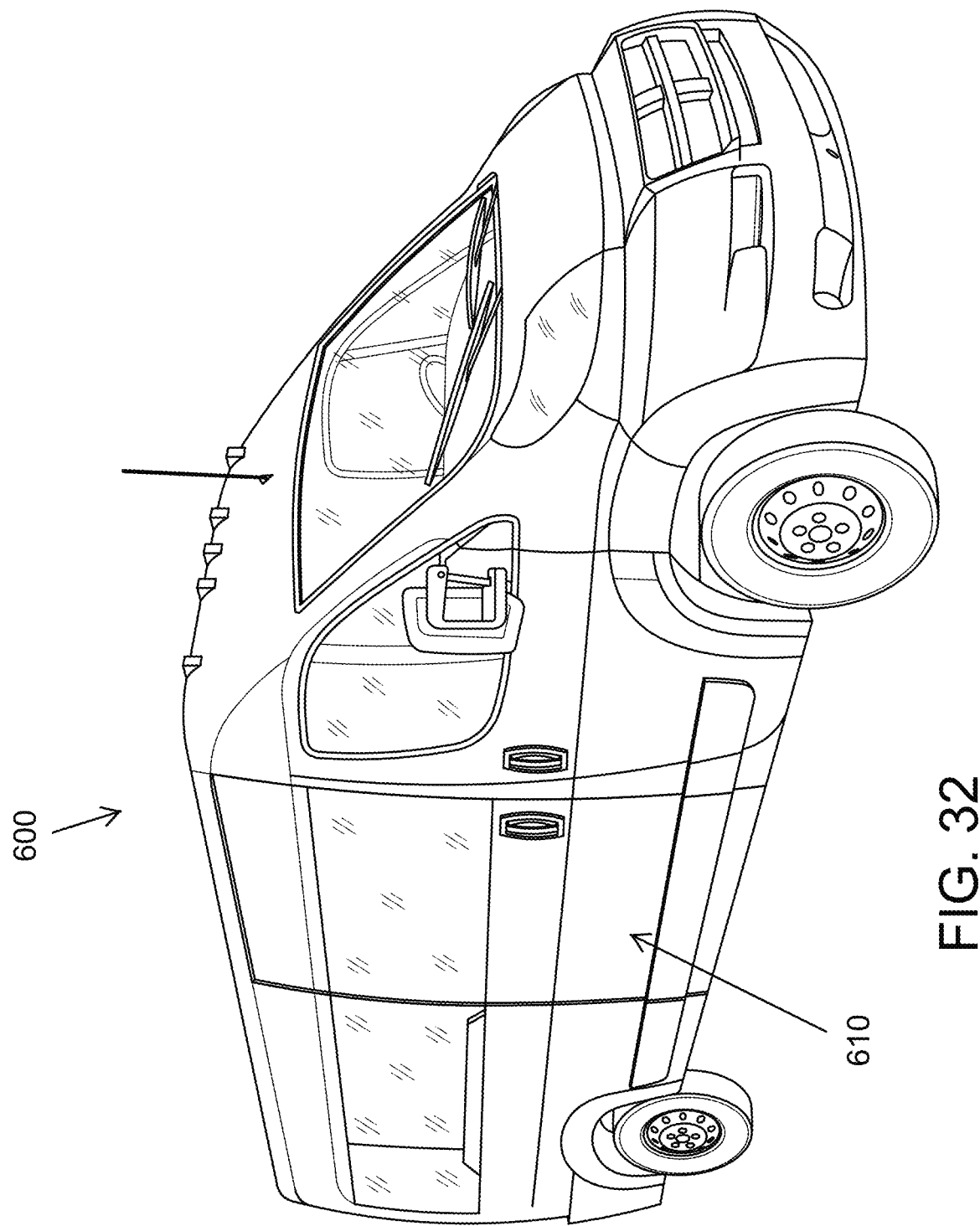
FIG. 32 illustrates a perspective view of a vehicle that can be retrofitted into the vehicle of FIGS. 27-31.
Figure 33:
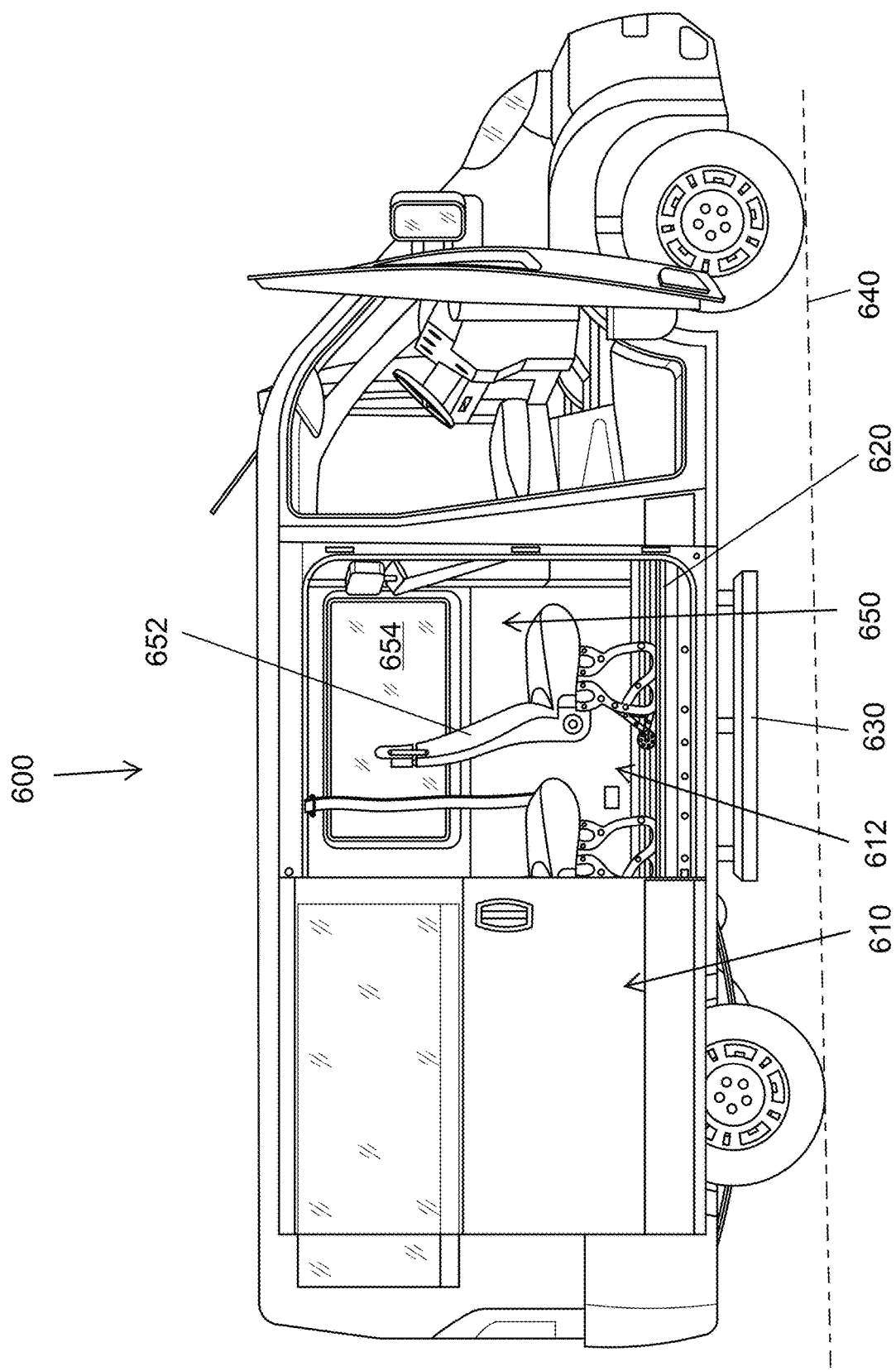
FIG. 33 illustrates another perspective view of the vehicle of FIG. 32.

FIGS. 32-33 illustrate perspective view of the vehicle 600 that can be retrofitted into the vehicle 500 of FIGS. 26-31. The vehicle 600 may be equipped with an internal combustion engine. The vehicle 600 may be provided as an electric vehicle, equipped with an electric drive unit (electric propulsion) and an energy source under the floor structure. The vehicle 600 is illustrated as an OEM vehicle, a van, with a single sliding door 610 and a floor 620. The vehicle 600 may be provided as a bus with one or more side doors and a larger number of seats. The vehicle 600 may be provided as a minivan with one side door and one rear door. In view of the above, the floor 620 is referred to as the high floor. A step 630 is installed at the door opening 612 to reduce a height difference between the floor 620 and the running surface 640 that the passenger must overcome. The step 630 provides a first step height in the conventional OEM vehicle. The vehicle 600 is illustrated in FIG. 33 with passenger seats 652 within an interior compartment 650. A conventionally sized window 654 in an opposite side wall from the side wall with door opening 612 is also illustrated. The vehicle 600 may be provided as a cargo van without the passenger seats 652 and may be even without the window 654 where the window frame is simply closed with anyone of a plywood, a cardboard and a film for protecting the interior compartment 650 during transport and storage.

EMBODIMENTS

Embodiment A

A vehicle side sill comprises a first end section; a second end section, the second end section being aligned and coplanar with the first end section along a length of the vehicle side sill; a third section joining first and second end sections, the third section comprising a portion disposed in a plane being offset from a plane of the first and second end sections; and each of the first and second end sections comprises a first portion, a second portion, and a third portion connecting the first and second portions, the third portion having a sloped surface between the first and second portions, where the second portion is offset from the first portion.

A feature of this embodiment is that each of the first and second end sections comprises a hollow interior.

A feature of this embodiment is that each of the first and second end sections comprises a tubular component.

A feature of this embodiment is that one of the first and second portions comprises a pair of flanges disposed at a distance from each other.

A feature of this embodiment is that each of the first and second portions comprises a pair of flanges disposed at a distance from each other.

A feature of this embodiment is that the third section comprises a plurality of mounting apertures.

A feature of this embodiment is that the third section comprises a plurality of apertures and a plurality of threaded nuts, each threaded nut being in an alignment with an aperture from the plurality of apertures.

A feature of this embodiment is that the third section comprises a plurality of threaded apertures.

A feature of this embodiment is that the third section comprises a plurality of first apertures through a thickness of first wall and a plurality of second apertures through a thickness of a second wall, the second wall being connected to the first wall, and each second aperture from the plurality of second apertures being aligned with one first aperture from the plurality of first apertures.

Embodiment B

A vehicle side sill comprises a first mounting section; a second mounting section, the second mounting section being disposed at a distance from the first mounting section along a length of the vehicle side sill; a brace connecting the first and second mounting sections and defining a generally U-shaped configuration of the vehicle side sill; and each of the first and second mounting sections comprises a sloped surface.

A feature of this embodiment is that each of the first and second mounting sections comprises a first portion, a second portion, and a third portion connecting the first and second portions, the third portion comprising the sloped surface between the first and second portions, such that the second portion is offset from the first portion.

A feature of this embodiment is that the brace comprises a plurality of mounting apertures and a plurality of access apertures, each access aperture from the plurality of access apertures being aligned, along the length of the each vehicle side sill, with one mounting aperture from the plurality of mounting apertures.

Embodiment C

A vehicle side sill comprises a first mounting portion; a second mounting portion; a sloped surface connecting the first mounting portion with the second mounting portion.

A feature of this embodiment is that the first mounting portion comprises a first pair of flanges disposed at one end of the vehicle side sill and a second pair of flanges disposed at an opposite end of the vehicle side sill.

A feature of this embodiment is that the second mounting portion comprises plurality of mounting apertures and a plurality of access apertures, each access aperture from the plurality of access apertures being aligned with one mounting aperture from the plurality of mounting apertures.

Embodiment D

A vehicle structure comprises two vehicle side sills disposed at a distance from each other along a width of the vehicle structure, each vehicle side sill from the two vehicle side sills comprising a sloped surface; and a floor mounting component having one end rigidly connected to one vehicle side sill from the two vehicle side sills and having another end rigidly connected to another vehicle side sill from the two vehicle side sills.

A feature of this embodiment is that the floor mounting component comprises a thickness of 0.5 inches or less.

A feature of this embodiment is that the floor mounting component comprises a thickness of 1.0 inch or less.

Embodiment E

A vehicle chassis comprises two vehicle side sills disposed at a distance from each other along a width of the vehicle chassis, the two vehicle side sills extendable between a front end and a rear end of a vehicle, each vehicle side sill comprising: a first mounting section, a second mounting section, the second mounting section being disposed at a distance from the first mounting section along a length of a vehicle side sill, a brace connecting the first and second mounting sections and defining a generally U-shaped configuration of the vehicle side sill, and each of the first and second mounting sections comprises a sloped surface; and a plurality of braces, each brace from the plurality of braces having one end rigidly connected to one vehicle side sill from the two vehicle side sills and having another end rigidly connected to another vehicle side sill from the two vehicle side sills.

A feature of this embodiment is that each vehicle side sill comprises a means for detachably fastening an energy source.

A feature of this embodiment is that the energy source comprises an electric battery and wherein the means comprises a plurality of mounting apertures in the each vehicle side sill, each mounting aperture from the plurality of mounting apertures alignable with an aperture in a flange extending from an enclosure of the energy source.

A feature of this embodiment is that the means comprises a plurality of access apertures in the each vehicle side sill, each access aperture from a plurality of access apertures being aligned, along the length of the each vehicle side sill, with a respective mounting aperture from the plurality of mounting apertures.

A feature of this embodiment is that the means comprises a plurality of threaded apertures in the each vehicle side sill, each threaded aperture from the plurality of threaded apertures aligned with an aperture in a flange of an enclosure of an electric battery.

A feature of this embodiment is that the energy source comprises an electric battery and wherein the means comprises a plurality of apertures in the each vehicle side sill, each aperture from the plurality of apertures aligned with an aperture in a flange extending from an enclosure of the energy source, and a plurality of threaded nuts, each threaded nut being rigidly attached to the vehicle side sill in an alignment with a aperture from the plurality of apertures.

Embodiment F

An electric vehicle comprises a vehicle structure, the vehicle structure comprising: two vehicle side sills disposed at a distance from each other along a width of the vehicle structure, each vehicle side sill comprises a sloped surface, each vehicle side sill comprising a sloped surface, sloped surfaces in the two vehicle side sills defining a cavity, a floor support, comprising: a plurality of cross members, each cross member from the plurality of cross members having one end rigidly connected to one vehicle side sill from the two vehicle side sills and having another end rigidly connected to another vehicle side sill from the two vehicle side sills, a plurality of braces disposed within gaps between a pair of adjacent cross members, each brace from the plurality of braces having one end connected to one cross member and having another end connected to an adjacent cross member, and elongated wheelchair tie-down mounting components attached to some cross members from the plurality of cross members, a thickness of the floor support being 0.5 inches or less; an electric battery received within a cavity and under the floor support, the electric battery being fastened to the two vehicle side sills, the electric battery defining a ground clearance of at least 5 inches; a vehicle floor positioned on the floor support, the vehicle floor comprising grooves aligned with wheelchair tie-down mounting strips, the vehicle floor defining a single step between 8.0 inches and 13.0 inches from a ground; and wheelchair tie-down tracks fastened to the wheelchair tie-down mounting components without a direct contact of fasteners with an enclosure of the electric battery, wheelchair tie-down tracks securing the vehicle floor to the floor support.

Embodiment G

A method comprises removing a portion of a vehicle structure, including a vehicle floor structure; removing an internal combustion engine; rigidly attaching a side sill assembly into a space remaining after removal of the portion of the vehicle floor structure, the side sill assembly comprising side sills with sloped surfaces and a floor support assembly with a thickness being less than 0.5 inches, the vehicle side sills defining a cavity; positioning an energy source into the cavity of the side sill assembly; fastening flanges of an enclosure of the energy source to the side sills; fastening the enclosure to the floor support assembly; fastening, with fasteners passed through apertures in elongated wheelchair tie-down components, a floor panel to the floor support assembly without a contact of the fasteners with the enclosure; installing an electric drive unit; and converting an internal combustion wheeled vehicle with an original manufacturing equipment (OEM) floor into a low floor electric vehicle defining a single step of 8.0 inches to 13.0 inches from a running surface.

Embodiment H

A vehicle floor comprises a first floor section, the first floor section comprising: two vehicle side sills disposed at a distance from each other along a width of the first floor section, each vehicle side sill comprising a sloped surface, the sloped surface in both vehicle side sills defining a void, a plurality of cross members, each cross member from the plurality of cross members having one end rigidly connected to one vehicle side sill from the two vehicle side sills and having another end rigidly connected to another vehicle side sill from the two vehicle side sills, a plurality of braces disposed within gaps between a pair of adjacent cross members, each brace from the plurality of braces having one end connected to one cross member and having another end connected to an adjacent cross member, and a wheelchair tie-down strips attached to some cross members from the plurality of cross members, a thickness of the plurality of cross members and the plurality of braces being 0.5 inches or less; a second floor section connected at a proximal edge thereof to the first floor section along one edge of the first floor section, a width of the second floor section being smaller than a width of the first floor section; a first mounting bracket extending outwardly from one end of each vehicle side sill, the first mounting bracket comprising two first flanges spaced apart from each other and oriented along a length of a respective vehicle side sill, the two first flanges offset inwardly from the respective vehicle side sill and connected to one end of the respective vehicle side sill with a first inclined section; a second mounting bracket extending outwardly from another end of the each vehicle side sill, the second mounting bracket comprising two second flanges spaced apart from each other and oriented along the length of the respective vehicle side sill, the two second flanges offset inwardly from the respective vehicle side sill and connected to an opposite end of the respective vehicle side sill with a second inclined section; two third mounting brackets extending outwardly from a distal edge of the second floor section, each third mounting bracket comprises two third flanges spaced apart from each other and oriented along the distal edge of the second floor section; and two fourth mounting brackets, each fourth mounting bracket extending outwardly from the second inclined section, the each fourth mounting bracket including an L-shaped flange; the two vehicle side sills, the plurality of cross members and the plurality of braces defining a void of the floor, the void being sized to receive an energy source cell therewithin.

A feature of this embodiment is that the vehicle floor further comprises elongated wheelchair tie-down components, a length of each wheelchair tie-down component disposed in a direction between the two vehicle side sills.

A feature of this embodiment is that the vehicle floor further comprises panels attached to each of the first and second floor sections along a periphery thereof.

A feature of this embodiment is that the second floor section comprises a step.

A feature of this embodiment is that the step comprises openings for retractable wheelchair restraints.

Embodiment I

A vehicle floor comprises a first floor section, the first floor section comprising: two vehicle components disposed at a distance from each other along a width of the first floor section, each vehicle component comprising a sloped surface, the sloped surface in both vehicle components defining a void, a plurality of cross members, each cross member from the plurality of cross members having one end rigidly connected to one vehicle component from the two vehicle components and having another end rigidly connected to another vehicle side sill from the two vehicle components, a plurality of braces disposed within gaps between a pair of adjacent cross members, each brace from the plurality of braces having one end connected to one cross member and having another end connected to an adjacent cross member, and a wheelchair tie-down mounting components attached to some cross members from the plurality of cross members, a thickness of the plurality of cross members and the plurality of braces being 0.5 inches or less, a second floor section connected at a proximal edge thereof to the first floor section along one edge of the first floor section, a width of the second floor section being smaller than a width of the first floor section; two first flanges spaced apart from each other and oriented along a length of a respective vehicle component, the two first flanges offset inwardly from the respective vehicle component and connected to one end of the respective vehicle component with a first inclined section; two second flanges spaced apart from each other and oriented along the length of the respective vehicle component, the two second flanges offset inwardly from the respective vehicle component and connected to an opposite end of the respective vehicle component with a second inclined section; two third flanges spaced apart from each other and oriented along a distal edge of the second floor section, each third flanges connected to a distal edge with a straight section; and an L-shaped flange extending from each second inclined section; the two vehicle components, the plurality of cross members and the plurality of braces defining a void of the first floor section, the void being sized to receive an energy source cell therewithin.

Embodiment J

A vehicle chassis comprises a front section designed to receive a front wheel set, and a vehicle drive unit; a rear section designed to receive a rear wheel set, the rear section being coplanar with the front section; and a middle section, comprising: two first components, a plurality of second components, each second component with one end rigidly connected to one first component from the two first components and with another end rigidly connected to another first component from the two first components, and a cavity defined by the two first components and the plurality of second components; and additional components, connecting the two first components and the plurality of second components to front and rear sections in an offset relationship from a plane of the front and rear sections.

Embodiment K

A vehicle comprises an assembly of vehicle side sills and cross members; two wheel assemblies supporting the assembly of vehicle side sills and cross members; a passenger compartment mounted on the assembly of vehicle side sills and cross members; a drive unit mounted at a front end of the vehicle; an energy source detachably attached to the assembly of vehicle side sills and cross members; a floor substrate attached to the assembly of vehicle side sills and cross members, the floor substrate comprising: first stiffening components disposed at a distance from each other, each first stiffening component comprises a first flange, a second flange, and a wall connecting the first and second flanges, second stiffening components disposed within gaps between the first stiffening components and at a distance from each other, and receptacles mounted, in a series and at a distance from each other, to one of the first and second stiffening components within a thickness of the floor substrate and within a section of the floor substrate disposed above a battery cell portion of the energy source, each receptacles comprising a blind threaded bore; a floor positioned on the floor substrate, the floor comprising grooves within a thickness of the floor, each groove being aligned with a respective series of receptacles, the each groove comprising apertures, each aperture is aligned with one receptacle; and a wheelchair tie-down track positioned within one groove from the grooves, the wheelchair tie-down track comprising second apertures, each second aperture is aligned with one first aperture, the wheelchair tie-down track designed to detachably fasten the floor to the floor substrate; the floor substrate designed to detachably fasten the floor with the wheelchair tie-down track without a contact of fasteners with an energy source enclosure mountable below the floor substrate.

A feature of this embodiment is that a thickness of the floor substrate being 0.5 inches or less.

A feature of this embodiment is that a thickness of the floor substrate being 1 inch or less.

A feature of this embodiment is that the floor defines a single step of 8.0 inches to 13.0 inches from a surface.

A feature of this embodiment is that the floor defines a single step of 8.0 inches to 11.0 inches from a surface.

A feature of this embodiment is that the vehicle defines a clearance between a surface of an enclosure of the energy source and a surface of between 4.0 inches and 7.0 inches.

Embodiment L

A vehicle comprises an assembly of vehicle side sills and cross members; two wheel assemblies supporting the assembly of vehicle side sills and cross members; a passenger compartment mounted on the assembly of vehicle side sills and cross members; a drive unit mounted at a front end of the vehicle; an energy source detachably attached to the assembly of vehicle side sills and cross members; a floor substrate attached to the assembly of vehicle side sills and cross members, the floor substrate comprising: first stiffening components disposed at a distance from each other, each first stiffening component comprises a first flange, a second flange, and a wall connecting the first and second flanges, second stiffening components disposed at a distance from each other in gaps between first stiffening components, the first and second stiffening components defining a thickness of the floor substrate, and threaded receptacles mounted, in a series and at a distance from each other, to one of the first and second stiffening components within the thickness of the floor substrate within a section of the floor substrate disposed above a battery cell portion of an energy source; a floor positioned on the first and second stiffening components, the floor comprising groves within a thickness of the floor, each groove being aligned with a respective series of receptacles, the each groove comprising first apertures disposed in a series with each other along a length of the each groove; and a wheelchair tie-down track positioned within one groove from the grooves, the wheelchair tie-down track comprising second apertures, each second aperture being in an aligned relationship with one first aperture; the floor substrate designed to detachably secure, with the wheelchair tie-down track fastened to the receptacles, the floor to the first and second stiffening components without a contact of fasteners with an energy source enclosure sized and shaped to be positioned in a void under the floor substrate.

Embodiment M

A vehicle comprises a vehicle body with an underbody, a passenger compartment, windows and a passenger door; a side sill assembly attached to an underbody and being disposed mediate a rear end and a front end of the vehicle, the side sill assembly comprising two vehicle sills disposed parallel and at a distance from each other, the two vehicle sills extending along a length of the vehicle; two wheel assemblies supporting the vehicle body; a drive unit mounted at the front end; a floor substrate detachably attached to the side sill assembly, the floor substrate comprising a plurality of receptacles; an energy source with an enclosure, the enclosure rigidly and detachably attached to the two vehicle sills and to the floor substrate; a floor positioned on the floor substrate, the floor comprising grooves within a thickness of the floor, each groove comprising a series of first apertures along a length of the each groove, at least some of the first apertures being aligned with receptacles within the floor substrate; and a wheelchair tie-down track positioned within one groove from the grooves, the wheelchair tie-down track comprising second apertures, each second aperture being in an aligned relationship with one first aperture.

Embodiment N

A vehicle comprises a unibody with a passenger compartment, windows and a passenger door; two wheel assemblies supporting the unibody; a floor, where a distance between an upper surface of the floor and a running surface being less than 11.0 inches, the distance defining a first step; an energy source mounted below the floor and providing a clearance of at least 6 inches from the running surface; a drive unit operable from the energy source; a ramp assembly mounted on the floor, the ramp assembly designed to provide a sloped surface between the floor and a surface with a slope being at least 1:6; and wheelchair tie-downs disposed within the floor.

Embodiment P

A vehicle compliant with American with Disability Act (ADA) requirements, the vehicle comprises a unibody with a passenger compartment, windows and a passenger door; two wheel assemblies supporting the unibody; a floor detachably attached to the unibody where a distance between an upper surface of the floor and a running surface being less than 11.0 inches; an energy source; a drive unit operable from an energy source; a first mounting system within the unibody, the first mounting system designed to mount the energy source below the floor and designed to allow access to the energy source; a second mounting system within the unibody, the second mounting system designed to fasten a ramp assembly to the floor above the energy source where first fasteners do not contact energy source enclosure; and wheelchair tie-downs disposed within grooves in the floor, wheelchair tie-downs designed to detachably attach the floor to the unibody with second fasteners, where the second fasteners do not contact energy source enclosure.

Embodiment Q

A method comprises removing a portion of a vehicle floor; removing a portion of vehicle rails and cross members; removing a cradle with an internal combustion engine; installing an insert into a void within a vehicle, the void defined by a removed portion of the vehicle rails and cross members and a removed portion of the vehicle floor, the insert comprising an insert with two side sills and an insert subfloor attached to the two side sills; detachably fastening, with fasteners, an enclosure of an energy source to the two side sills and to the insert subfloor; detachably fastening, with wheelchair tie-down tracks and a fasteners, an insert floor to an insert subfloor, the insert floor being disposed lower than a remaining portion of vehicle floor, the fasteners clearing the enclosure of the energy source; attaching a ramp assembly with a foldable ramp to the insert floor; installing another cradle with an electric drive unit; and converting an internal combustion vehicle into an electric vehicle compliant with America Disability Act (ADA) requirements.

A feature of this embodiment is that the method further comprises attaching a shield to the another cradle, and shielding a front portion of the energy source protruding below the another cradle.

A feature of this embodiment is that the method further comprises offsetting a portion of each side sill within the insert outwardly from each remaining side sill of the vehicle.

A feature of this embodiment is that detachably fastening the insert comprises providing the floor insert with grooves, each groove designed to receive a wheelchair tie-down channel.

A feature of this embodiment is that detachably fastening the insert comprises installing threaded receptacles within the insert subfloor.

A feature of this embodiment is that installing the insert comprises providing the insert subfloor with first and second stiffening components.

A feature of this embodiment is that installing the insert floor comprises positioning the insert floor at a distance between 8 inches and 13 inches from a running surface.

A feature of this embodiment is that installing the energy source comprises positioning a bottom surface of the energy source at a distance of between 4 inches and 7 inches from a running surface.

A feature of this embodiment is that installing the insert comprises installing a step between a surface of the remaining portion of the vehicle floor and an insert floor, the step comprising a step surface.

A feature of this embodiment is that the method further comprises forming an aperture through a vertical surface, being normal to the step surface, and installing a retractable wheelchair restraint within the step, a strap of the retractable wheelchair restraint accessible through the aperture.

Embodiment R

An energy source shield comprises a first flange designed to be attached to a drive unit cradle of a vehicle; a second flange disposed parallel to and at a distance from the first flange, the second flange designed to contact a housing of an energy source; and a component connecting and second flanges therebetween, the component disposed at an incline to each flange from the first and second flanges; the energy source shield being designed to shield an exposed front end of the energy source.

Embodiment S

A vehicle side sill comprises a main section comprising a first wall and a second wall, the second wall disposed at a distance of the first wall to define a hollow interior of the main section; a first end section disposed at one extremity of the main section and along a portion of a length of the main section, the first end section comprises two first flanges disposed at a distance from each other and at a distance from the main section and two second flanges, each second flange sloped relative to a respective wall from first and second walls of the main section and to a respective first flange; a second end section disposed at another extremity of the main section and along another portion of the length of the main section, the second end section comprises two third flanges disposed at a distance from each other and at a distance from the main section and two fourth flanges, each fourth flange sloped relative to the respective wall from first and second walls of the main section and to a respective third flange; a void between the first and second end sections; and a plurality of apertures through one wall from the first and second walls of the main section, the plurality of apertures disposed at a distance from each other along the length of the main section; the two first flanges being aligned with the two third flanges; the two second flanges being aligned with the two fourth flanges.

A feature of this embodiment is that the vehicle side sill further comprises another plurality of apertures through another wall of the main section, each aperture from the another plurality of apertures being aligned, along the length of the main section, with one aperture from the plurality of apertures.

Embodiment T

A vehicle side sill comprises a main section with a first edge and a second edge, the second edge being disposed at a distance and substantially parallel to the first edge; a first flange extending from the first edge of the main section along a length of the main section; a second flange disposed at one end of the main section, the second flange comprising a first portion and a second portion, the second portion disposed between the second edge of the main section and the first portion, the second portion inclined relative to each of the main section and the first portion; a third flange disposed at an opposite end of the main section, the third flange comprising a first portion and a second portion, the second portion of the third flange disposed between the second edge of the main section and the first portion of the third flange, the second portion of the third flange inclined relative to each of the main section and the first portion of the third flange; and a void between the second and third flanges.

A feature of this embodiment is that the vehicle side sill further comprises a plurality of apertures disposed at a distance from each other through a thickness of the first flange.

A feature of this embodiment is that each aperture from the plurality of apertures is a threaded aperture.

A feature of this embodiment is that the vehicle side sill further comprises a plurality of threaded projections on the first flange, each threaded projection from the plurality of threaded projections being aligned with a respective aperture from the plurality of apertures.

A feature of this embodiment is that the vehicle side sill further comprises a plurality of threaded nuts on the first flange, each threaded nut from the plurality of threaded nuts being aligned with a respective aperture from the plurality of apertures.

A feature of this embodiment is that the vehicle side sill further comprises a plurality of apertures disposed at a distance from each other through a thickness of the main section.

A feature of this embodiment is that the vehicle side sill further comprises a plurality of first apertures, at a first distance from each other, through a thickness of the first flange and a plurality of second apertures, at a second distance from each other, through a thickness of the main section, the second distance being substantially equal to the first distance.

Embodiment U

A vehicle structure comprises a first section; a second section, the second section being disposed at a distance from the first section along a length of the vehicle structure; a third section connecting first and second sections; and each of the first and second sections comprises a sloped surface.

A feature of this embodiment is that the each of the first and second sections comprises a first portion, a second portion, and a third portion connecting the first and second portions, wherein the second portion is connected to the third section and wherein the third portion carries the sloped surface.

A feature of this embodiment is that wherein the each of the first and second sections comprises a first portion and a second portion, wherein the second portion is connected to the third section and wherein the second portion carries the sloped surface.

A feature of this embodiment is that the each of the first and second sections comprises two flanges disposed at a distance from each other.

A feature of this embodiment is that the each of the first and second sections comprises two walls disposed at a distance from each other.

A feature of this embodiment is that the vehicle structure further comprises further comprising a plurality of apertures.

A feature of this embodiment is that the third section comprises two walls disposed adjacent to each other and wherein the vehicle structure further comprises a first plurality of apertures through a thickness of one wall from the two walls and a second plurality of apertures through a thickness of another wall from two walls.

Embodiment V

A vehicle structure comprises two vehicle rails, disposed laterally at a distance from each other along a width of the vehicle structure, each vehicle rail from the two vehicle rails directed in a longitudinal direction between a front end of a vehicle and a rear end of the vehicle, the each vehicle rail comprising a sloped surface, a slopped surface in one vehicle rail being opposite a slopped surface in another vehicle rail; and a floor mounting component, comprising: a plurality of cross members, each cross member from the plurality of cross members having one end rigidly connected to each vehicle rail, a plurality of braces disposed longitudinally and at a distance from each other in gaps between two cross members, a plurality of stiffeners, a stiffener from the plurality of stiffeners disposed within a thickness of a cross member from the plurality of cross members, the stiffener having an end connected to the each vehicle rail, and a plurality of wheelchair tie-down mounting strips, each wheelchair tie-down mounting strip from the plurality of wheelchair tie-down mounting strips disposed within the thickness of the cross member from the plurality of cross members.

A feature of this embodiment is that the floor mounting component comprises a thickness of 0.5 inches or less.

A feature of this embodiment is that the floor mounting component comprises a thickness of 1.0 inch or less.

Embodiment W

A vehicle structure comprises a first wall with a first sloped portion mediate terminal edges of the first wall; a second wall with a second sloped portion mediate terminal edges of the second wall, the second wall disposed at a distance from the first wall, the second sloped portion disposed opposite the first sloped portion; a third wall connecting one terminal edge edges of the first wall with one terminal edge of the second wall; and a cavity through each of the first and second walls, the cavity being in an open communication with an opposite terminal edge in each of the first and second walls.

A feature of this embodiment is that the vehicle structure further comprises a plurality of apertures through a thickness of the third wall.

A feature of this embodiment is that the vehicle structure further comprises a first plurality of apertures through a thickness of the third wall and a second plurality of apertures through a thickness of one wall from the first and second walls, the second plurality of apertures being disposed adjacent the third wall.

Embodiment X

A vehicle structure comprises two side members, disposed laterally at a distance from each other along a width of the vehicle structure, each side member from the two side members directed in a longitudinal direction between a front end of a vehicle and a rear end of the vehicle; a plurality of first members disposed at a distance from each other along the longitudinal direction, each first member from the plurality of first members having one end rigidly connected to each side member; and a plurality of second members disposed at a distance from each other in gaps between two first members, each second member from the plurality of second members being rigidly attached to a respective pair of first members.

A feature of this embodiment is that the vehicle structure further comprises a plurality of stiffeners, a stiffener from the plurality of stiffeners disposed within a thickness of a first member from the plurality of first members, the stiffener having an end connected to the each side member.

A feature of this embodiment is that the vehicle structure further comprises a plurality of wheelchair tie-down mounting strips, each wheelchair tie-down mounting strip from the plurality of wheelchair tie-down mounting strips disposed within a thickness of the first member from the plurality of first members.

A feature of this embodiment is that the vehicle structure further comprises a first flange upstanding on one end of the each side member and a second flange upstanding on a longitudinally opposite end of the each side member, each of the first and second flanges comprising a slopped portion.

Embodiment Y

A vehicle structure comprises an energy source with an enclosure; a plurality of first members rigidly attached to the enclosure, the plurality of first members disposed at a distance from each other; and a plurality of second members disposed at a distance from each other in gaps between two first members, each second member from the plurality of second members being rigidly attached to a respective pair of first members and being rigidly attached to the enclosure.

A feature of this embodiment is that the vehicle structure further comprises a plurality of stiffeners, a stiffener from the plurality of stiffeners disposed within a thickness of a first member from the plurality of first members.

A feature of this embodiment is that the vehicle structure further comprises a plurality of wheelchair tie-down mounting strips, each wheelchair tie-down mounting strip from the plurality of wheelchair tie-down mounting strips disposed within a thickness of the first member from the plurality of first members.

Embodiment Z

A vehicle structure comprises a plurality of first members disposed at a distance from each other; and a plurality of second members disposed at a distance from each other in gaps between two first members, each second member from the plurality of second members being rigidly attached to a respective pair of first members; a thickness of the plurality of first members and the plurality of second members being 0.5 inches or less.

A feature of this embodiment is that the vehicle structure further comprises two side members, disposed laterally at a distance from each other along a width of the vehicle structure, each side member from the two side members directed in a longitudinal direction between a front end of a vehicle and a rear end of the vehicle, the each first member from the plurality of first members having one end rigidly connected to each side member.

A feature of this embodiment is that each side member comprises a first section; a second section, the second section being disposed at a distance from the first section along a length of the vehicle structure; a third section connecting first and second sections; and each of the first and second sections comprises a sloped surface.

A feature of this embodiment is that the each of the first and second sections comprises a first portion, a second portion, and a third portion connecting the first and second portions, wherein the second portion is connected to the third section and wherein the third portion carries the sloped surface.

A feature of this embodiment is that the each of the first and second sections comprises a first portion and a second portion, wherein the second portion is connected to the third section and wherein the second portion carries the sloped surface.

A feature of this embodiment is that the each of the first and second sections comprises two flanges disposed at a distance from each other.

A feature of this embodiment is that the each of the first and second sections comprises two walls disposed at a distance from each other.

A feature of this embodiment is that the vehicle structure further comprises a plurality of apertures.

A feature of this embodiment is that the third section comprises two walls disposed adjacent to each other and wherein the vehicle structure further comprises a first plurality of apertures through a thickness of one wall from the two walls and a second plurality of apertures through a thickness of another wall from two walls.

A feature of this embodiment is that the vehicle structure further comprises a means for detachably fastening an energy source at least to the each side member.

A feature of this embodiment is that the vehicle structure further comprises a plurality of stiffeners, a stiffener from the plurality of stiffeners disposed within a thickness of a first member from the plurality of first members.

A feature of this embodiment is that the vehicle structure further comprises a plurality of wheelchair tie-down mounting strips, each wheelchair tie-down mounting strip from the plurality of wheelchair tie-down mounting strips disposed within a thickness of a first member from the plurality of first members.

A feature of this embodiment is that the vehicle structure further comprises an energy source, an enclosure of the energy source positioned in a contact with the plurality of first members and the plurality of second members, the enclosure being fastened with fasteners to at least some members from the plurality of first members and the plurality of second members.

Embodiment AA

A vehicle comprises two side members, disposed laterally at a distance from each other along a width of the vehicle, each side member from the two side members directed in a longitudinal direction between a front end of the vehicle and a rear end of the vehicle; a plurality of first members disposed at a distance from each other along the longitudinal direction, each first member from the plurality of first members having one end rigidly connected to each side member; a plurality of second members disposed at a distance from each other in gaps between two first members, each second member from the plurality of second members being rigidly attached to a respective pair of first members; a cavity below the plurality of first members and the plurality of second members, the cavity sized and shaped to at least partially receive an energy source therewithin; a plurality of wheelchair tie-down mounting strips, each wheelchair tie-down mounting strip from the plurality of wheelchair tie-down mounting strips disposed within a thickness of a first member from the plurality of first members, each wheelchair tie-down mounting strip comprising a plurality of threaded receptacles; a floor positioned on the plurality of first members and the plurality of second members, the floor comprising a plurality of grooves, each groove from the plurality of grooves aligned with a aligned with a wheelchair tie-down mounting strip from the plurality of wheelchair tie-down mounting strips, the each groove comprising a plurality of first apertures, each first aperture from the plurality of first apertures aligned with a threaded receptacle from the plurality of threaded receptacles; a plurality of wheelchair tie-down tracks, each wheelchair tie-down track from the plurality of wheelchair tie-down tracks disposed within a groove from the plurality of grooves, the each wheelchair tie-down track comprising a plurality of second apertures, each second aperture from the plurality of second apertures aligned with a first aperture from the plurality of first apertures; a plurality of threaded fasteners, each threaded fastener from the plurality of threaded fasteners passed through aligned first and second apertures to threadably engage a respective threaded receptacle; and a wheelchair ramp mount; a thickness of the plurality of first members and the plurality of second members being 0.5 inches or less.

A feature of this embodiment is that the vehicle further comprises the energy source disposed within the cavity and fastened to the two side members and to the plurality of first members and the plurality of second members, wherein a threaded fastener threadably engaging the threaded receptacle does not contact an enclosure of the energy source.

A feature of this embodiment is that the vehicle further comprises a wheelchair ramp attached to the wheelchair ramp mount.

A feature of this embodiment is that the wheelchair ramp is designed to provide a sloped surface between the floor and a surface with a slope being at least 1:6.

A feature of this embodiment is that the vehicle further comprises a window positioned opposite a door of the vehicle, the window comprising a lower edge thereof positioned at a distance from a floor surface, the distance being sufficient to enable a wheelchair-bound passenger to view exterior surrounding of the vehicle.

A feature of this embodiment is that an exposed surface of the floor defines a first step of between 8.0 and 11.0 inches.

A feature of this embodiment is that the vehicle further comprises a step and a retractable wheelchair restraint positioned within the step, a strap of the retractable wheelchair restraint extendable through an aperture in a step wall.

A feature of this embodiment is that the vehicle defines a clearance between a surface of an enclosure of the energy source and a surface of between 4.0 inches and 7.0 inches.

A feature of this embodiment is that the threaded fasteners mounting the floor to the plurality of first members the and the plurality of second members through the plurality of wheelchair tie-down tracks do not contact an enclosure of the energy source.

Features which are described in the context of separate embodiments may also be provided in combination in a single embodiment. Conversely, various features which are, for brevity, described in the context of a single embodiment, may also be provided separately or in any suitable subcombination. Each embodiment may be employed alone or in any combination, and may include any one or more of the above features in any suitable combination. The Applicant hereby gives notice that new Claims may be formulated to such embodiments and features and/or combinations of such embodiments and features during the prosecution of the present Application or of any further Application derived therefrom.

The chosen embodiments of the subject matter have been described and illustrated, to plan and/or cross section illustrations that are schematic illustrations of idealized embodiments, for practical purposes so as to enable any person skilled in the art to which it pertains to make and use the same. As such, variations from the shapes of the illustrations as a result, for example, of manufacturing techniques and/or tolerances, are to be expected. It is therefore intended that all matters in the foregoing description and shown in the accompanying drawings be interpreted as illustrative and not in a limiting sense. For example, a region illustrated or described as flat may, typically, have rough and/or nonlinear features. Moreover, sharp angles that are illustrated may be rounded and rounded angles may be sharp. Thus, the regions illustrated in the figures are schematic in nature and their shapes are not intended to illustrate the precise shape of a region and are not intended to limit the scope of the present claims. It will be understood that variations, modifications, equivalents and substitutions for components of the specifically described embodiments may be made by those skilled in the art without departing from the spirit and scope of the invention as set forth in the appended claims.

Unless otherwise indicated, all numbers expressing quantities of elements, optical characteristic properties, and so forth used in the specification and claims are to be understood as being modified in all instances by the term "about." The term "about" may be associated with a numerical value to indicate a margin of +/−20% of the value. Accordingly, unless indicated to the contrary, the numerical parameters set forth in the preceding specification and attached claims are approximations that can vary depending upon the desired properties sought to be obtained by those skilled in the art utilizing the teachings of the present subject matter. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the claimed subject matter are approximations, the numerical values set forth in the specific examples are reported as precisely as possible.

Any numerical value, however, inherently contains certain errors necessarily resulting from the standard deviations found in their respective testing measurements.

To the extent that the appended claims have been drafted without multiple dependencies, this has been done only to accommodate formal requirements in jurisdictions which do not allow such multiple dependencies or require extra claim fees for such multiple dependencies. It should be noted that all possible combinations of features which would be implied by rendering the claims multiply dependent are explicitly envisaged and should be considered part of the invention.

Anywhere the term "comprising" is used, embodiments and components "consisting essentially of" and "consisting of" are expressly disclosed and described herein."

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

The Abstract is not intended to be limiting as to the scope of the claimed subject matter and is for the purpose of quickly determining the nature of the claimed subject matter.

What is claimed is:

1. A vehicle structure, comprising:
   a plurality of first members disposed at a distance from each other and defining a gap between two adjacent first members, each first member at least including a main portion, two first flanges connected to the main portion and diverging from each other, and two second flanges, each second flange being connected to and extending outwardly from a respective first flange, wherein the main portion extends along a length of the each first member, and wherein the two first flanges and the two second flanges extend along a length portion of the each first member; and
   a plurality of second members, two second members from the plurality of second members disposed at another distance from each other in each gap between two adjacent first members, each second member from the plurality of second members being rigidly attached to a respective pair of adjacent first members.

2. The vehicle structure of claim 1, further comprising two side members, disposed laterally at a distance from each other along a width of the vehicle structure, each side member from the two side members directed in a longitudinal direction between a front end of a vehicle and a rear end of the vehicle, the each first member from the plurality of first members having one end rigidly connected to each side member.

3. The vehicle structure of claim 2, wherein each side member comprises:
   a first section;
   a second section, the second section being disposed at a distance from the first section along a length of the vehicle structure;
   a third section connecting first and second sections; and
   each of the first and second sections comprises a sloped surface.

4. The vehicle structure of claim 3, wherein the each of the first and second sections comprises a first portion, a second portion, and a third portion connecting the first and second portions, wherein the second portion is connected to the third section and wherein the third portion carries the sloped surface.

5. The vehicle structure of claim 3, wherein the each of the first and second sections comprises a first portion and a second portion, wherein the second portion is connected to the third section and wherein the second portion carries the sloped surface.

6. The vehicle structure of claim 3, wherein the each of the first and second sections comprises two flanges disposed at a distance from each other.

7. The vehicle structure of claim 3, wherein the each of the first and second sections comprises two walls disposed at a distance from each other.

8. The vehicle structure of claim 3, further comprising a plurality of apertures.

9. The vehicle structure of claim 3, wherein the third section comprises two walls disposed adjacent to each other and wherein the vehicle structure further comprises a first plurality of apertures through a thickness of one wall from the two walls and a second plurality of apertures through a thickness of another wall from two walls.

10. The vehicle structure of claim 3, further comprising a means for detachably fastening an energy source at least to the each side member.

11. The vehicle structure of claim 1, further comprising a plurality of stiffeners, at least one stiffener from the plurality of stiffeners disposed within a thickness of one first member from the plurality of first members between an interior surface of the main portion and exterior surfaces of the two second flanges of a respective first member.

12. The vehicle structure of claim 1, further comprising a plurality of wheelchair tie-down mounting strips, one wheelchair tie-down mounting strip from the plurality of wheelchair tie-down mounting strips disposed within a thickness of one first member from the plurality of first members between an interior surface of the main portion and exterior surfaces of the two second flanges of a respective first member.

13. The vehicle structure of claim 1, further comprising an energy source, an enclosure of the energy source positioned in a contact with the plurality of first members and the plurality of second members, the enclosure being fastened with fasteners to at least some members from the plurality of first members and the plurality of second members.

14. The vehicle structure of claim 1, further comprising a floor panel disposed on exterior surfaces of the two second flanges, wherein a thickness of the vehicle structure between an exterior surface of the main portion and an exterior surface of the floor panel being 0.5 inches or less and wherein the vehicle structure is configured to meet requirements of a federal motor safety vehicle standard (FMVSS) 305.

15. A vehicle, comprising:
   two side members, disposed laterally at a distance from each other along a width of the vehicle, each side member from the two side members directed in a longitudinal direction between a front end of the vehicle and a rear end of the vehicle;
   a plurality of first members disposed at a distance from each other along the longitudinal direction, each first member from the plurality of first members having one end rigidly connected to each side member, each first member at least including a main portion, two first flanges connected the main portion and diverging from each other, and two second flanges, each second flange being connected to and extending outwardly from a respective first flange;
   a plurality of second members disposed at a distance from each other in each gap between two adjacent first members, each second member from the plurality of second members being rigidly attached to a respective pair of first members;
   a cavity below the plurality of first members and the plurality of second members, the cavity sized and shaped to at least partially receive an energy source therewithin;

a wheelchair tie-down mounting strip disposed within a thickness of one first member from the plurality of first members between an exterior surface of the main portion and exterior surfaces of the two second flanges, the wheelchair tie-down mounting strip comprising a plurality of threaded receptacles;

a floor positioned on the plurality of first members and the plurality of second members, the floor comprising a groove aligned with a wheelchair tie-down mounting strip, the groove comprising a plurality of first apertures, each first aperture from the plurality of first apertures aligned with a threaded receptacle from the plurality of threaded receptacles;

a wheelchair tie-down track disposed within the groove, the wheelchair tie-down track comprising a plurality of second apertures, each second aperture from the plurality of second apertures aligned with a first aperture from the plurality of first apertures; and a plurality of threaded fasteners, each threaded fastener from the plurality of threaded fasteners passed through aligned first and second apertures to threadably engage a respective threaded receptacle.

16. The vehicle of claim 15, further comprising the energy source disposed within the cavity and fastened to the two side members and to the plurality of first members and the plurality of second members, wherein a threaded fastener threadably engaging the threaded receptacle does not contact an enclosure of the energy source.

17. The vehicle of claim 15, further comprising a wheelchair ramp attached to a wheelchair ramp mount.

18. The vehicle of claim 15, further comprising a window positioned opposite a door of the vehicle, the window comprising a lower edge thereof positioned at a distance from a floor surface, the distance being sufficient to enable a wheelchair-bound passenger to view exterior surrounding of the vehicle.

19. The vehicle of claim 15, wherein an exposed surface of the floor defines a first step of between 8.0 and 11.0 inches.

20. The vehicle of claim 15, further comprising a step and a retractable wheelchair restraint positioned within the step, a strap of the retractable wheelchair restraint extendable through an aperture in a step wall.

21. The vehicle structure of claim 1, further comprising an elongated stiffener and an elongated wheelchair tie-down mounting strip disposed adjacent to each other between an interior surface of the main portion and exterior surfaces of the two second flanges of one first member from the plurality of first members.

22. A vehicle structure, comprising:

a plurality of first members disposed at a distance from each other and defining a gap between two adjacent first members, each first member at least including a main portion, two first flanges connected to the main portion and diverging from each other, and two second flanges, each second flange being connected to and extending outwardly from a respective first flange, wherein the main portion extends along a length of the each first member, and wherein the two first flanges and the two second flanges extend along a length portion of the each first member;

a plurality of second members, two second members from the plurality of second members disposed at another distance from each other in each gap between two adjacent first members, each second member from the plurality of second members being rigidly attached to a respective pair of adjacent first members;

a first elongated stiffener and a first elongated wheelchair tie-down mounting strip disposed adjacent to each other between an interior surface of the main portion and exterior surfaces of the two second flanges of one first member from the plurality of first members; and a second elongated stiffener and a second elongated wheelchair tie-down mounting strip disposed adjacent to each other between an interior surface of the main portion and the exterior surfaces of the two second flanges of another first member from the plurality of first members.

* * * * *